(12) United States Patent
Deckard et al.

(10) Patent No.: US 8,434,397 B1
(45) Date of Patent: May 7, 2013

(54) HELICOPTER WEAPON MOUNTING SYSTEM

(75) Inventors: Aaron Deckard, Wheatland, IN (US); Glen Dick, Jasper, IN (US); Paul Danesha, Bedford, IN (US); Michael Holzmeyer, Bloomfield, IN (US); James Buechler, Jasper, IN (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 13/559,980

(22) Filed: Jul. 27, 2012

Related U.S. Application Data

(60) Provisional application No. 61/657,735, filed on Jun. 8, 2012.

(51) Int. Cl.
*B64D 7/00* (2006.01)

(52) U.S. Cl.
USPC .................................. 89/37.16; 89/37.13

(58) Field of Classification Search ....... 89/37.16–37.22
See application file for complete search history.

(56) References Cited

U.S. PATENT DOCUMENTS

| | | | |
|---|---|---|---|
| 167,006 A | 8/1875 | Metcalfe |
| 273,249 A | 3/1883 | Bruce |
| 1,172,542 A | 2/1916 | McMullen |
| 1,806,724 A | 5/1931 | Wait, Jr. |
| 1,948,497 A | 2/1934 | Barnes |
| 2,111,008 A | 3/1938 | Smiling |
| 2,227,726 A | 1/1941 | Laddon et al. |
| 2,299,227 A | 10/1942 | Goetz |
| 2,345,747 A | 4/1944 | Hake |
| 2,358,105 A | 9/1944 | Scott-Paine |
| 2,370,896 A | 3/1945 | Weaver |
| 2,415,153 A | 2/1947 | Trimbach et al. |
| 2,421,052 A | 5/1947 | Cantley |
| 2,421,858 A | 6/1947 | Trimbach |
| 2,464,689 A | 3/1949 | Jackson |
| 2,536,358 A | 1/1951 | Eastman |

(Continued)

FOREIGN PATENT DOCUMENTS

| | | |
|---|---|---|
| CH | 672179 A5 | 10/1989 |
| GB | 572437 A | 10/1945 |
| JP | 02-231897 | 9/1990 |
| WO | 9315955 A1 | 8/1993 |

OTHER PUBLICATIONS

Photograph: AIRWOLF: Airshow 2; http://airwolf.tv-series.com/default.asp?ModuleID=16&PageID=50&p_id=1130, 1 page, at least as early as May 30, 2012.

(Continued)

*Primary Examiner* — Samir Abdosh
(74) *Attorney, Agent, or Firm* — Christopher A. Monsey

(57) ABSTRACT

A weapon mounting system for a vehicle, such as a helicopter. The weapon mounting system illustratively includes a weapon cradle supporting a machine gun for pivoting movement about a generally horizontal elevational axis. A carriage supports the weapon cradle and is supported by a pintle for rotation about a generally vertical azimuth axis. An ejection collection device is supported by the carriage and collects spent shell casings and links ejected from the machine gun for discharge through the pintle. A trigger assembly illustratively provides for manual operation by a gunner and for remote electrical operation by a pilot.

18 Claims, 39 Drawing Sheets

U.S. PATENT DOCUMENTS

| | | | |
|---|---|---|---|
| 2,564,568 A | 8/1951 | Franklin | |
| 2,568,229 A | 9/1951 | Gardes | |
| 2,725,791 A | 12/1955 | Gravenhorst et al. | |
| 2,767,617 A | 10/1956 | Taylor | |
| 3,011,408 A | 12/1961 | Brothers, Jr. et al. | |
| 3,086,425 A | 4/1963 | Huey | |
| 3,138,994 A | 6/1964 | Blunk | |
| 3,218,930 A | 11/1965 | Girouard et al. | |
| 3,352,207 A | 11/1967 | Proudlove | |
| 3,417,658 A | 12/1968 | Betzold et al. | |
| 3,463,424 A | 8/1969 | Pickell | |
| 3,485,151 A | 12/1969 | Taylor | |
| 3,590,684 A | 7/1971 | Gilbert | |
| 3,604,660 A | 9/1971 | Marley | |
| 3,610,825 A * | 10/1971 | Fritzel | 348/144 |
| 3,623,726 A | 11/1971 | Pittinger et al. | |
| 3,634,622 A * | 1/1972 | Wheeler | 348/369 |
| 3,640,177 A | 2/1972 | Hottinger | |
| 3,687,004 A | 8/1972 | Faisandier | |
| 3,731,589 A | 5/1973 | Pfeiffer et al. | |
| 3,911,787 A | 10/1975 | Seibel | |
| 3,994,202 A | 11/1976 | Tidstrom | |
| 4,011,789 A | 3/1977 | Bresee, Jr. et al. | |
| 4,020,738 A | 5/1977 | Martinez | |
| 4,079,658 A | 3/1978 | Brennan | |
| 4,092,900 A | 6/1978 | Hottinger et al. | |
| 4,194,432 A | 3/1980 | Conway et al. | |
| 4,256,012 A | 3/1981 | Cowart et al. | |
| 4,325,284 A | 4/1982 | Grunewald et al. | |
| 4,354,419 A | 10/1982 | Patterson | |
| 4,470,817 A | 9/1984 | Diehl et al. | |
| 4,524,670 A | 6/1985 | Billard et al. | |
| 4,573,395 A | 3/1986 | Stoner | |
| 4,601,230 A | 7/1986 | LeBlanc | |
| 4,601,445 A | 7/1986 | Duclos et al. | |
| 4,638,715 A | 1/1987 | LeBlanc | |
| 4,681,019 A | 7/1987 | Brandl et al. | |
| 4,682,529 A | 7/1987 | Duclos et al. | |
| 4,715,263 A * | 12/1987 | Kramer et al. | 89/37.21 |
| 4,752,791 A | 6/1988 | Allred | |
| 4,893,545 A * | 1/1990 | Sanderson et al. | 89/37.19 |
| 4,937,965 A | 7/1990 | Narvaez | |
| 4,966,063 A | 10/1990 | Sanderson et al. | |
| 4,967,640 A | 11/1990 | Dodd | |
| 4,972,758 A | 11/1990 | Austin et al. | |
| 4,974,490 A | 12/1990 | Austin | |
| 4,974,499 A | 12/1990 | Sanderson et al. | |
| 4,982,650 A | 1/1991 | Bender-Zanoni et al. | |
| 5,024,138 A | 6/1991 | Sanderson et al. | |
| 5,050,477 A | 9/1991 | Cowdery et al. | |
| 5,072,895 A | 12/1991 | Camus | |
| 5,093,677 A | 3/1992 | McMahon | |
| 5,104,063 A | 4/1992 | Hartley | |
| 5,107,750 A | 4/1992 | Buchstaller et al. | |
| 5,155,292 A | 10/1992 | Rostcil et al. | |
| 5,187,318 A * | 2/1993 | Sanderson et al. | 89/37.22 |
| 5,191,370 A | 3/1993 | Bozzolato | |
| 5,206,454 A | 4/1993 | Sanderson | |
| 5,253,574 A | 10/1993 | Sanderson | |
| 5,263,397 A | 11/1993 | Sanderson | |
| 5,282,410 A * | 2/1994 | Sanderson | 89/37.16 |
| 5,282,589 A | 2/1994 | Branigan et al. | |
| 5,365,291 A | 11/1994 | Maeda | |
| 5,381,721 A | 1/1995 | Holmstrom et al. | |
| 5,390,582 A | 2/1995 | Sanderson | |
| 5,400,690 A | 3/1995 | Meili et al. | |
| 5,408,915 A | 4/1995 | Stoner | |
| 5,419,234 A * | 5/1995 | Sanderson | 89/37.22 |
| 5,426,476 A | 6/1995 | Fussell et al. | |
| 5,431,084 A | 7/1995 | Fowler et al. | |
| 5,440,964 A | 8/1995 | Bender-Zanoni | |
| 5,483,865 A | 1/1996 | Brunand | |
| 5,554,815 A | 9/1996 | Authie et al. | |
| 5,589,901 A | 12/1996 | Means | |
| 5,687,930 A | 11/1997 | Wagner et al. | |
| 5,767,436 A | 6/1998 | Sanderson et al. | |
| 6,056,237 A | 5/2000 | Woodland | |
| 6,176,167 B1 * | 1/2001 | Sanderson | 89/1.54 |
| 6,206,325 B1 | 3/2001 | Nunnally | |
| 6,250,196 B1 | 6/2001 | Sanderson | |
| 6,250,197 B1 * | 6/2001 | Sanderson | 89/37.16 |
| 6,272,967 B1 | 8/2001 | Bender-Zanoni et al. | |
| 6,283,428 B1 | 9/2001 | Maples et al. | |
| 6,286,411 B1 * | 9/2001 | Sanderson | 89/37.16 |
| 6,293,179 B1 | 9/2001 | Sanderson | |
| 6,305,263 B1 | 10/2001 | Wallin | |
| 6,339,983 B1 | 1/2002 | Mannhart | |
| 6,345,562 B1 | 2/2002 | Mannhart | |
| 6,393,960 B1 | 5/2002 | Bilger | |
| 6,405,975 B1 | 6/2002 | Sankrithi et al. | |
| 6,453,792 B1 | 9/2002 | Hampton | |
| 6,469,783 B1 | 10/2002 | Wells et al. | |
| 6,484,619 B1 | 11/2002 | Thomas et al. | |
| 6,530,169 B1 | 3/2003 | Griffin | |
| 6,547,181 B1 | 4/2003 | Hoisington et al. | |
| 6,564,690 B1 | 5/2003 | Long | |
| 6,592,071 B2 | 7/2003 | Kinkead et al. | |
| 6,622,606 B1 | 9/2003 | Neal | |
| 6,626,398 B1 | 9/2003 | Cox et al. | |
| 6,675,694 B1 | 1/2004 | Liebig | |
| 6,695,270 B1 | 2/2004 | Smed | |
| 6,718,862 B1 | 4/2004 | Sanderson | |
| 6,779,430 B1 * | 8/2004 | Sanderson | 89/33.16 |
| 6,789,455 B1 * | 9/2004 | Sanderson | 89/37.07 |
| 6,793,108 B2 | 9/2004 | Williams, Jr. | |
| 6,796,300 B2 | 9/2004 | Petrosyan et al. | |
| 6,799,500 B1 | 10/2004 | Kulikowski | |
| 6,802,238 B1 | 10/2004 | Sanderson | |
| 6,802,239 B1 * | 10/2004 | Sanderson | 89/41.21 |
| 6,820,532 B2 | 11/2004 | Sanderson | |
| 7,066,365 B2 | 6/2006 | Brown | |
| 7,069,683 B1 | 7/2006 | Kapusta | |
| 7,086,192 B2 | 8/2006 | Deros | |
| 7,168,200 B2 | 1/2007 | Perez et al. | |
| 7,258,055 B1 | 8/2007 | Javorsky | |
| 7,513,187 B1 | 4/2009 | Lambermont | |
| 7,543,524 B1 | 6/2009 | Javorsky | |
| 7,624,947 B2 | 12/2009 | Dortch et al. | |
| 7,694,620 B1 | 4/2010 | Narus | |
| 8,069,767 B2 | 12/2011 | Deckard et al. | |
| 8,151,684 B2 | 4/2012 | Buechler et al. | |
| 2004/0060428 A1 | 4/2004 | Sanderson | |
| 2007/0131103 A1 | 6/2007 | McClellan et al. | |
| 2010/0101401 A1 | 4/2010 | Toeckes et al. | |
| 2010/0294119 A1 | 11/2010 | Buechler et al. | |
| 2010/0294120 A1 | 11/2010 | Deckard et al. | |
| 2010/0319521 A1 | 12/2010 | Dick et al. | |

OTHER PUBLICATIONS

Figure showing components of armament subsystem M6 installed on UH-11B/C helicopter—right side shown; http://en.wikipedia.org/wiki/File:M6_Schematic.jpg, 2 pages, at least as early as May 30, 2012.

Bell UH-1 Iroquois Article, http://en.wikipedia.org/wiki/UH-1_Iroquois, 22 pages, at least as early as May 30, 2012.

M60 Machine Gun Article, http://www.enotes.com/topic/M60_machine gun, 25 pages, at least as early as May 30, 2012.

List of U.S. Aircraft Gun Pods Article, http://en.wikipedia.org/wiki/U.S._aircraft_gun_pods, 5 pages, at least as early as May 30, 2012.

Mayhood, et al., Helicopter Armament, Marine Corps Gazette (Pre-1964), 45(2), 17-18, 1961.

Debay, Combat Helicopters, Paris: Histoire & Collections, 1996, p. 144.

Stapfer, Soviet Military Helicopters, London: Arms and Armour; New York, NY: Distributed in the USA by Sterling Pub. Co., c1991, p. 40.

Definition of SPONSON from Oxford English Dictionary, 1989, 2 pages.

Definition of SPONSON from the Free Dictionary by Farlex, http://www.thefreedictionary.com/sponson, 1 page, at least as early as May 21, 2012.

Definition of SPONSON from Webster Dictionary, 1976 and 1987, 5 pages.

Photograph: UH-1C Gunship, http://en.wikipedia.org/wiki/file:Avhuey_05.jpg, 3 pages, at least as early as May 30, 2012.

Lockheed AC-130 Article; http://en.wikipedia.org/wiki/Lockheed_AC-130, 14 pages, at least as early as May 30, 2012.

Photograph: Spooky Gunship Armed with New Cannons and accompanying description; http://en.wikipedia.org/wiki/File:070126-F-8732E-600.jpg, 4 pages, at least as early as May 30, 2012.

U.S. Helicopter Armament Subsystems Article; http://en.wikipedia.org/wiki/U.S._Helicopter_Armarnent_Subsysterns#UH-1_Iroquois, 23 pages, at least as early as May 30, 2012.

Braybrook, Earth-Moving Add-Ons for Chopppers, Armada International 25, (6): 90-96, 2001.

Braybrook, A Wolf in Sheep's Clothing, Armada International 25, (6): 8-16, 2001.

Braybrook, Teeth for Choppers, Armada International 21, (5): 8-18, 1997.

XM-21 Minigun & 7-Shot Rocket Pods Article; http://www.174ahc.org/shrkmini.htm, at least as early as Apr. 4, 2012.

Atwater, et al., The Measurement and Modeling of a World War I Mark IV Tank Using CLR and CCD Camera/Line Scanning Systems in an Outside Environment, pp. 1-9, at least as early as Jul. 25, 2012.

Illustrated Directory of Special Forces (available at: http://books.google.com/books?id=B8AbZk-IGJoC&pg=PA426&dq=ac-130&lr=#v=o), cover, pp. 1 and 427, 2002.

Photograph: AC-130 Gunship; http://en.wikipedia.org/wiki/File:Ac130_gunship.jpg, 3 pages, at least as early as May 30, 2012.

Airwolf (helicopter) Article; http://en.wikipedia.org/wiki/Airwolf_(helicopter), 6 pages, at least as early as May 30, 2012.

Shark Door Gunner's M-60 Machine Gun Article; http://www.174ahc.org/m-60.htm, Nov. 5, 2011.

Photo of Airwolf, at least as early as May 31, 2012.

21st Special Operations Squadron [21st SOS] Article; http://usafhpa.org/21stsos/21stSOS88to07.html, at least as early as Jul. 2, 2012.

History of the 21st Helicopter Squadron Article; http://usafhpa.org/21stsos/21sthist.html, at least as early as Jul. 2, 2012.

Vietnam War Helicopter Aviation: USAF ARRS and SOS Helicopters Article; http://www.militaryphotos.net/forums/showthread.php?139419-Vietnam-War-Helicopter-Aviation-USAF-ARRS-and-SOS-helicopters, at least as early as Jul. 2, 2012.

McDonnell Douglas AH-64 "Sea Apache" Project Article; http://www.aylastar.org/helicopters_eng/mcdonnell_sea_apache.php, at least as early as Jul. 2, 2012.

Photograph: AIRWOLF: Airwolf Hovering at Low Altitude Over the Airfield: http://airwolf.tv-series.com/default.asp?ModuleID=168,PageID=50&p_id=43, at least as early as Jul. 2, 2012.

Photograph: Airwolf: Airwolf with Chain-Guns Extracted; http://airwolf.tv-series.com/default.asp?ModuleID=16&PageID=50&p_id=44#Image, at least as early as Jul. 2, 2012.

Photograph: THE LADY: The Lady on Show; http://airwolf.tv-series.com/default.asp?ModuleID=16&PageID=50&p_id=1126#Image, at least as early as Jul. 2, 2012.

Photograph: AIRWOLF: Airshow 1; Airwolf 3 pic: http://airwolf.tv-series.com/default.asp?ModuleID=16&PageID=50&p_id=1129#Image, at least as early as Jul. 2, 2012.

About the 1984-Model Airwolf Article; http://airwolf.tv-series.com/default.asp?ModuleID=2&PageID=12&ArticleID=50042, at least as early as Jul. 2, 2012.

Kamov Ka-50 "Black Shark" 1982 Article, http://www.aviastar.org/helicopters_eng/ka-50.php, at least as early as Jul. 2, 2012.

The M60D Machine Gun on the M23 Armament Subsystem Article; http://en.wikipedia.org/wiki/File:M60d-on-m23.jpg, at least as early as Jul. 2, 2012.

Figure of XM59 Subsysem on the UH-1D Helicoper http://en.wikpedia.org/wiki/File:Specs54.jpg, at least as early as Jul. 2, 2012.

Warriors, Quarterly Magazine for the Alaska Department of Military & Veterans Affairs; http://ebooks.aqppublishing.com/archive/national_guard/Warriors.pdf, Title page and p. 24, Summer 2012.

Lockheed AH-56 Cheyenne Attack Helicopter Prototype Article; http://www.militaryfactory.com/aircraft/detail.asp?aircraft_id=258, at least as early as Jul. 2, 2012.

Jack S. Ballard, Development and Employment of Fixed-Wing Gunships 1962-1972 (available at http://books.google.com/books?id=2h1dYiEC9jcC&printsec=frontcover&source), front cover and pp. ii and 126-175.

* cited by examiner

HELICOPTER WEAPON MOUNTING SYSTEM

CROSS-REFERENCE TO RELATED APPLICATION

This application claims priority to U.S. Provisional Patent Application Ser. No. 61/657,735, filed Jun. 8, 2012, the disclosure of which is expressly incorporated by reference herein. This application is also related to U.S. patent application Ser. No. 13/559,973, filed Jul. 27, 2012, entitled "HELICOPTER WEAPON MOUNT SYSTEM", the disclosure of which is expressly incorporated by reference herein.

STATEMENT REGARDING FEDERALLY SPONSORED RESEARCH OR DEVELOPMENT

The invention described herein includes contributions by one or more employees of the Department of the Navy made in performance of official duties and may be manufactured, used and licensed by or for the United States Government for any governmental purpose without payment of royalties thereon.

BACKGROUND AND SUMMARY OF THE DISCLOSURE

The present disclosure relates to weapon systems and, more particularly, to machine gun helicopter armament systems.

It is known to provide various weapon systems on a variety of vehicles, including aircraft. With respect to helicopters, machine guns have been mounted within cabin areas, on window sills, and on external store supports. For example, it is known to mount M240 7.62 mm machine guns on adjustable linkages supported by gunner's windows on UH-60 Black Hawk military helicopters. It is also know to mount GAU-18 .50 caliber machine guns outside of gunner's windows on UH-60 Black Hawk military helicopters.

The present disclosure relates to a weapon mounting system that may be used to support a variety of machine guns external to the cabin area of a helicopter. For example, the weapon mounting system disclosed herein may support a GAU-21 .50 caliber machine gun outside of a gunner's window on an HH-60G Pave Hawk military helicopter. However, the weapon mounting system may also be used to support other machine guns, such as a GAU-2 minigun and a M240 7.62 mm machine gun, on a variety of support structures, including aircraft and land vehicles.

According to an illustrative embodiment of the present disclosure, a weapon mounting system includes a weapon cradle for releasably coupling to a machine gun, and a carriage operably coupled to the weapon cradle and defining an elevational axis. The cradle is configured to pivot about the elevational axis. A tubular pintle supports the carriage and defines a pintle passageway, the pintle operably coupled to the carriage and defining an azimuth axis extending perpendicular to the elevational axis. The carriage is configured to rotate about the azimuth axis. A tubular support post supports the pintle and defines a support post passageway.

An ejection collection device illustratively extends between the weapon cradle and the carriage, and includes a first side wall, and a second side wall spaced apart from the first side wall, the first and second side walls extending downwardly from the cradle for pivoting movement about the elevational axis with the weapon cradle. The illustrative ejection collection device further includes a first adjustable end wall positioned intermediate the first side wall and the second side wall, the first adjustable end wall having a first end coupled to the carriage and a second end configured to move with the cradle, and a second adjustable end wall positioned intermediate the first side wall and the second side wall and in spaced relation to the first adjustable end wall, the second adjustable end wall having a first end coupled to the carriage and a second end configured to move with the cradle. The ejection collection device is configured to direct spent shell casings and links from the machine gun to an opening defined at the bottom of the carriage and through an ejection path, the ejection path including the pintle passageway and the support post passageway.

According to another illustrative embodiment of the present disclosure, a weapon mounting system includes a weapon cradle for releasably coupling to a machine gun, a carriage supporting the weapon cradle for pivoting movement about an elevational pivot axis, and a pintle supporting the carriage for rotating movement about an azimuth axis extending perpendicular to the elevational axis. A trigger assembly is operably coupled to the weapon cradle, the trigger assembly including a handle grip, a lever arm supported for pivoting movement relative to the handle grip, an electrically operable actuator, and a paddle operably coupled to the lever arm and the electrically operable actuator. Pivoting movement of the lever arm causes the paddle to pivot into engagement with a trigger mechanism on the machine gun in a manual mode of operation, and activation of the actuator causes the paddle to pivot into engagement with a trigger mechanism on the machine gun in a remote electrical mode of operation. Illustratively, a switch controls power supplied to the electrically operable actuator, and a light is actuated when power is supplied to the actuator. The trigger assembly illustratively includes a frame coupled to the weapon cradle, and an upper housing supported by a frame. The upper housing is pivotable from a raised position to a lowered position to provide access to the weapon cradle. Illustratively, the weapon cradle includes a front end and a rear end, a guide member supported proximate the front end of the cradle and including a track to slidably receive a shoe of the machine gun, and a support shelf supported forward of the guide member and defining a resting surface for the shoe to assist in installing the machine gun on the weapon cradle.

BRIEF DESCRIPTION OF THE DRAWINGS

The foregoing aspects of many of the attendant advantages of this invention will become more readily appreciated as the same become better understood by reference to the following detailed description when taken in conjunction with the accompanying drawings.

DETAILED DESCRIPTION OF THE DRAWINGS

Figure 1:
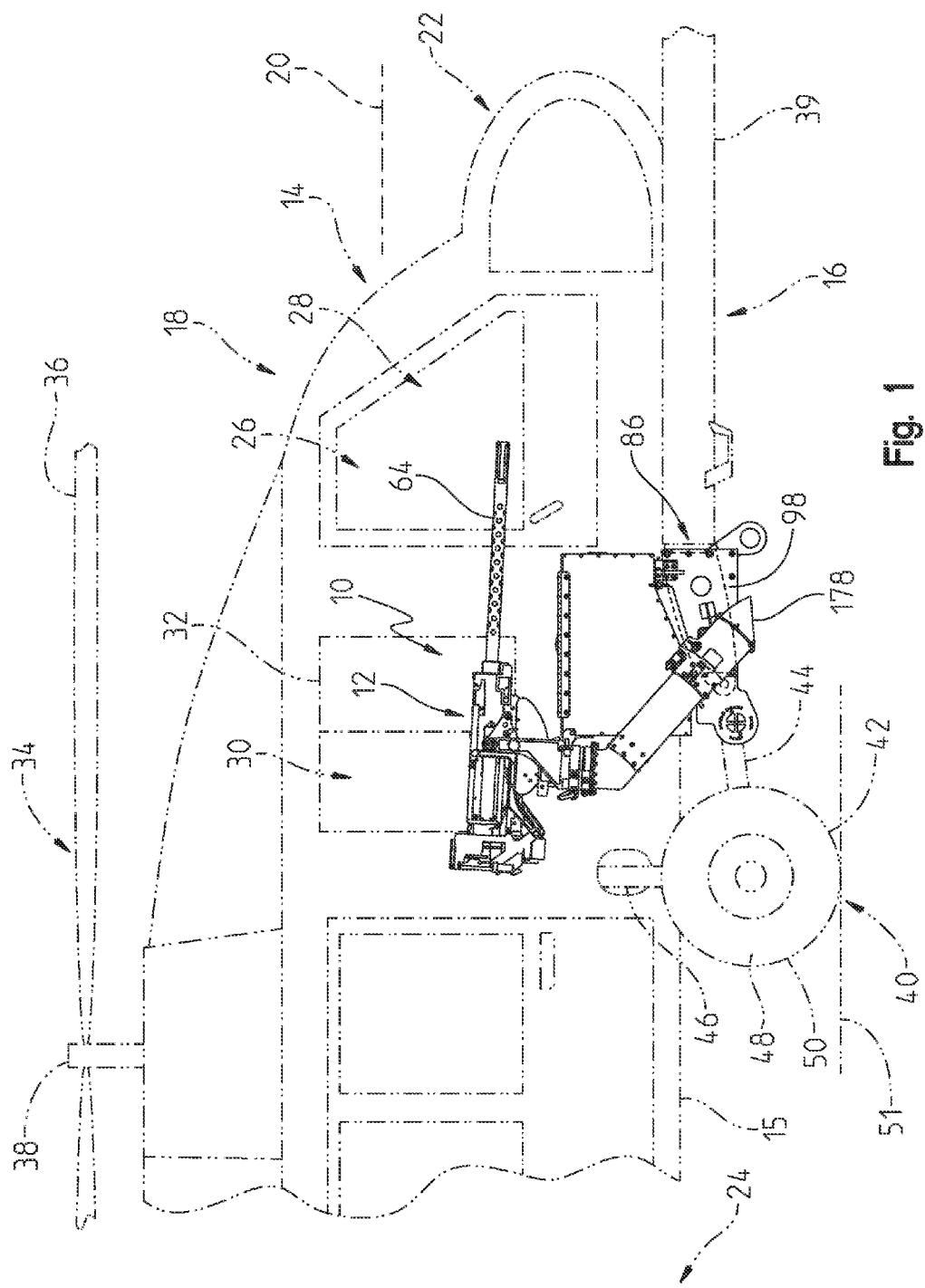
FIG. 1 is a right side elevational view of a weapon mounting system of the present disclosure coupled to a helicopter, the helicopter shown in a standard landing gear configuration having conventional landing wheels.

For the purposes of promoting and understanding the principles of the invention, reference will now be made to the embodiments illustrated in the drawings, which are described below. The embodiments disclosed below are not intended to be exhaustive or limit the invention of the precise form disclosed in the following detailed description. Rather, the embodiments are chosen and described so that others skilled in the art may utilize their teachings. It will be understood that no limitation of the scope of the invention is thereby intended. The invention includes any alterations and further modifications in the illustrated devices and described methods and further applications of the principles of the invention will normally occur to one skilled in the art to which the invention relates.

Figure 2:
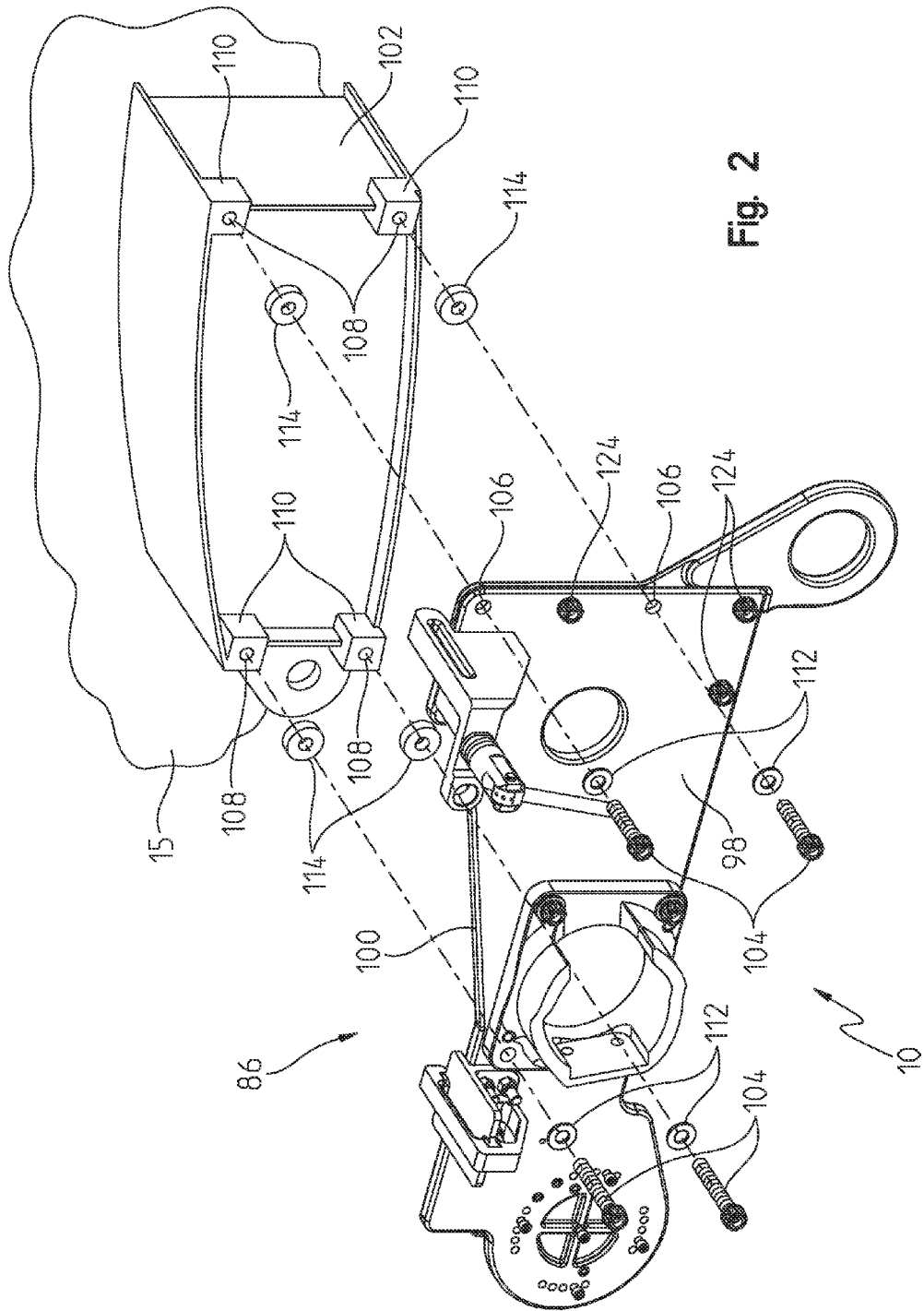
FIG. 2 is an exploded perspective view showing an illustrative coupling of the weapon mounting system to the helicopter of FIG. 1.

Referring initially to FIGS. 1 and 2, an illustrative machine gun helicopter weapon mounting system 10 of the present disclosure is shown supporting a weapon 12 on a helicopter 14. In certain illustrative embodiments, the weapon mounting system 10 may be supported for manual operation by a gunner supported within the helicopter 14 (i.e., gunner manual mode of operation) or remote electrical operation by a pilot of the helicopter 14 (i.e., pilot remote electrical mode of operation).

The helicopter 14 illustratively includes a body or fuselage 15 including a right side 16 and a left side 18 extending generally parallel to a longitudinal axis 20. The helicopter 14 also includes a front end 22 and a rear or aft end 24. An occupant cabin 26 includes cockpit 28 and a gunner's area 30. The gunner's area 30 may include a gunner's window 32 that may be opened to provide external access from the cabin 26 of the helicopter 14 and, more particularly, provide access for operation of the weapon 12.

A rotor assembly 34 extends above the cabin 26 of the helicopter 14 and behind the gunner's window 32. The rotor assembly 34 includes a plurality of rotor blades 36 driven in rotation by a shaft 38 operably coupled to a motor (not shown). The shaft 38 is illustratively inclined forwardly at a slight angle, such as 3 degrees from vertical. The illustrative helicopter 14 may include a refueling tube or probe 39 extending longitudinally forwardly along the right side 16 of the fuselage 15.

With reference 1 and 4, the helicopter 14 is shown in a rest position supported by a landing gear structure 40 including ground supports 42 coupled to the helicopter 14 through struts 44 and 46. The helicopter in FIG. 1 is illustrated in a conventional landing gear configuration wherein the ground supports 42 of the landing gear structure 40 comprise rotatable wheels 48 having tires 50 configured to be supported on conventional terrain 51. The helicopter 14 illustrated in FIG. 4 has been placed in an arctic landing gear configuration, wherein the landing gear structure 40 includes landing skis 52 configured to be supported on snow or ice terrain 53. As further detailed herein, the weapon mounting system 10 of the present disclosure may be efficiently and simply reconfigured for use with either conventional or arctic landing gear configurations.

The helicopter 14 shown in FIGS. 1-4 illustratively comprises a HH-60G Pave Hawk military helicopter. However, it should be appreciated that a wide variety of vehicles, including other types of aircraft such as UH-60 Black Hawk military helicopters, may utilize the weapon mounting system 10 of the present disclosure.

Reference now to FIGS. 5-8, the weapon mounting system 10 illustratively includes an upper portion 60 and a lower portion 62. The upper portion 60 includes weapon 12, illustratively a machine gun 64, supported by a weapon cradle 66. The weapon cradle 66, in turn, is supported by a carriage 68 for pivoting movement about a generally horizontal elevational axis 70 (i.e., elevational pivoting). An ejection collection device 72 cooperates with the carriage 68 to facilitate the collection and ejection of spent brass shell casings 74 and links 75 (FIG. 13) from an ammunition belt 76 supplied to the machine gun 64 from an ammunition canister 78. The carriage 68 is supported by a tubular pintle 80 for rotation about a generally vertical azimuth axis 82 (i.e., azimuth rotation). A trigger assembly 83 is coupled to the weapon cradle 66 and is configured to operate the machine gun 64. The lower portion 62 of the weapon mounting system 10 illustratively includes a tubular support post 84 supporting the pintle 80. A base assembly 86 secures the support post 84 to the helicopter 14.

The machine gun 64 shown in FIG. 1 is illustratively a GAU-21 .50 caliber machine gun of the type manufactured by FNH USA of McLean, Va. However, it should be appreciated that a wide variety of weapons may be supported by the weapon mounting system 10, for example a GAU-2 minigun 88 (FIG. 4) and an M240 7.62 mm machine gun (not shown). The machine gun 64 of FIGS. 5 and 6 includes a body 90 including a receiver 92 coupled to the ammunition canister 78 through a feed chute 94 through which the ammunition belt 76 passes. The ammunition belt 76 may be of conventional design as including a plurality of rounds including a shell casing 74 receiving a bullet 77, and a plurality of links 75 interconnecting adjacent shell casings 74. The casings 74 and links 75 are typically made of metal, such as brass. The feed chute 94 is illustratively formed of interconnected stainless steel segments to provide flexibility and may be manufactured by Standard Armament of Glendale, Calif. A barrel 96 extends forwardly from the body 90 along a longitudinal weapon axis 97.

Figure 3:
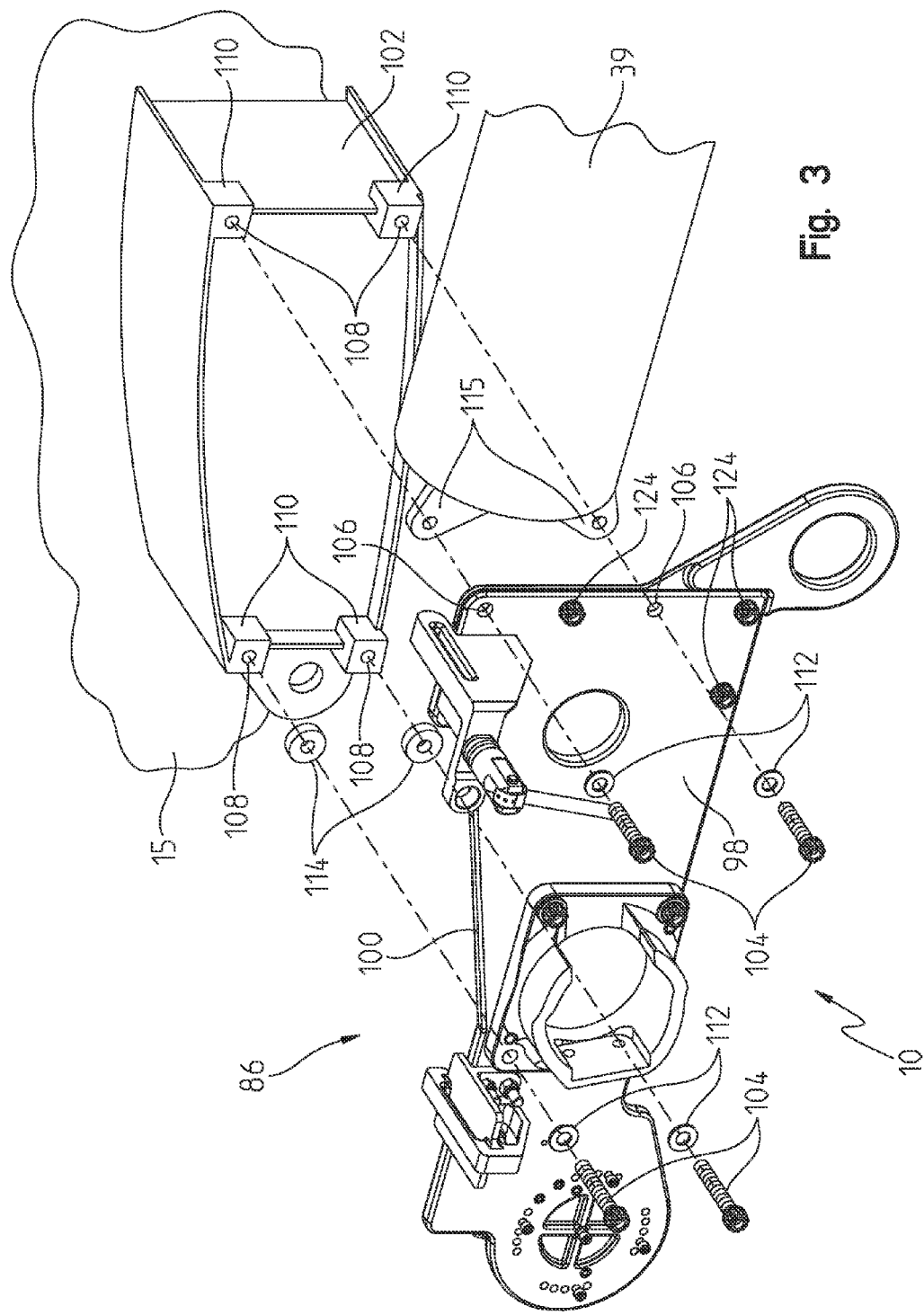
FIG. 3 is an exploded perspective view similar to FIG. 2, showing an alternative coupling of the weapon mounting system to the helicopter of FIG. 1.

Referring now to FIGS. 1-4, 9 and 10, the base assembly 86 illustratively includes a mounting member 98 secured to strong points on the body 15 of the helicopter 14. As shown in FIGS. 2 and 3, the mounting member 98 comprises a plate 100 formed of aluminum and secured to an external mounting structure of the helicopter body 15. In one illustrative embodiment, the mounting member 98 may be secured to an external mounting structure or housing 102, such as an extended pylon or stub wing, extending outwardly from the helicopter body 15 and coupled to the landing gear structure 40. A plurality of bolts 104 pass through openings 106 in the mounting plate 100 and are threadably secured within apertures 108 formed in mounting blocks 110 positioned proximate opposing corners of the housing 102. Washers 112 and spacers 114 may be positioned around each bolt 104 on opposite sides of the mounting plate 100. In certain illustrative embodiments including refueling probe 39 as shown in FIG. 3, mounting brackets 115 coupled to the probe 39 may replace a pair of the spacers 114.

While shown secured to housing 102, the base assembly 86 may be coupled to other strong points of the helicopter 14 proximate the gunner's window 32. For example, the mounting plate 100 may be secured to the fuselage 15 adjacent the cabin floor and below the gunner's window 32.

Figure 5:
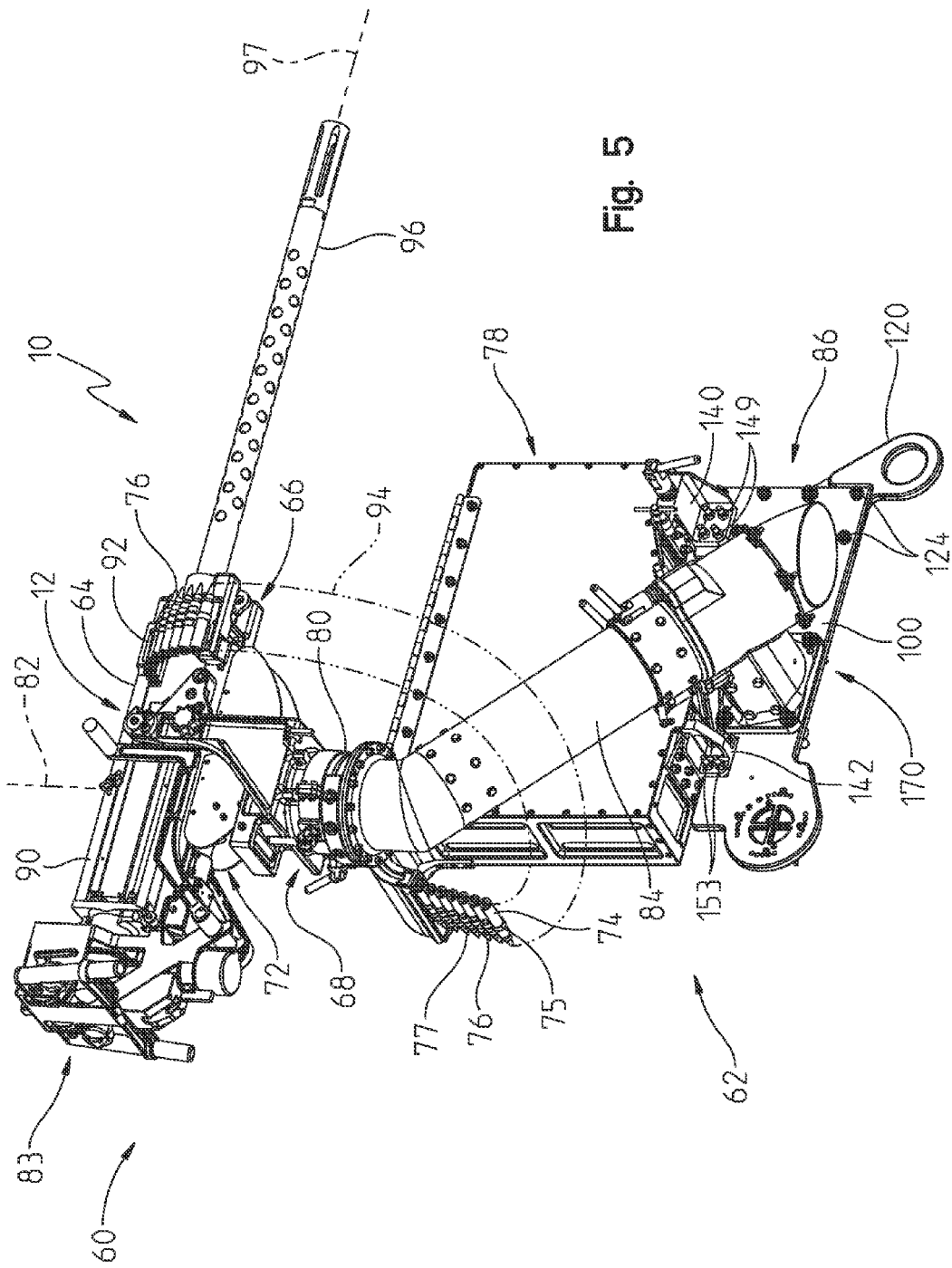
FIG. 5 is a rear, right side perspective view of the weapon mounting system of FIG. 1.
Figure 6:
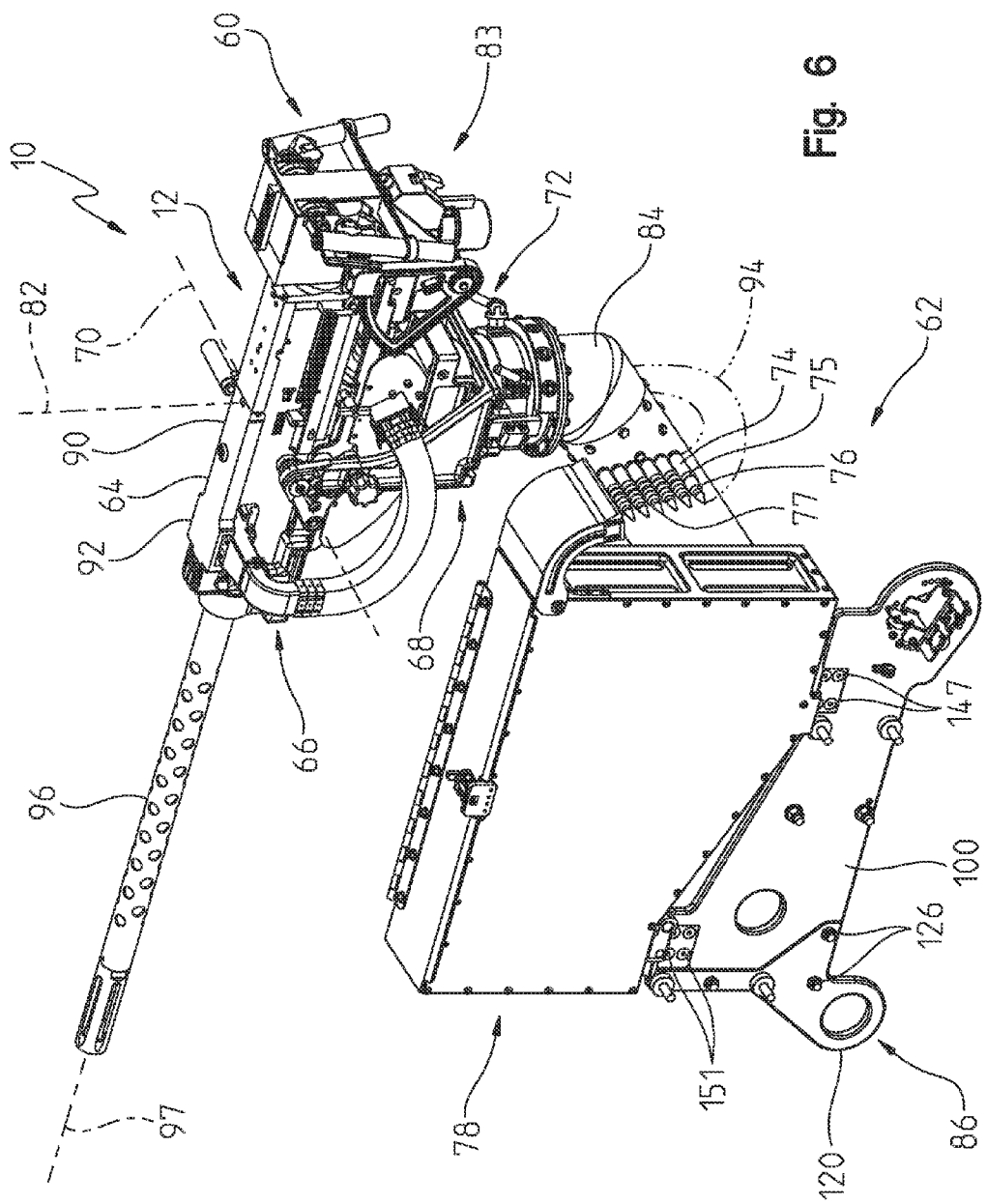
FIG. 6 is a rear, left side perspective view of the weapon mounting system of FIG. 5.
Figure 7:
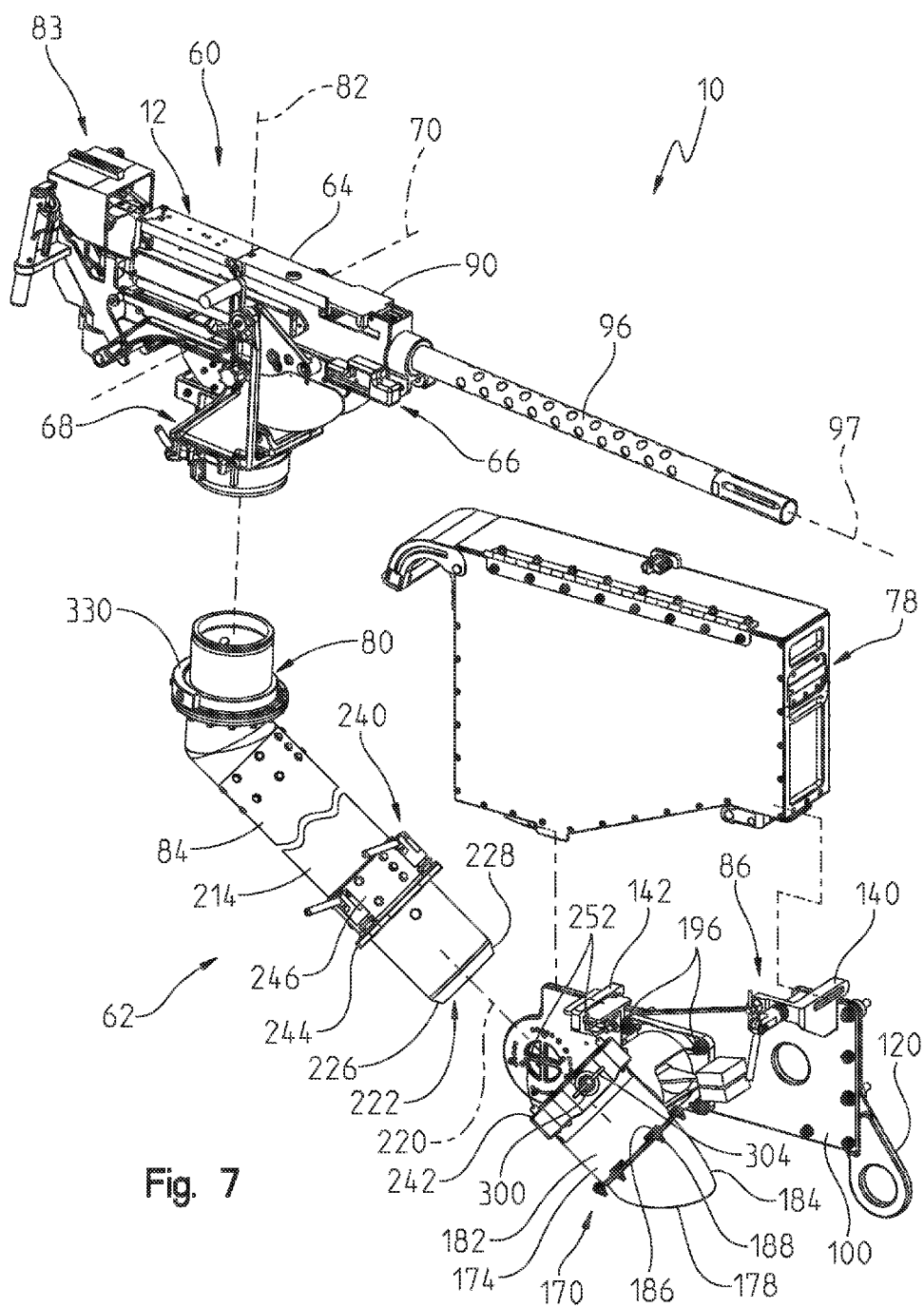
FIG. 7 is a front, right side exploded perspective view of the weapon mounting system of FIG. 5.
Figure 8:
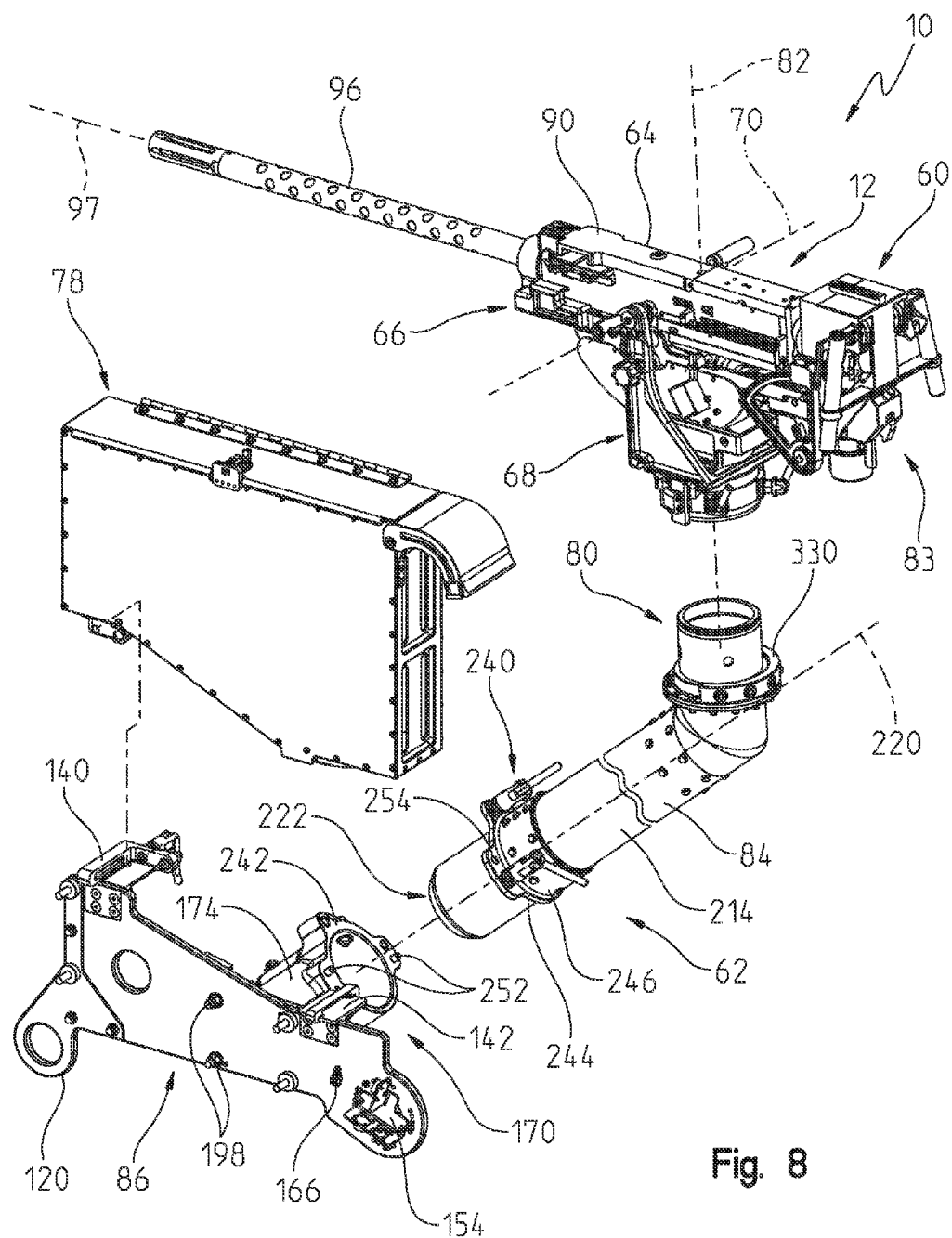
FIG. 8 is a rear, left side exploded perspective view of the weapon mounting system of FIG. 5.
Figure 9:
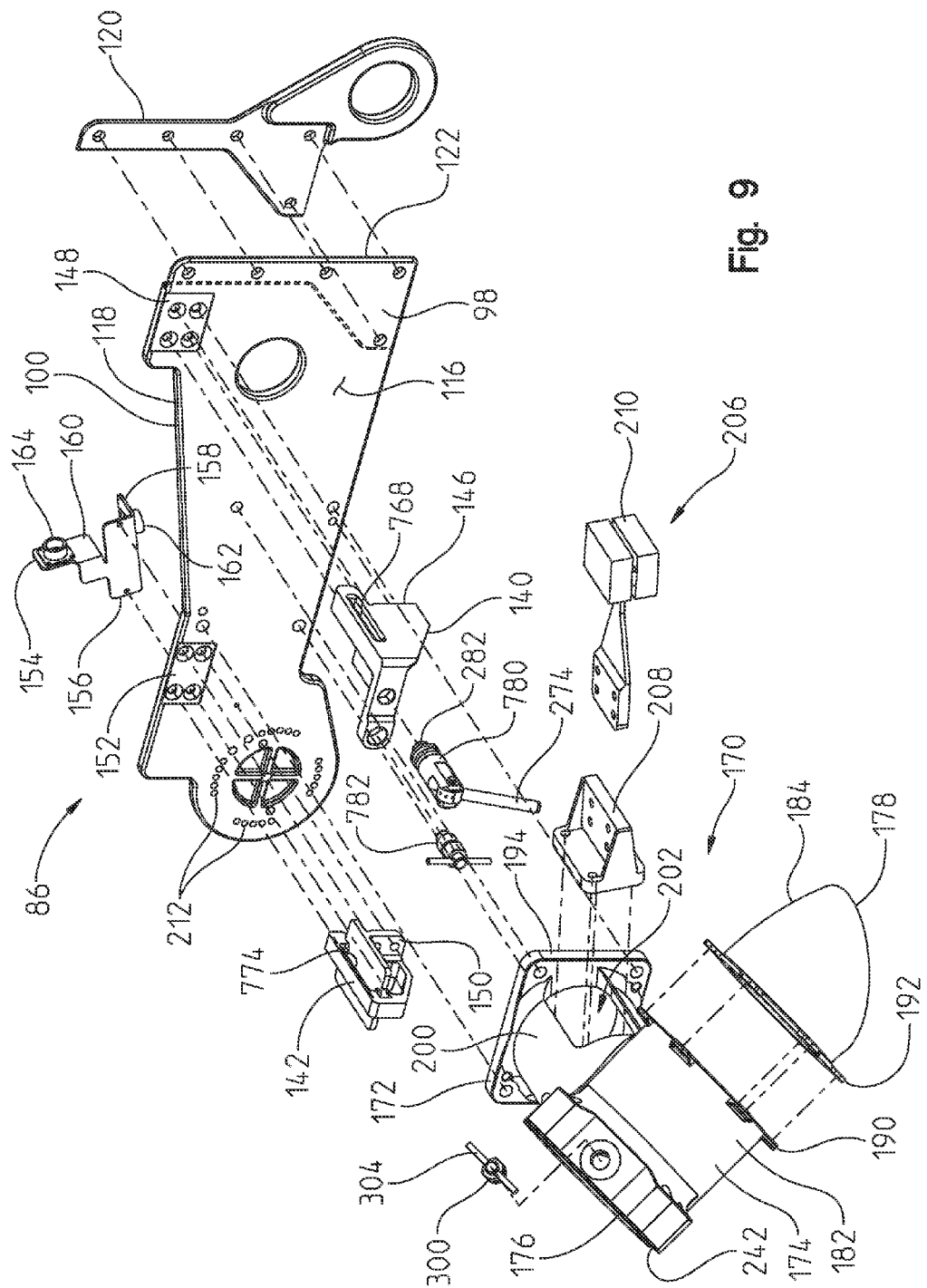
FIG. 9 is a front, right side exploded perspective view of the base assembly of the weapon mounting system of FIG. 5.
Figure 10:
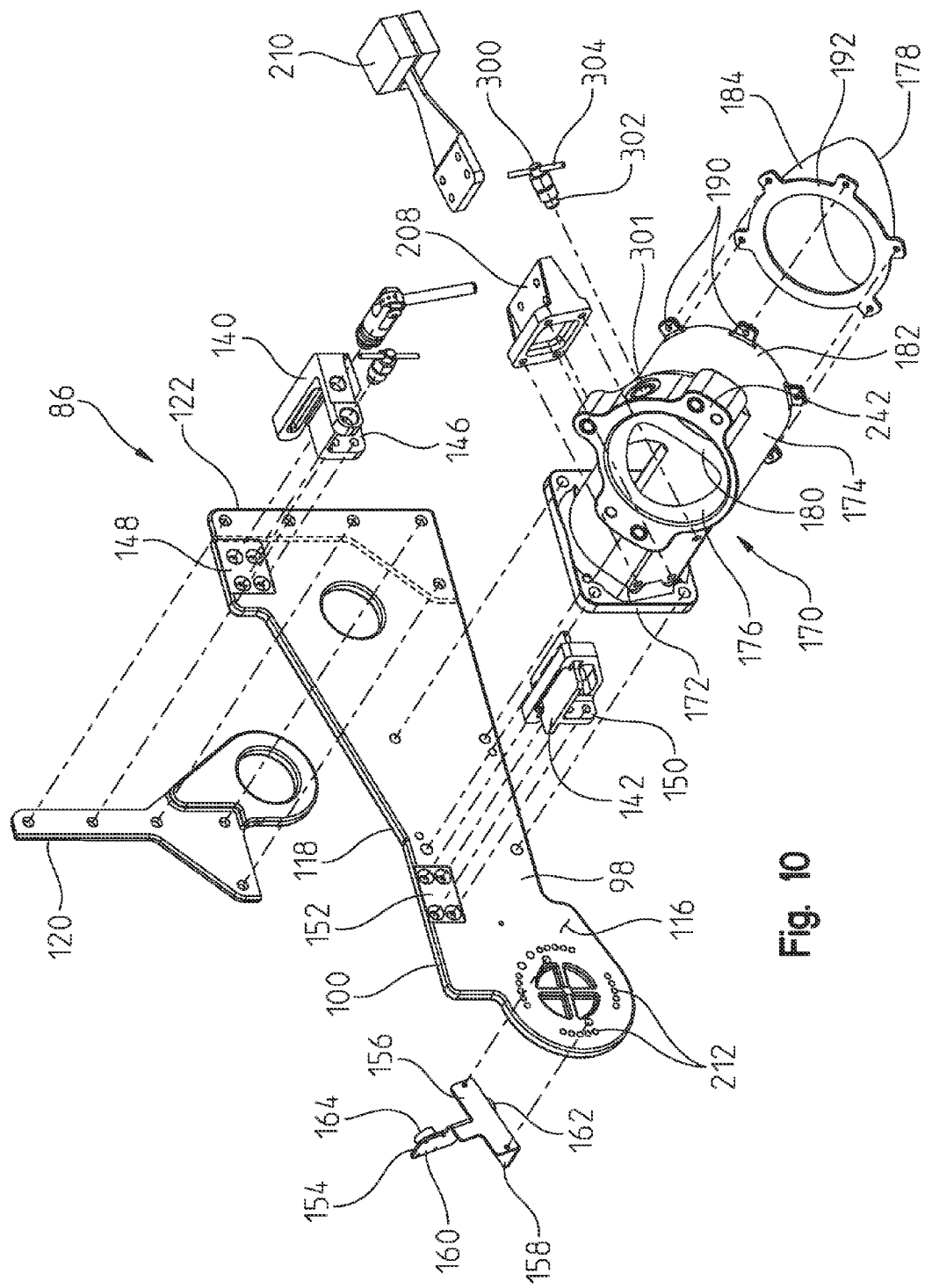
FIG. 10 is a rear, right side exploded perspective view of the base assembly of FIG. 9.

With reference to FIGS. 9 and 10, the mounting plate 100 includes a first side surface 116 and a second side surface 118. The first and second side surfaces 116 and 118 are illustratively substantial mirror images of each other such that the mounting plate 100 may be interchanged between the right side 16 and the left side 18 of the helicopter 14. A removable tiedown accessory bracket 120 is illustratively received within a recess 122 formed in the second side 118 of the plate 100 and secured thereto through conventional fasteners, such as bolts 124 and nuts 126 (FIGS. 5 and 6).

Figure 11:
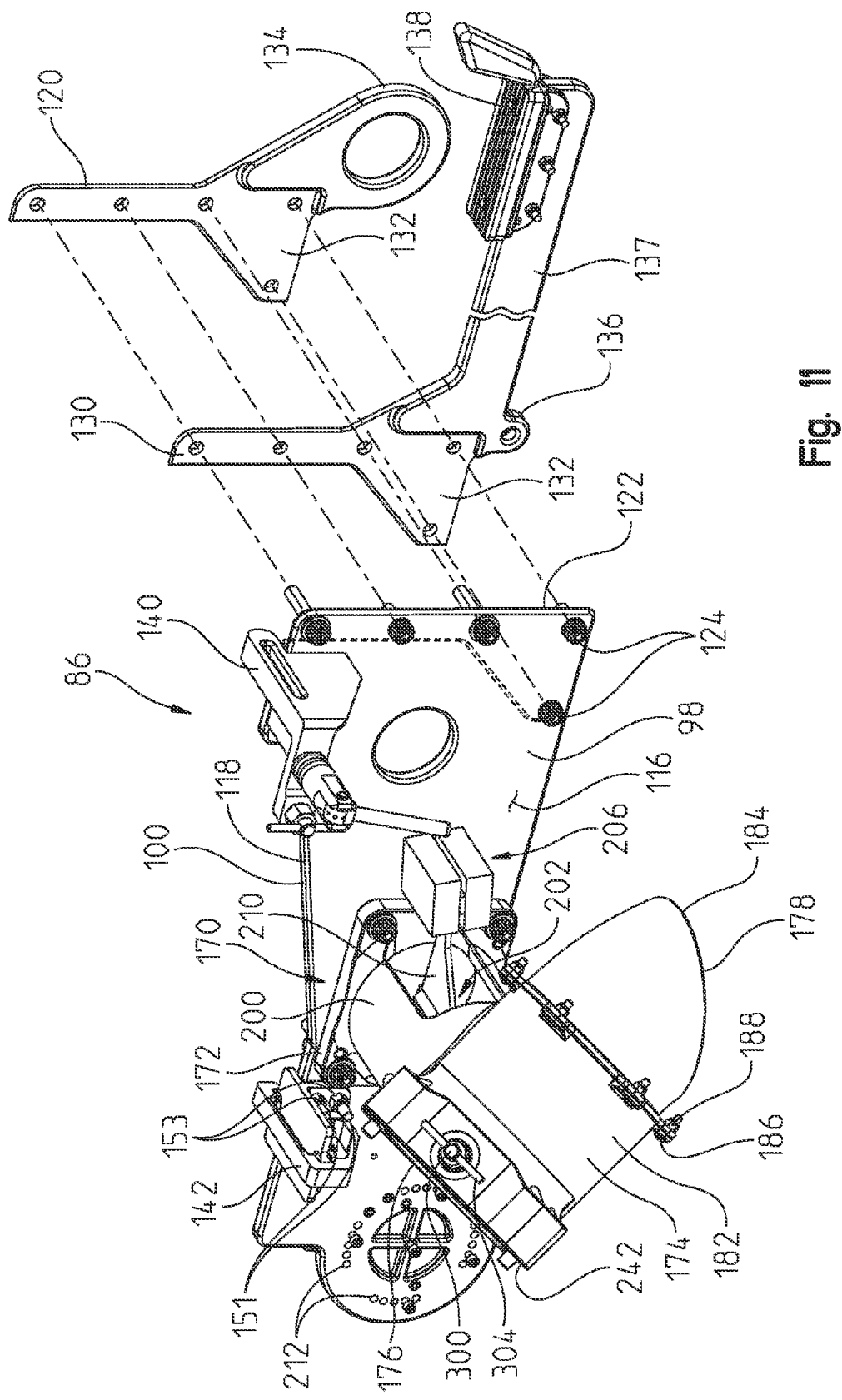
FIG. 11 is a perspective view of the base assembly of FIG. 9, showing interchangeable tiedown loops for helicopters configured with standard landing wheels and with arctic skis.

As shown in FIG. 11, an alternative removable tiedown accessory bracket 130 may alternatively be secured within recess 122 of the plate 100. Both removable tiedown accessory brackets 120 and 130 may alternatively be used as an attachment point for winching or securing (e.g., tiedown) the helicopter 14. The removable tiedown accessory bracket 120 is configured for use with the conventional landing gear structure of FIG. 1, while removable tiedown accessory bracket 130 is configured for use with the arctic landing gear configuration of FIG. 4. Removable tiedown accessory brackets 120 and 130 include a base 132 secured to the mounting plate 100 and a connector loop 134 and 136, respectively. The connector loop 136 of the removable tiedown accessory bracket 130 is smaller than the connector loop 134 of the removable tiedown accessory bracket 120 to provide additional clearance for the landing skis 52 of the arctic landing gear configuration of FIG. 4. The removable tiedown accessory bracket 130 may also include a longitudinally extending arm 137 supporting a step 138 for use by an individual entering or leaving the cabin of the helicopter 14. The extending arm 137 and step 138 are typically used only on the left side 18 of the helicopter 14 if the right side 16 of the helicopter 14 includes a refueling probe 39.

As shown in FIGS. 9 and 10, front mounting bracket 140 and a rear mounting bracket 142 are illustratively secured to the first side surface 116 of the mounting plate 100. As further detailed herein, the mounting brackets 140 and 142 are configured to couple ammunition canister 78 to the mounting plate 100. The mounting bracket 140 includes a base 146 received within a recess 148 formed in the first side surface 116 of the mounting plate 100 and secured thereto with conventional fasteners, such as bolts 147 and nuts 149 (FIGS. 5 and 6). The mounting bracket 142 includes a base 150 received within a recess 152 formed in the first side surface 116 of the plate 100 and secured thereto with conventional fasteners, such as bolts 151 and nuts 153 (FIGS. 5, 6, and 11). The mounting brackets 140 and 142 may be secured on the opposite second side of the plate 100 if secured to the left side 18 of the helicopter 14.

A cable bracket 154 is secured to the second side surface 118 of the plate 100 and is configured to store an electrical cable (not shown). The bracket 154 illustratively includes a base 156 supporting a substantially horizontal first tab 158 and a substantially vertical second tab 160. Electrical connectors or sockets 162 and 164 may be supported by the first and second tabs 158 and 160 of the bracket 154 to secure opposing ends of the stored electrical cable. The connectors 162 and 164 are oriented to prevent the accumulation of dirt or debris therein. A cable clamp or holder 166 (FIG. 8) is configured to secure electrical grounding straps (not shown) coupled to the helicopter 14.

A support 170 is illustratively coupled to the mounting plate 100 and includes a bracket 172 coupled to a base or receiver tube 174. The receiver tube 174 has an upper opening 176 and a lower exit opening 178 with a passageway 180 (FIG. 13) extending therebetween. In certain illustrative embodiments, the receiver tube 174 may be formed of multiple components to facilitate manufacturing thereof. For example, the receiver tube 174 may include an upper tube 182 secured to a lower tube 184 by bolts 186 and nuts 188 (FIG. 11) securing together cooperating tabs 190 and flange 192, respectively. The bracket 172 illustratively includes a base 194 secured to the first side surface 116 of the plate 100 through conventional fasteners, such as bolts 196 and nuts 198. The base 194 supports a tubular connector 200 coupling the base 194 to the upper tube 182 and including a forward opening 202.

With reference to FIG. 9, a traditional harmonic balancer 206 from the helicopter 14 is illustratively received within the bracket 172. More particularly, the harmonic balancer 206 includes a bracket 208 received within the tubular connector 200 and having an arm 210 extending through opening 202 in the connector 200. The rear end of the plate 100 may also include a plurality of circumferentially spaced mounting apertures 212 that may receive fasteners to secure a flare dispenser (not shown) to the base assembly 86.

Figure 12:
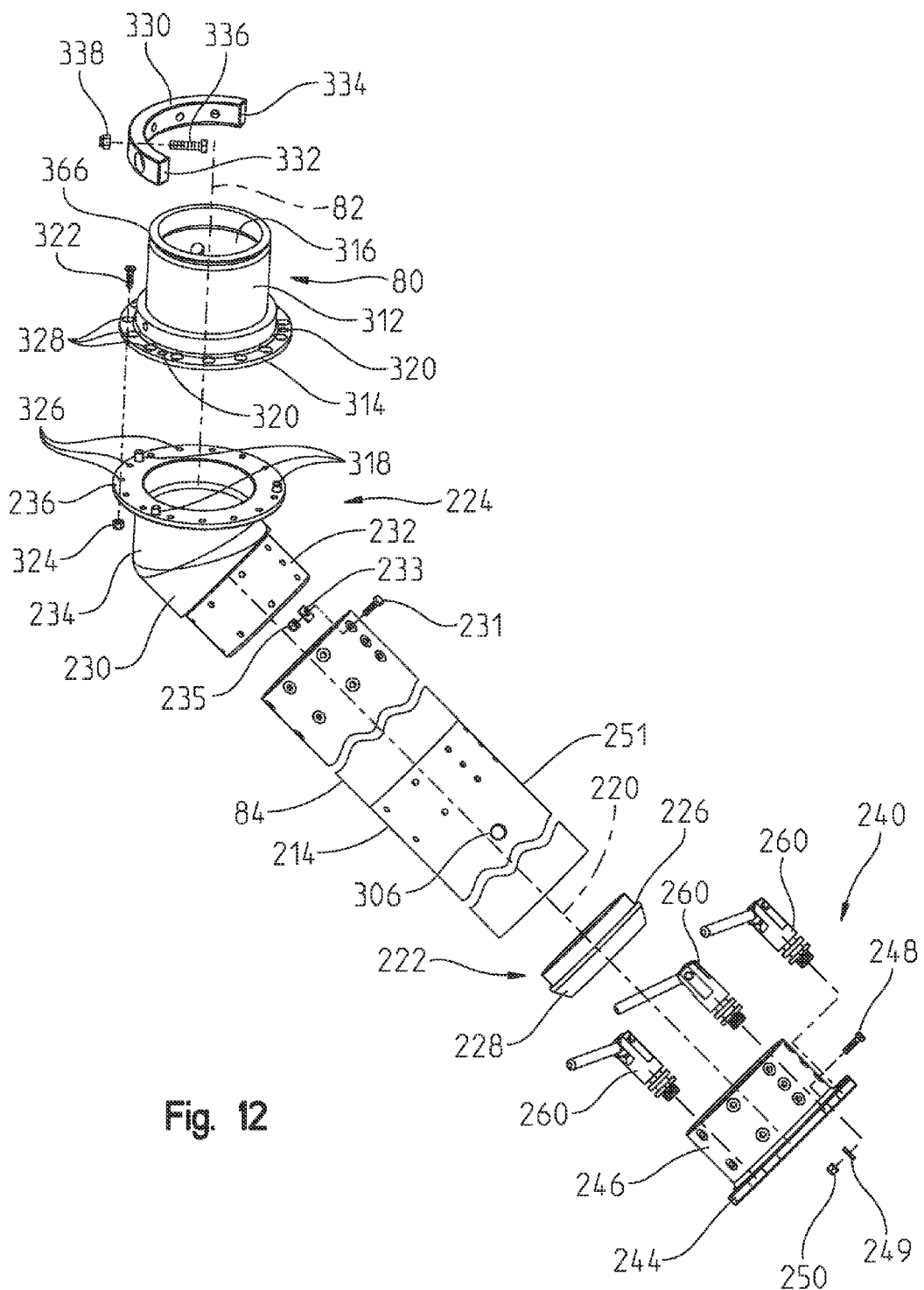
FIG. 12 is an exploded perspective view of the support post and the pintle of the weapon mounting system of FIG. 5.

Referring now to FIGS. 7, 8, 12, and 13, the support post 84 includes a cylindrical side wall 214 defining a passageway 216. The support post 84 extends longitudinally along a rearwardly inclined axis 220 between a lower end 222 and an upper end 224 (FIG. 12). The lower end 222 illustrative includes an adapter 226 having a chamfered leading edge 228 to assist in guiding insertion into the receiver tube 174. The upper end 224 includes an adapter 230 having a lower portion 232 aligned with inclined axis 220 and an upper portion 234 aligned with azimuth axis 82. The lower portion 232 of adapter 230 is secured to the support post 84 by conventional fasteners, such as bolts 231, washers 233, and nuts 235. The upper portion 234 of adapter 230 includes a mounting flange 236.

A base coupler 240 secures the support post 84 to the receiver tube 174. More particularly, the base coupler 240 includes a lower flange 242 supported by the receiver tube 174 and an upper flange 244 supported by the support post 84. The lower flange 242 extends radially outwardly from the receiver tube 174 and may be integrally formed therewith. The upper flange 244 is illustratively supported by a collar 246 secured to the support post 84 by conventional fasteners, such as bolts 248, washers 249, and nuts 250 (FIG. 12). The collar 246 is secured intermediate the lower and upper ends 222 and 224 of the support post 84 such that a lower portion 251 of the support post 84 is concentrically received within the receiver tube 174 when coupled thereto. Locating pins 252 may extend upwardly from the lower flange 242 for receipt within openings 254 of the upper flange 244 to facilitate proper orientation of the support post 84 relative to the receiver tube 174. A primary lock includes a plurality of securing devices 260 that couple the upper flange 244 to the lower flange 242. While coaxial insertion of lower portion 251 within receiver tube 174 assists during assembly, in other embodiments different conventional couplers (e.g., flanged mounts without coaxial insertion) may be utilized. In yet other embodiments, the support post 84 may be integrally formed with receiver tube 174.

Figure 14:
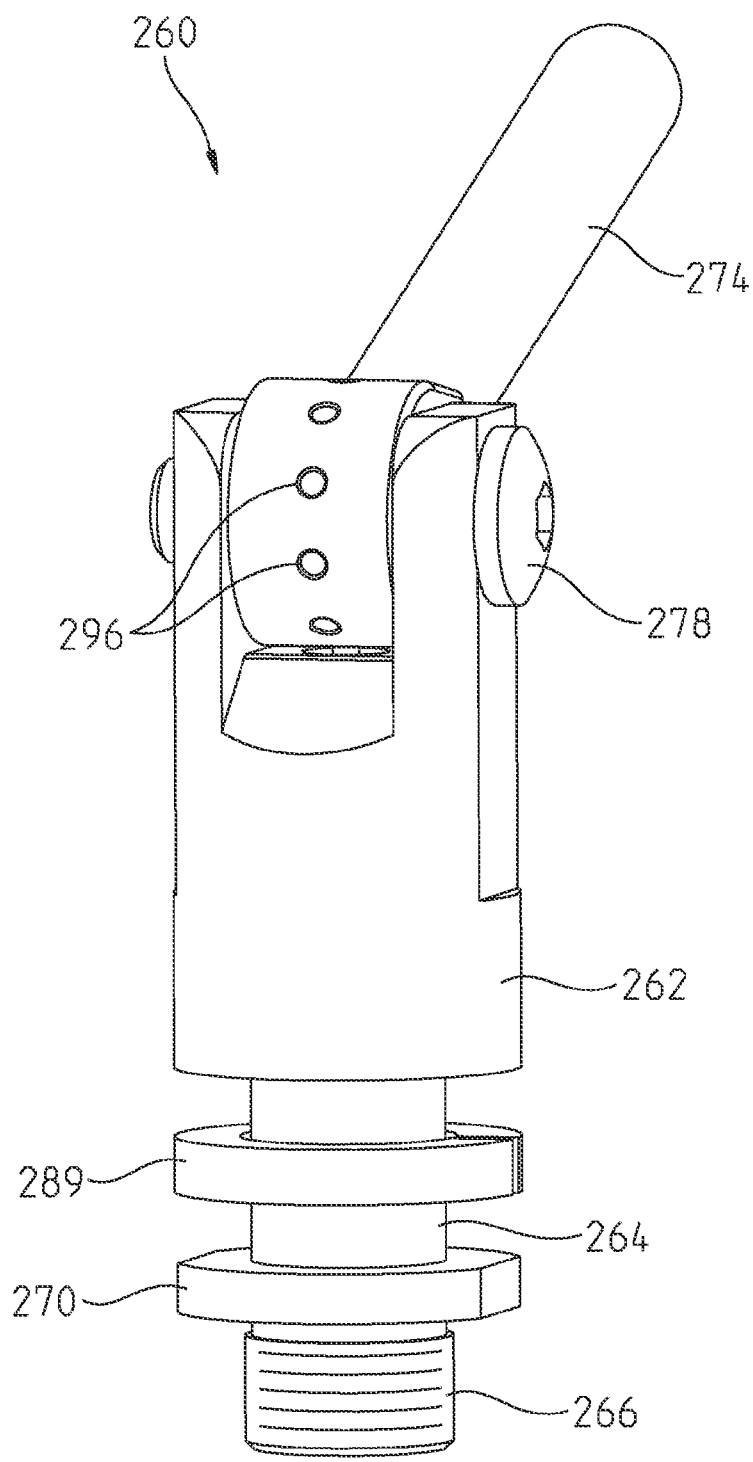
FIG. 14 is a detailed perspective view of an illustrative securing device of the weapon mounting system of FIG. 5.
Figure 15:
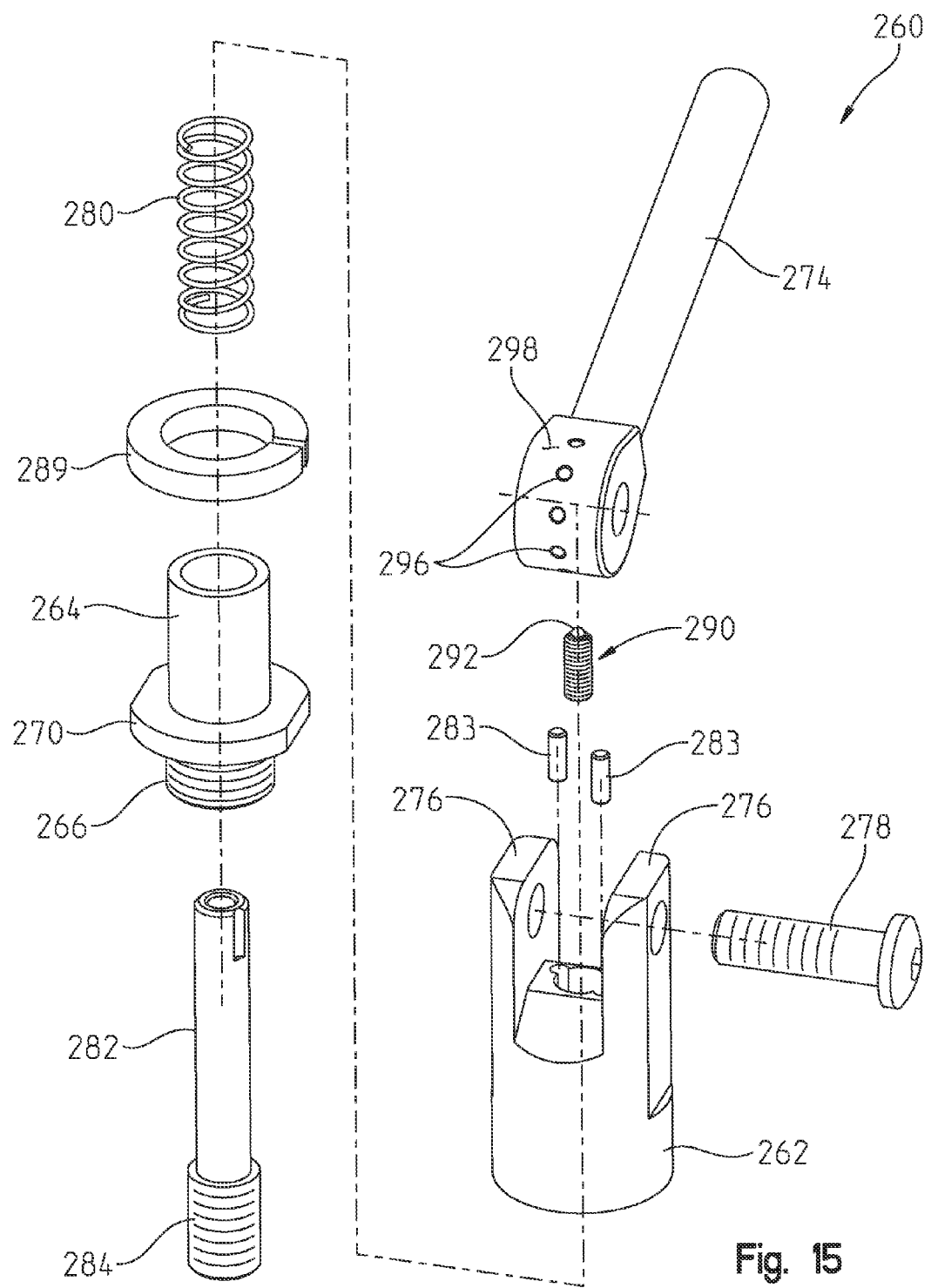
FIG. 15 is an exploded perspective view of the securing device of FIG. 14.
Figure 16:
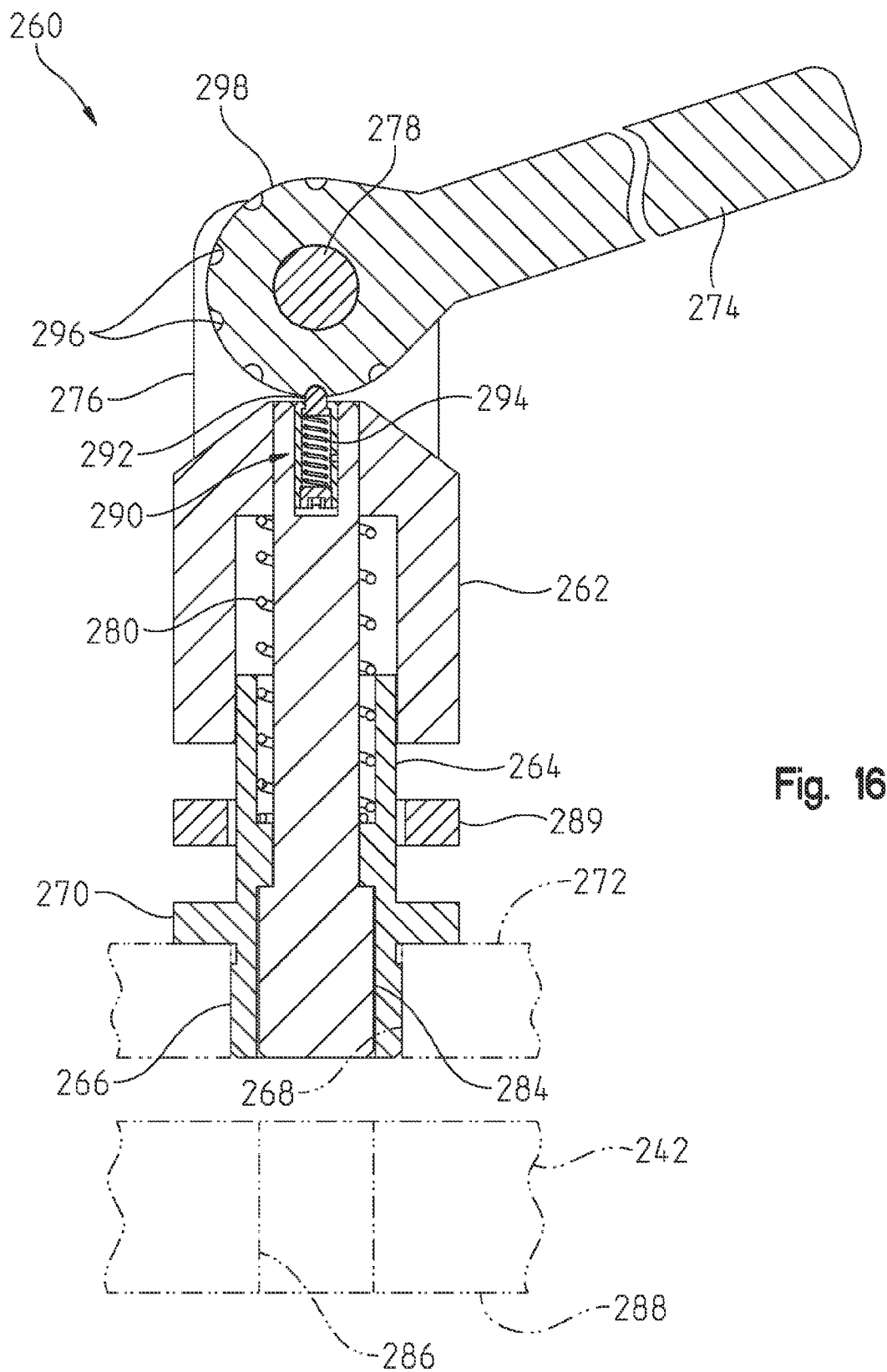
FIG. 16 is a cross-sectional view of the illustrative securing device of FIG. 14.

With reference to FIGS. 14-16, the securing devices 260 each illustratively include an upper housing 262 supported for rotation relative to a lower housing 264. The lower housing 264 includes a lower end supporting a plurality of external threads 266 that are configured to engage a plurality of internal threads 268 in the upper flange 244. A flange 270 is supported above the external threads 266 and defines a stop for engaging the upper surface 272 of the flange 244. The lower end of the upper housing 262 is pined to an upper end of the lower housing 264. A handle 274 is pivotably supported by the upper end of the upper housing 262. More particularly, the upper end of the upper housing 262 includes a pair of spaced apart arms 276 supporting a pin or bolt 278 about which the handle 274 pivots. A spring 280 biases the upper housing 262 from the lower housing 264 and receives a securing rod 282. The upper end of the securing rod 282 is secured to the upper housing 262, illustratively through pins 283, to rotate therewith. The lower end of the securing rod 282 includes a plurality of external threads 284 configured to engage internal threads 286 in the mounting apertures 288 of the flange 242. A lock washer 289 is positioned intermediate the lower end of the upper housing 262 and the flange 270 of the lower housing 264.

A detent mechanism 290 is supported by the upper end of the securing rod 282 and cooperates with the handle 274. The detent mechanism 290 includes a pin 292 biased by a spring 294 into engagement within depressions or recesses 296 spaced in arcuate base surface 298 of the handle 274. The detent mechanism 290 maintains the handle 274 in a desired angular position relative to the upper housing 262, thereby preventing undesired pivoting movement in response to movement (e.g., vibration, air flow, etc.) of the helicopter 14.

With reference to FIGS. 9-11, the base coupler 240 also includes a secondary lock 300 illustratively supported within an opening 301 formed within the receiver tube 174 of the base assembly 86. The secondary lock 300 illustratively includes a spring biased pin 302 operably coupled to a handle 304 that may be releasably received within an opening 306 of the support post 84 (FIG. 12). Pulling the handle 304 causes the pin 302 to move against the spring bias and disengage from the opening 306. The chamfered leading edge 228 of the support post 84 assists in assembly within receiver tube 174 by pushing the pin 302 outwardly against the spring bias during insertion of the support post 84 until the pin 302 engages within opening 306.

Figure 13:
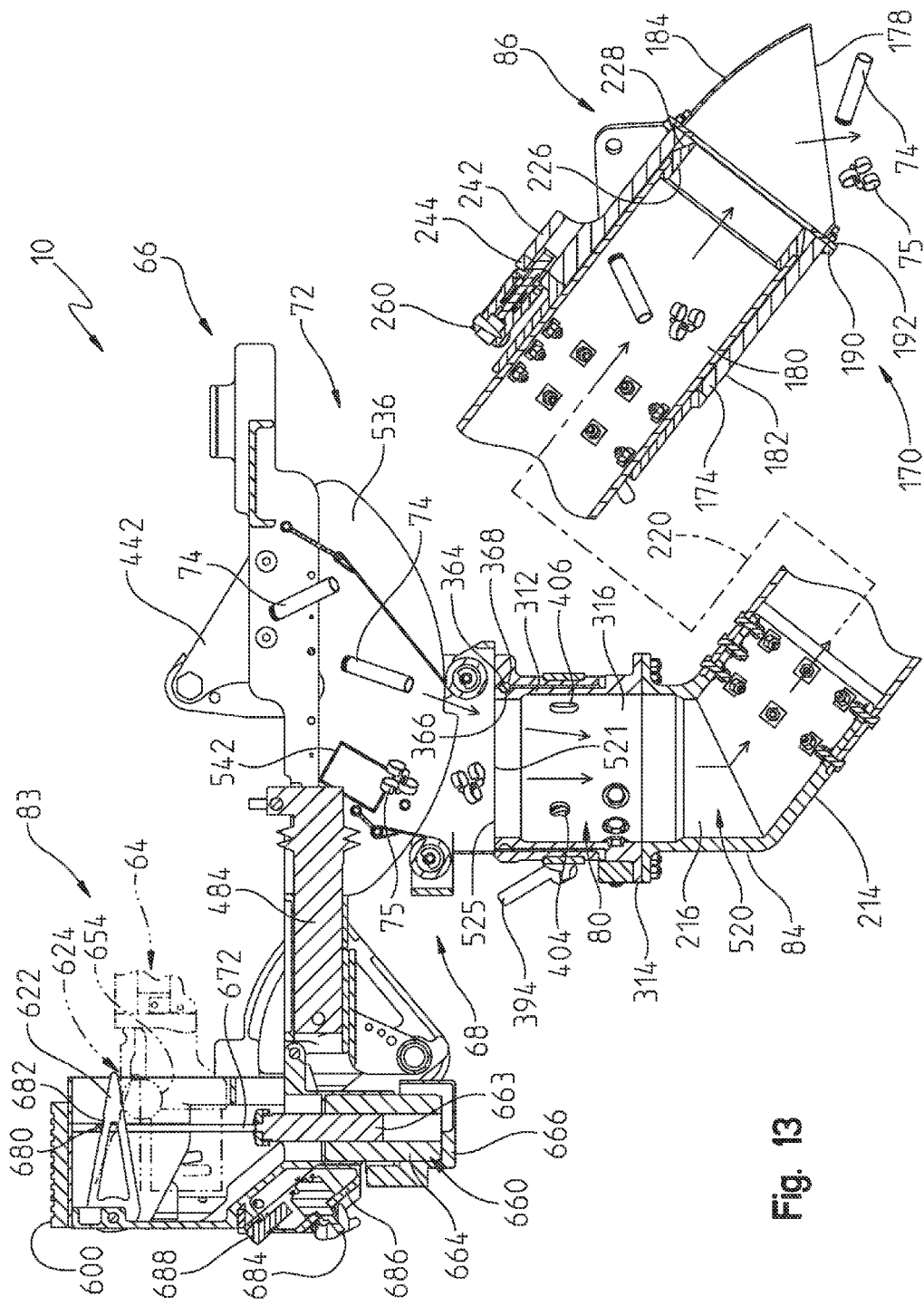
FIG. 13 is the cross-sectional view, with a partial cutaway, of the weapon mounting system of FIG. 5.

As shown in FIGS. 12 and 13, pintle 80 is supported by the upper end of the support post 84. The pintle 80 is illustratively formed of stainless steel and includes a cylindrical side wall 312 and a lower mounting flange 314 coupled to the upper mounting flange 236 of the support post 84. The side wall 312 defines a passageway 316 in communication with the passageway 216 of the support post 84. Locating pins 318 of the upper mounting flange 236 of the support post 84 are received within cooperating openings 320 in the lower mounting flange 314 to rotationally orient the pintle 80 relative to the support post 84. A plurality of fasteners, such as bolts 322 and nuts 324 pass through openings 326 and 328 of the mounting flanges 236 and 314, respectively, to secure the upper mounting flange 236 to the lower mounting flange 314.

Figure 19:
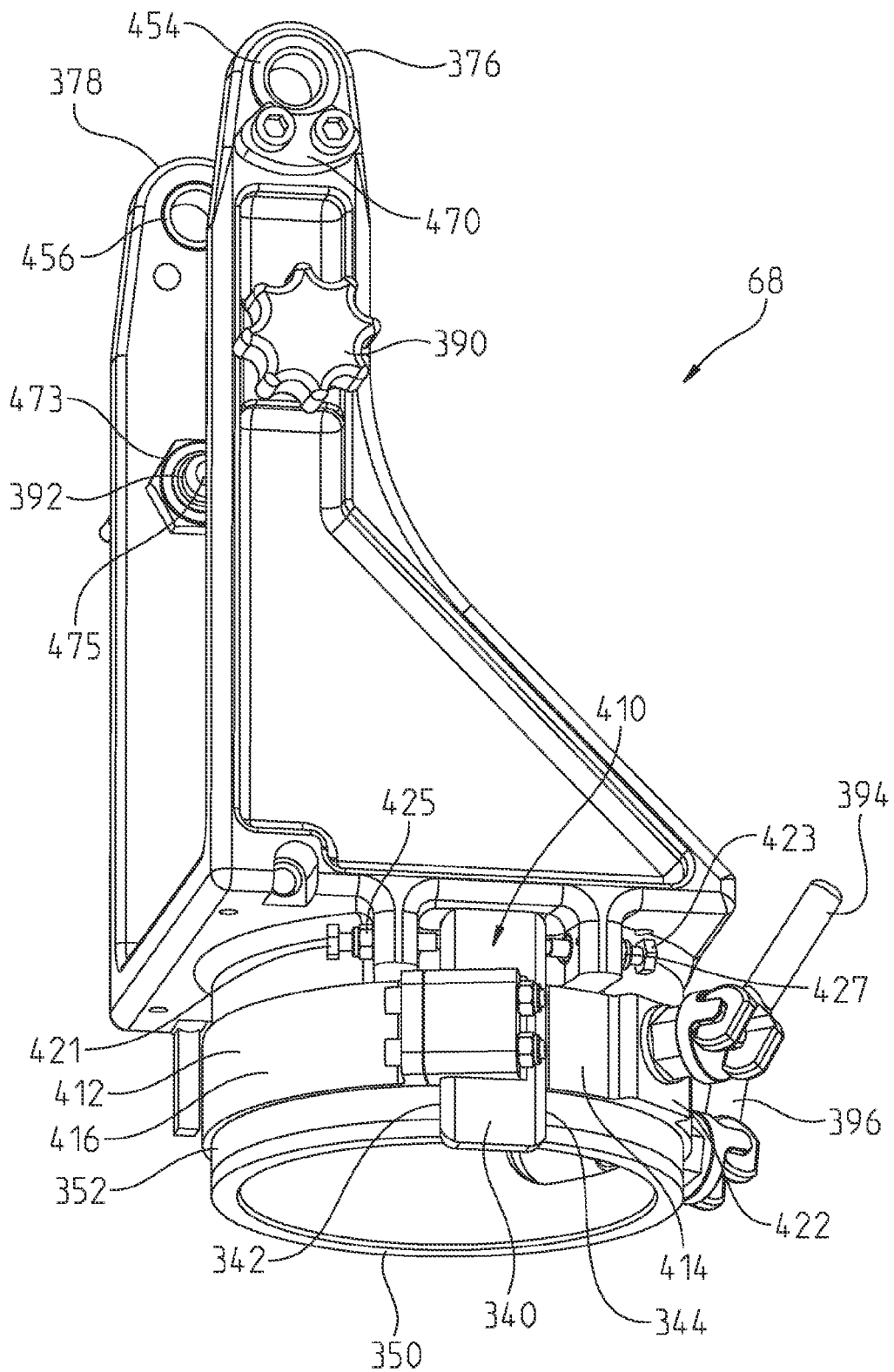
FIG. 19 is a perspective view of the carriage of the weapon mounting system of FIG. 1

An arcuate azimuth stop member 330 includes clockwise and counterclockwise stop surfaces 332 and 334. The stop member 330 is positioned radially outwardly from the side wall 312 of the pintle 80 and is supported above the mounting flange 314. A plurality of conventional fasteners, such as bolts 336 and nuts 338, may secure the stop member 330 to the pintle 80. The opposing stop surfaces 332 and 334 are configured to limit rotation of the carriage 68 about the azimuth axis 82. More particularly, the stop surfaces 332 and 334 of the stop member 330 cooperate with opposing surfaces 342 and 344 of a cooperating projection 340 supported for rotation with the carriage 68 (FIG. 19). As may be appreciated, the stop member 330 may be easily removed and replaced with a different stop member, for example, if worn or damaged. The stop member 330 may also be replaced with another stop member with different spacing between stop surfaces 332 and 334 if different rotational travel limits about the azimuth axis 82 are desired to provide different fields of fire.

Figure 17:
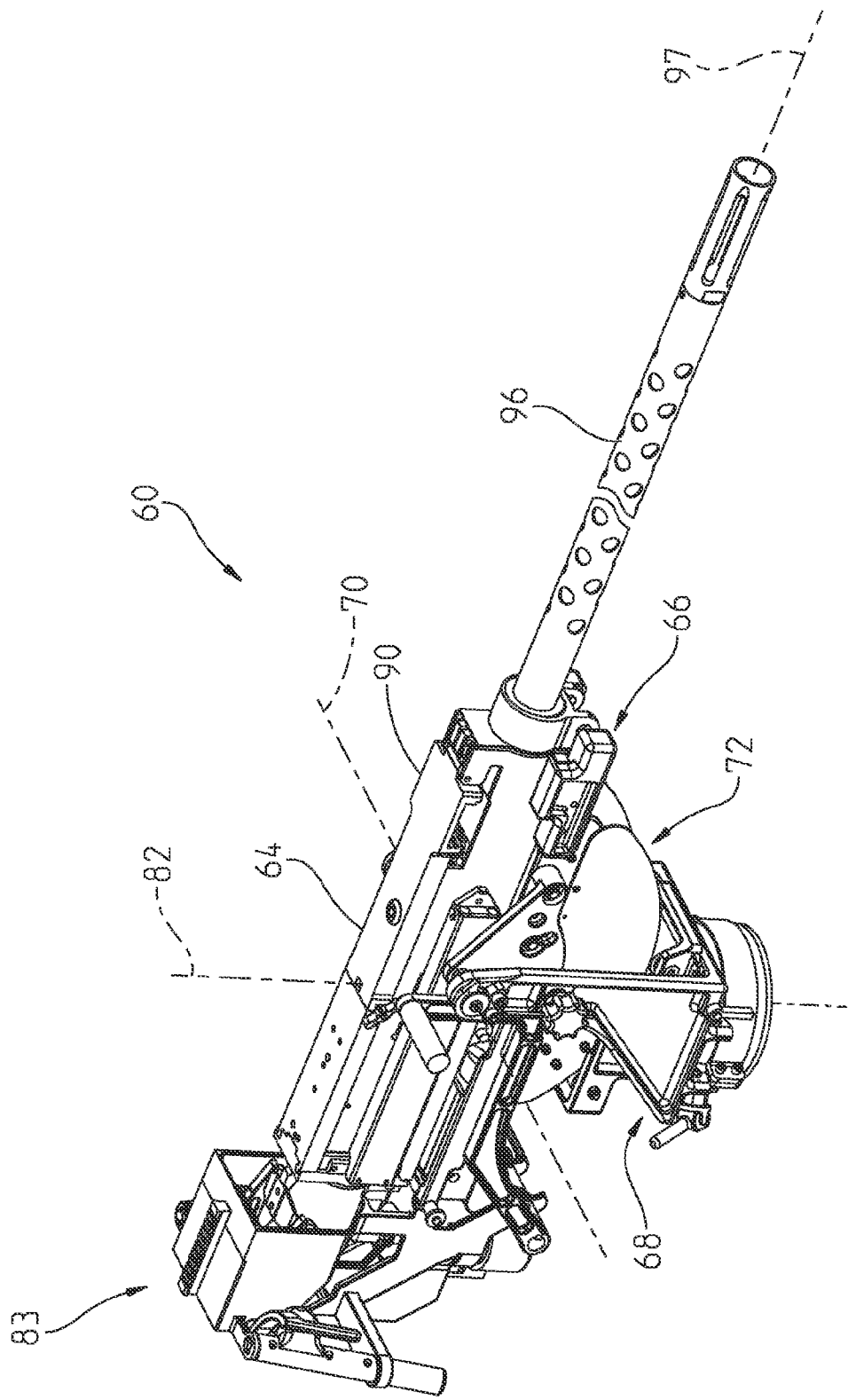
FIG. 17 is a perspective view of the upper portion of the weapon mounting system of FIG. 1 supporting a machine gun.
Figure 18:
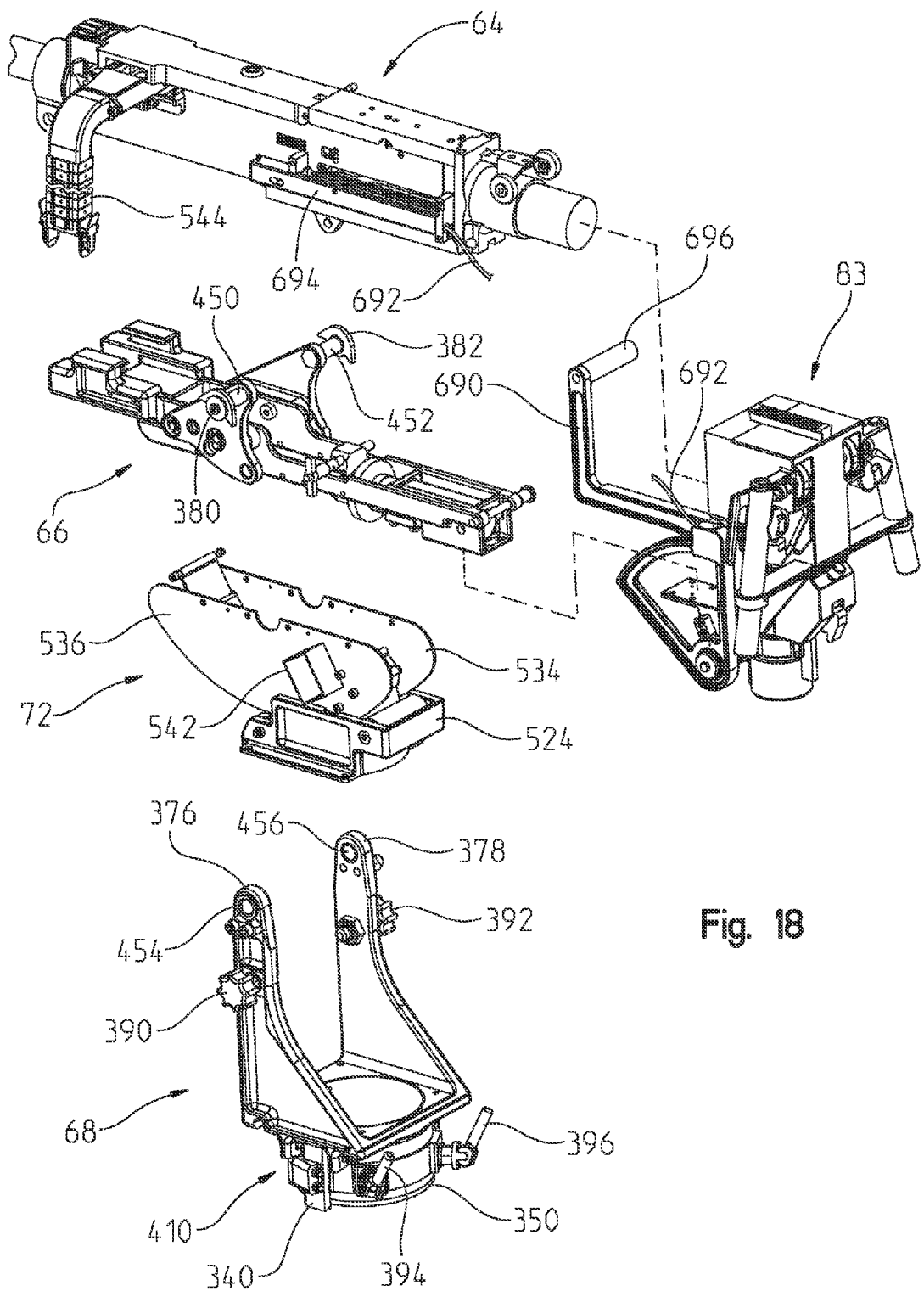
FIG. 18 is an exploded perspective view of the weapon mounting system of FIG. 17, showing the carriage, the weapon cradle, the ejection collection device, the trigger assembly, and the machine gun.

With reference to FIGS. 17 and 18, the upper portion 60 of the weapon mounting system 10 includes the carriage 68, the weapon cradle 66, the ejection collection device 72, and the trigger assembly 83. The carriage 68 rotates relative to the pintle 80 about azimuth axis 82, while the weapon cradle 66 rotates relative to the carriage 68 about elevational axis 70. The ejection collection device 72 is supported by the weapon cradle 66 to collect and eject spent shell casings 74 and links 75 from the machine gun 64. The trigger assembly 83 is supported by the weapon cradle 66 and is configured to actuate the machine gun 64 in both the gunner manual mode of operation and the pilot remote electrical mode of operation.

With reference now to FIGS. 13, 19, 20, and 27, the carriage 68 illustratively includes a base 350 rotatably receiving the pintle 80. Rotation between the carriage 68 and the pintle 80 permits the machine gun 64 to rotate relative to the pintle 80 about generally vertical azimuth axis 82. The base 350 illustratively includes an outer cylindrical side wall 352 concentrically receiving the cylindrical side wall 312 of the pintle 80. Elongated openings 353 and 355 are formed within the side wall 352. An inner cylindrical sleeve 360 is concentrically received intermediate the side wall 352 of the base 350 and the side wall 312 of the pintle 80. Elongated openings 361 and 363 are formed within the sleeve 360 and are aligned with corresponding elongated openings 353 and 355 of the base 350.

Figure 20:
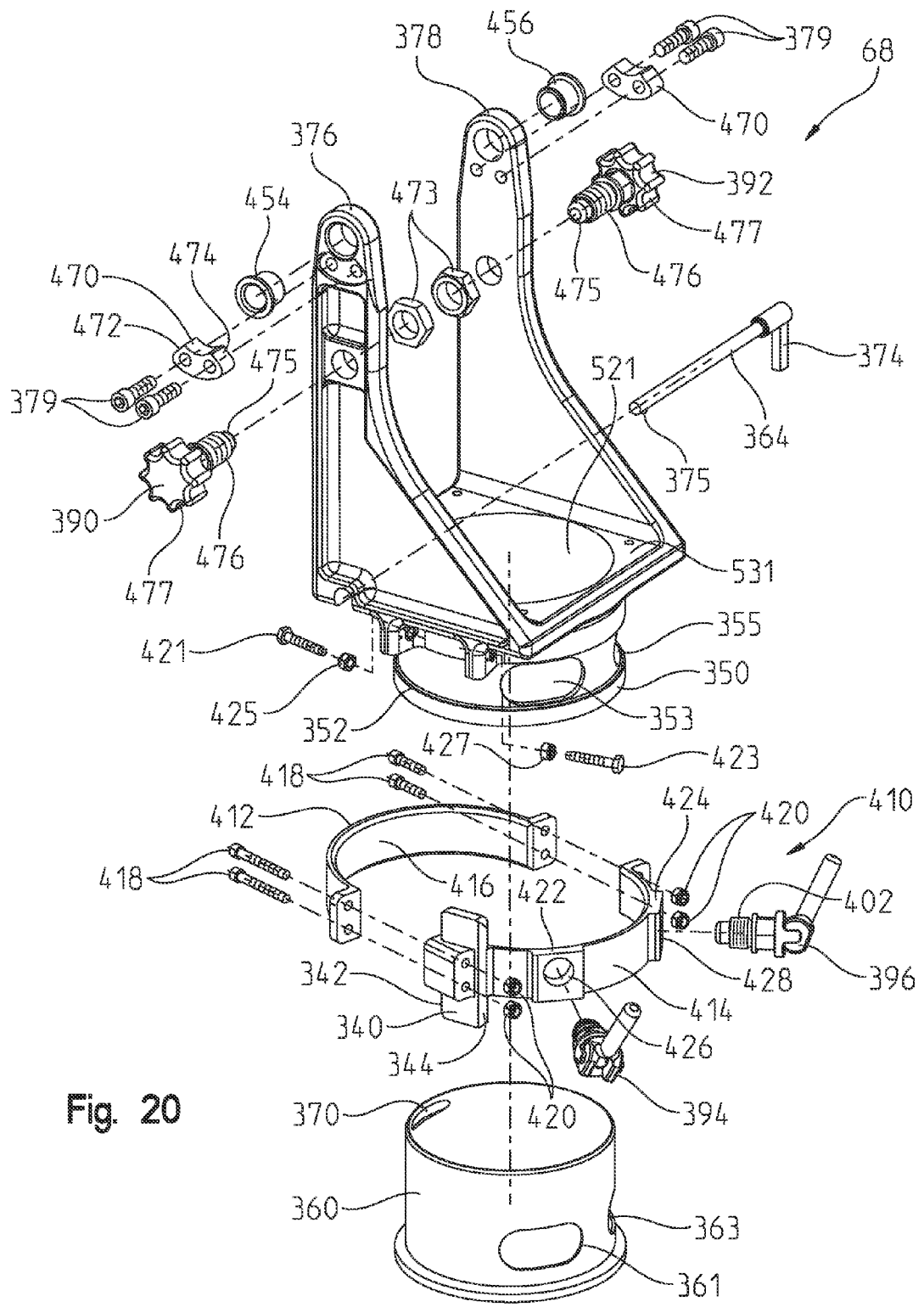
FIG. 20 is an exploded perspective view of the carriage of FIG. 19.
Figure 27:
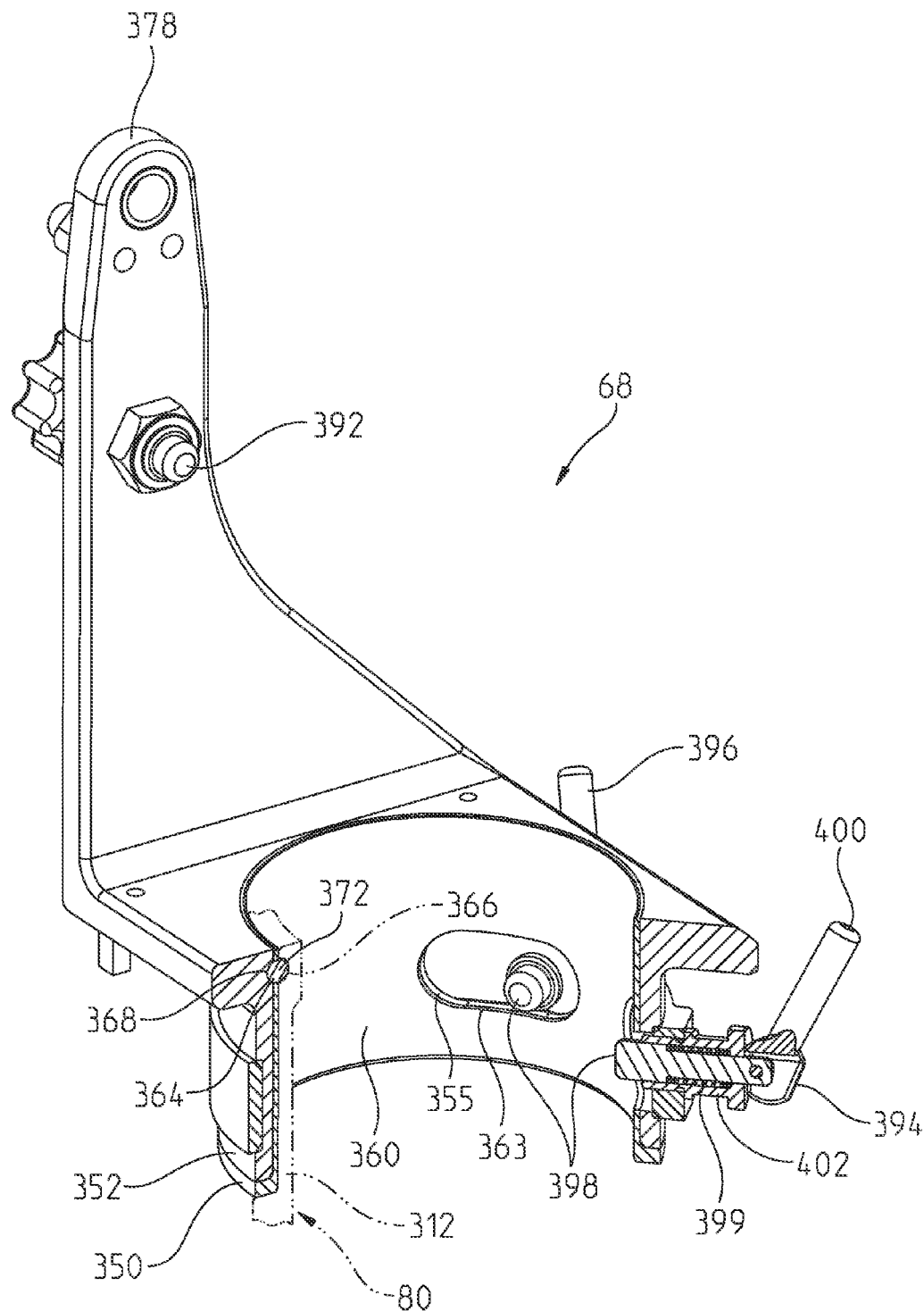
FIG. 27 is a perspective view, in partial cross section, of the carriage coupled to the pintle.

Referring now to FIGS. 13, 20, and 27, a coupling pin 364 extends between the cylindrical side wall 312 of the pintle 80 and the cylindrical side wall 352 of the base 350. More particularly, the pin 364 is received intermediate a radially outwardly facing annular groove 366 formed in the pintle 80 and an opposing radially inwardly facing groove 368 formed in the base 350. An elongated clearance opening 370 is formed in the sleeve 360 and receives the pin 364, thereby securing the sleeve 360 to the base 350. The pin 364 defines a chord 372 extending within the opening 370 defined by the sleeve 360 and received within the annular groove 366 of the pintle 80 and groove 368 of the base 350, thereby axially securing the carriage 68 to the pintle 80 while permitting rotational movement therebetween. Illustratively, a first end of the pin 364 includes a handle 374 and the second end includes a ball detent 375 (FIG. 20) for retaining the pin 364 in position.

As shown in FIGS. 18-20, first and second arms 376 and 378 extend upwardly from the base 350 of the carriage 68 and receive the weapon cradle 66 therebetween. As further detailed herein, pivot couplings 380 and 382 operably couple the weapon cradle 66 to the arms 376 and 378 for pivoting movement about elevational axis 70. Locking pins 390 and 392 are also provided to secure the weapon cradle 66 in a desired elevational position about elevational axis 70.

The base 350 of the carriage 68 supports first and second locking pins 394 and 396 configured to secure the carriage 68 in a desired angular position about azimuth axis 82. The first locking pin 394 is angularly offset counterclockwise (illustratively by 75 degrees) from the second locking pin 396 for ergonomic considerations. More particularly, the gunner may utilize the most convenient locking pin 394, 396 (e.g., inboard toward the gunner's window 32) to secure the carriage 68 in position.

As shown in FIG. 27, the locking pins 394 and 396 each illustratively include a shaft 398 biased by a spring 399, operably coupled to a handle 400, and slidably received within a housing 402. When the handle 400 is rotated to a position parallel to the shaft 398, the shaft 398 is retracted (i.e., pulled outwardly) against the bias of the spring 399. When the handle 400 is rotated to a position substantially perpendicular to the shaft 398, the shaft 398 is extended (i.e., pushed inwardly) as a result of the bias of the spring 399. In the extended position, the shaft 398 of one of the locking pins 394, 396 may be inserted into an opening 404, 406 formed in the side wall 312 of the pintle 80 (FIG. 13), thereby rotationally locking the carriage 68 to the pintle 80.

With reference to FIGS. 19 and 20, a bore sight adjustment device 410 is supported by the base 350 of the carriage 68 and cooperates with the locking pins 394 and 396 and the stop projection 340. The bore sight adjustment device 410 may be used to align the azimuth limit stops defined by engagement between the stop member 330 and the projection 340, and azimuth locked positions of the carriage 68 defined by receipt of locking pins 394 and 396 within openings 404 and 406 of the pintle 80. More particularly, the bore sight adjustment device 410 is configured to angularly adjust the stop projection 340 and the locking pins 394 and 396 relative to the side wall 352 of the carriage 68. The bore sight adjustment device 410 includes an annular band 412 including a first arcuate portion 414 coupled to a second arcuate portion 416. A first end of the first arcuate portion 414 is secured to a first end of the second arcuate portion 416 through conventional fasteners, such as bolts 418 and nuts 420. Similarly, a second end of the first arcuate portion 414 is secured to a second end of the second arcuate portion 416 through conventional fasteners, such as bolts 418 and nuts 420.

With reference to FIGS. 12, 19, and 20, the stop projection 340 is supported by the first arcuate portion 414 of the band 412 and includes radially outwardly projecting first and second stop surfaces 342 and 344. The first stop surface 342 is configured to engage with the first stop surface 332 of the azimuth stop member 330 to define a first azimuth limit stop (e.g., clockwise rotation stop) of the carriage 68, while the second stop surface 344 is configured to engage with the second stop surface 334 of the azimuth stop member 330 to define a second azimuth limit stop (e.g., counterclockwise rotation stop) of the carriage 68. Illustratively, the rotational travel limit of the carriage 68 between stop surfaces 332 and 334 is approximately 175 degrees. As detailed above, the rotational travel limit may be simply modified by replacing the azimuth stop member 330 with a different stop member having differently positioned limit stop surfaces 332 and 334.

The first and second locking pins 394 and 396 are supported within mounting members 422 and 424 supported by the first arcuate portion 414 of the band 412 of the bore sight alignment device 410. The mounting members 422 and 424 including openings 426 and 428, respectively. In one illustrative embodiment, the housing 402 of each locking pin 394, 396 may be threadably received within the respective openings 426, 428.

Opposing adjustment screws 421, 423 and nuts 425, 427 are configured to adjust the position of the stop projection 340 and the locking pins 394 and 396. More particularly, rotating screw 421 clockwise and screw 423 counterclockwise will rotate the band 412 in a first direction relative to base 350 of the carriage 68, while the rotation the screw 421 counterclockwise and screw 423 clockwise will rotate the band 412 in a second direction relative to base 350 of the carriage 68. As may be appreciated, the stop projection 340 and the locking pins 394 and 396 move concurrently with the band 412.

FIGS. 28-31 illustrate different angular positions of the carriage 68 about the azimuth axis 82 relative to the pintle 80. The longitudinal weapon axis 97 of the machine gun 64 is shown relative to the pintle 80, wherein the firing or forward direction of the barrel 96 of the machine gun 64 is represented by arrow 429.

Figure 28:
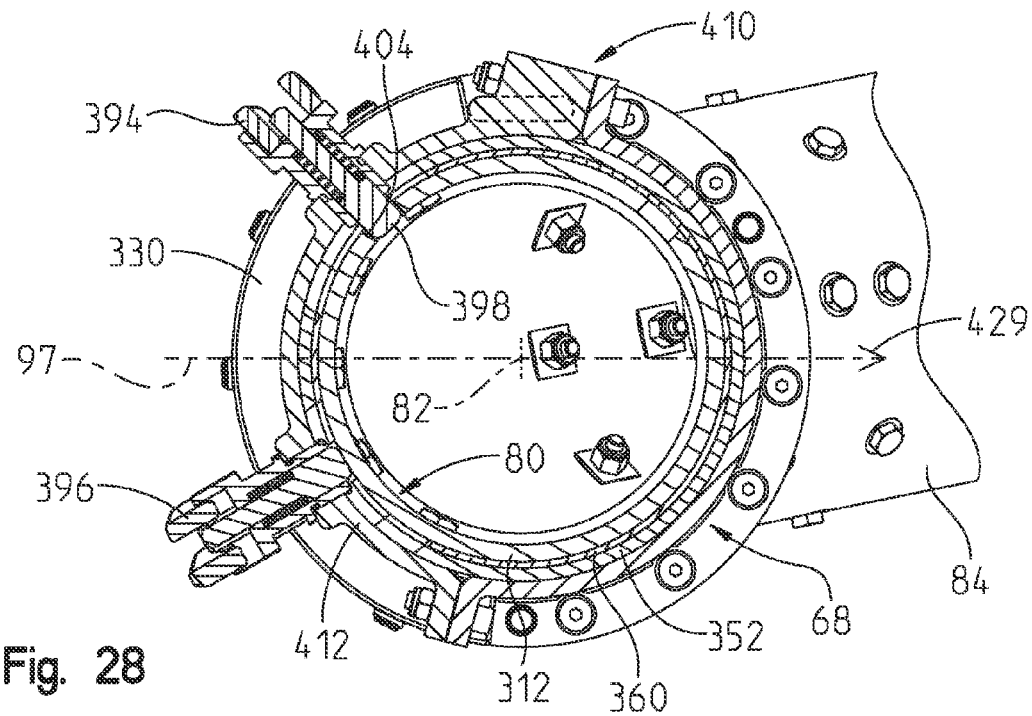
FIG. 28 is a cross sectional view showing the carriage in a first orientation relative to the pintle.

FIG. 28 shows the carriage 68 in a first angular position wherein the machine gun 64 is in a fixed forward position. In this position, the first locking pin 394 is received within first opening 404 of the pintle 80, the longitudinal weapon axis 97 of the machine gun 64 is substantially parallel to the longitudinal axis 20 of the helicopter 14, and the barrel 96 is directed to the front end 22 of the helicopter 14. In certain illustrative embodiments, the axis 97 may be slightly angled outwardly (e.g., 2 to 3 degrees) from the helicopter axis 20. As detailed above, the bore sight adjustment device 410 may be utilized to set this position (and the positions of FIGS. 29-31). More particularly, manipulation of the adjustment screws 421 and 423 will adjust the relative angular position of the locking pins 394, 396 relative to the carriage 68, and thus the weapon cradle 66 and machine gun 64.

Figure 29:
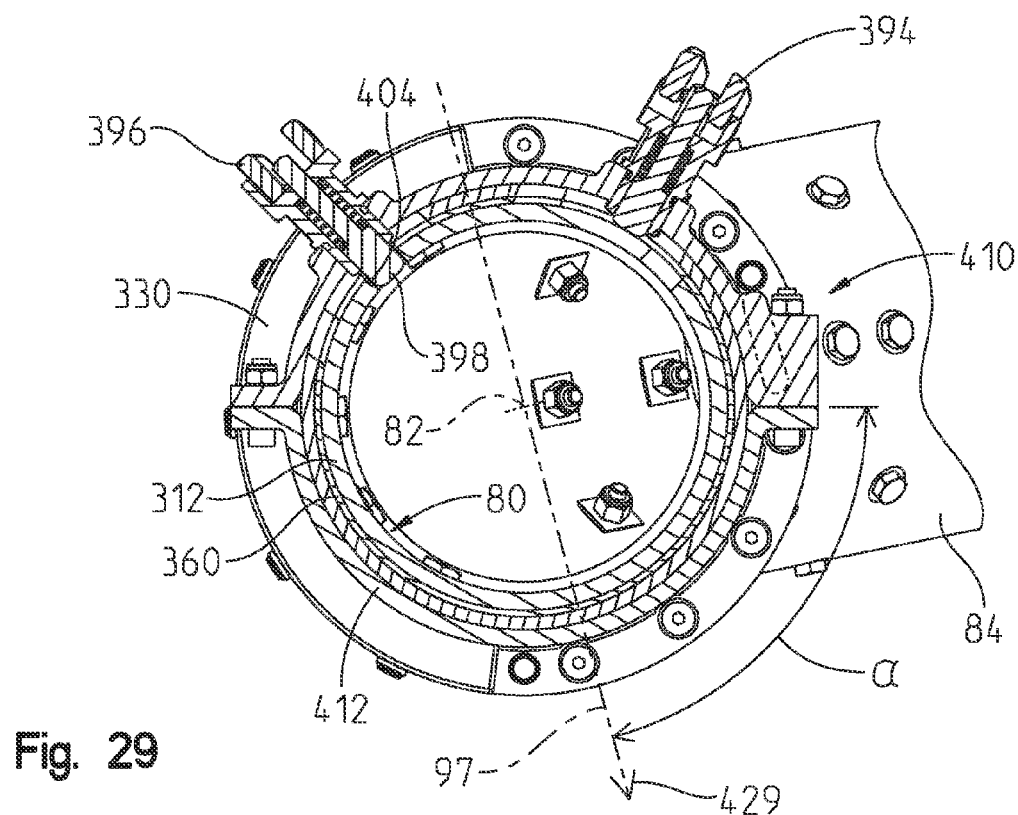
FIG. 29 is a cross-sectional view similar to FIG. 28, showing the carriage rotated about an azimuth axis to a second angular orientation relative to the pintle.

FIG. 29 shows the carriage 68 in a second angular position about the azimuth axis 82 relative to the pintle 80, where the machine gun 64 is rotated by an angle α (illustratively approximately 75 degrees) clockwise from the fixed forward position of FIG. 28. In this position, the second locking pin 396 is received within the first opening 404 of the pintle 80, and the machine gun barrel 96 extends outwardly from the helicopter 14 by approximately 75 degrees from the longitudinal axis 20 of the helicopter 14.

Figure 30:
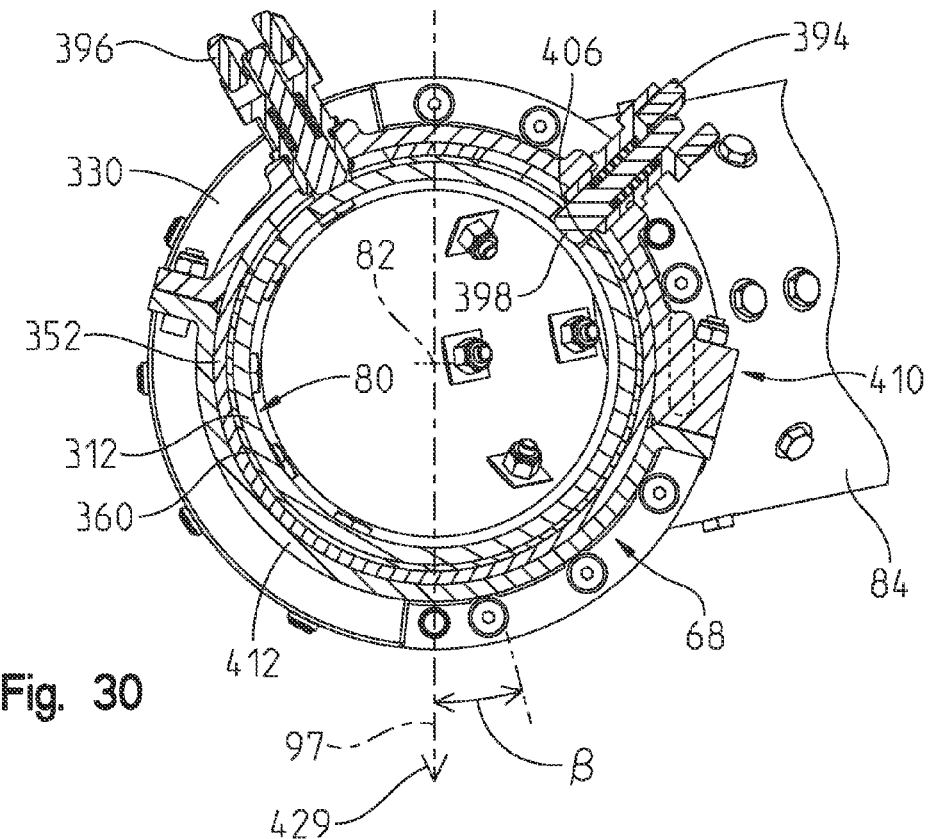
FIG. 30 is a cross sectional view similar to FIG. 28, showing the carriage rotated about an azimuth axis to a third angular orientation relative to the pintle.

FIG. 30 shows the carriage 68 in a third angular position about the azimuth axis 82 relative to the pintle 80, where the machine gun 64 is rotated by an angle β (illustratively approximately 15 degrees) clockwise from the second angular position of FIG. 29. In this position, the first locking pin 394 is received within the second opening 406 of the pintle 80, and the machine gun barrel 96 extends outwardly from the helicopter 14 by approximately 90 degrees from the longitudinal axis 20 of the helicopter 14.

Figure 31:
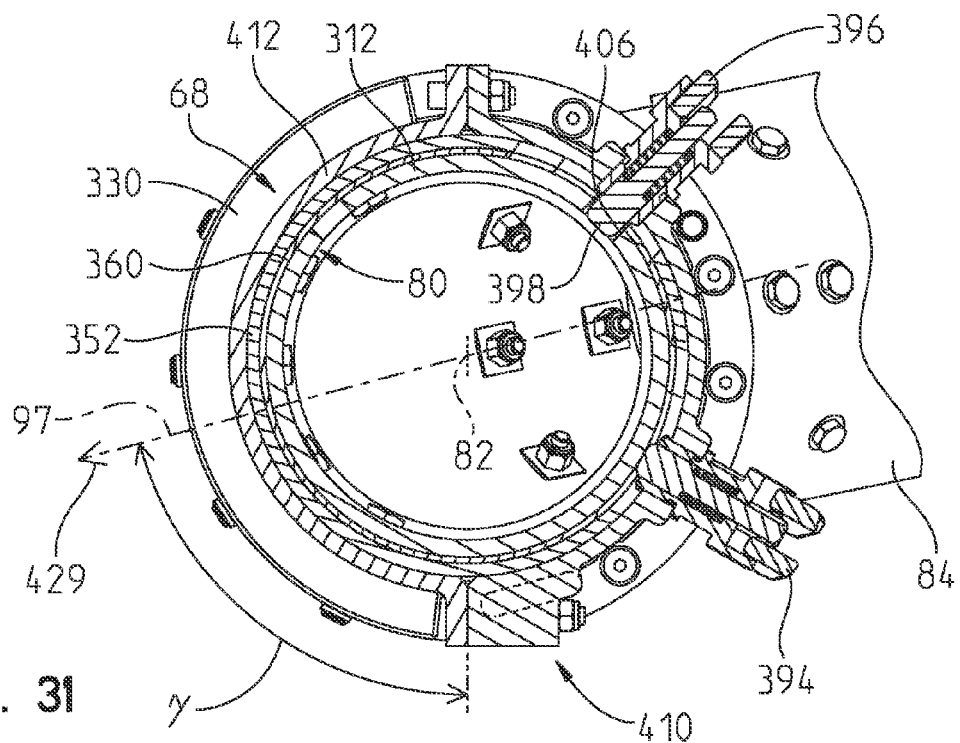
FIG. 31 is a cross sectional view similar to FIG. 28, showing the carriage rotated about an azimuth axis to a fourth angular orientation relative to the pintle.

FIG. 31 shows the carriage 68 in a fourth angular position about the azimuth axis 82 relative to the pintle 80, where the machine gun 64 is rotated by an angle γ (illustratively approximately 75 degrees) clockwise from the third angular position of FIG. 30. In this position, the second locking pin 396 is received within the second opening 406 of the pintle 80, the axis 97 of the machine gun 64 is substantially parallel (illustratively about 15 degrees outwardly) to the longitudinal axis 20 of the helicopter 14, and the barrel 96 is directed to the rear end 24 of the helicopter 14.

With further reference to FIGS. 20-25, the illustrative weapon cradle 66 removably supports the machine gun 64 for movement therewith. The weapon cradle 66 is secured to the arms 376 and 378 of the carriage 68 for pivoting movement about elevational axis 70. As noted herein, the illustrative weapon cradle 66 is configured to support a GAU-21 .50 caliber machine gun. However, other cradle assemblies may be substituted therefor to support other weapons.

Figure 21:
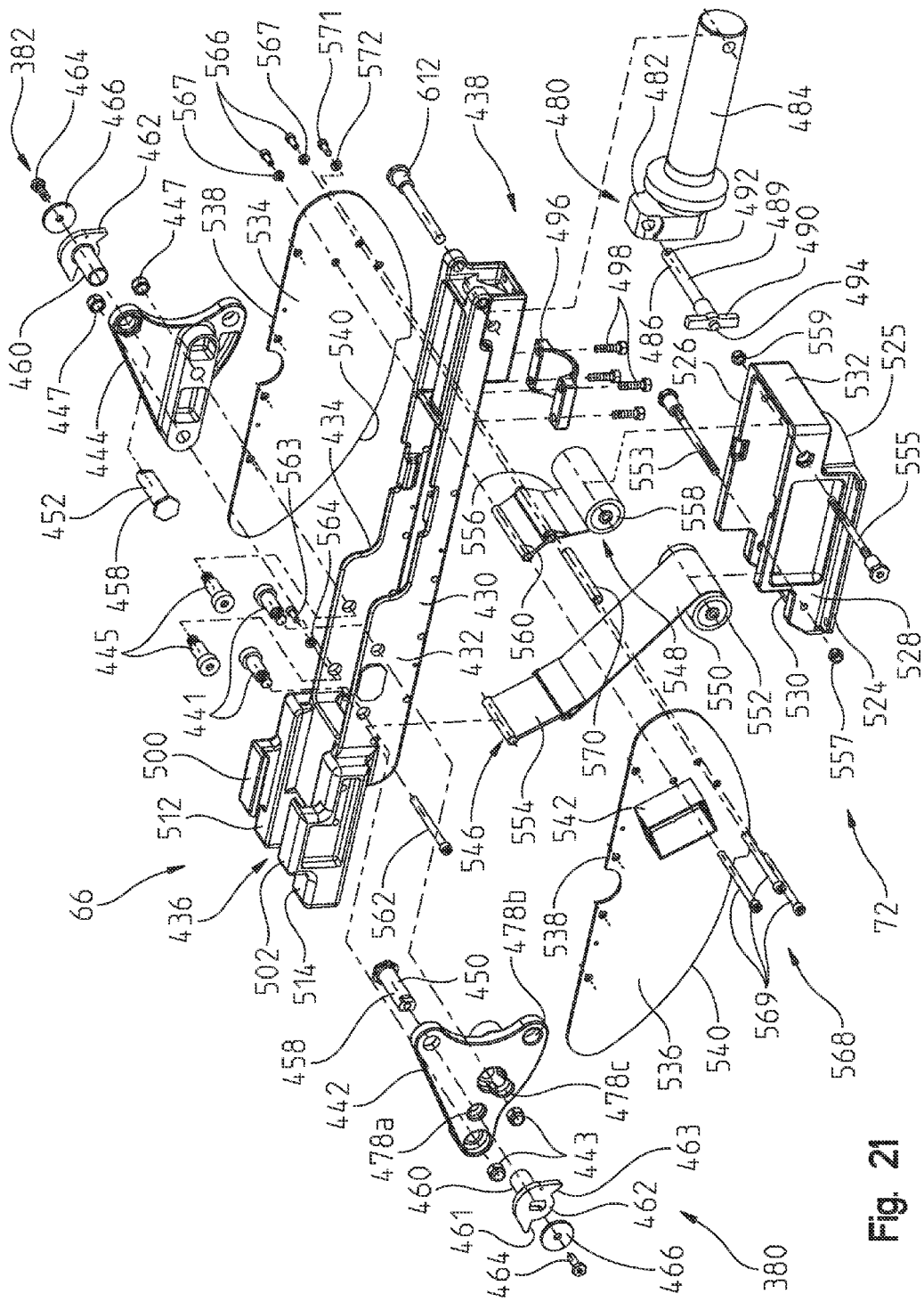
FIG. 21 is an exploded perspective view of the weapon cradle and the ejection collection device of FIG. 18.

With reference to FIG. 21, the weapon cradle 66 includes a body 430 having laterally spaced first and second rail members 432 and 434 extending longitudinally between front and rear ends 436 and 438. A first connecting wing 442 extends upwardly from the first rail member 432 and is connected to the body 430 by conventional fasteners, such as bolts 441 and nuts 443. Similarly, a second connecting wing 444 extends upwardly from the second rail member 434 and is connected to the body 430 by conventional fasteners, such as bolts 445 and nuts 447.

As shown in FIGS. 20 and 21, pivot couplings 380 and 382 include pins 450 and 452 received within bushings 454 and 456 to pivotally couple the weapon cradle 66 to the arms 376 and 378 of the carriage 68. Pivot couplings 380 and 382 support connecting wings 442 and 444 on arms 376 and 378, respectively, for pivoting movement about elevational axis 70. Each pivot pin 450 and 452 illustratively includes an internally threaded shaft 458 received within an outer sleeve 460 supporting a pivot plate 462 having opposing engagement surfaces 461 and 463. A screw 464 and a washer 466 illustratively couple the sleeve 460 and plate 462 to the shaft 458.

An elevational stop member 470 is secured to each of the arms 376 and 378 of the carriage 68, illustratively through conventional fasteners, such as bolts 379. The stop members 470 each include opposing stop surfaces 472 and 474 for engaging with opposing engagement surfaces 461 and 463 of pivot plate 462. The pivot pins 450 and 452 rotate with the weapon cradle 66, such that engagement between engagement surface 461 and stop surface 472 defines a first elevational limit stop (e.g., depression stop) of the weapon cradle 66, and engagement between engagement surface 463 and stop surface 474 defines a second elevational limit stop (e.g., elevation stop) of the weapon cradle 68. The stop members 470 may be easily replaced with other stop members having differently positioned stop surfaces 472 and 474 for altering the first and second elevational limit positions of the weapon cradle 66.

As noted above, locking pins 390 and 392 are coupled to arms 376 and 378 of the carriage 68 illustratively through nuts 473 and are configured to secure the weapon cradle 66 in a desired elevational position. More particularly, locking pins 390 and 392 may be of conventional design as including a spring loaded shaft 475 that is moved within a housing 476 in response to rotation of a knob 477. More particularly, rotation of the knob 477 in a first direction will cause the shaft 475 to extend outwardly from the housing 476, while rotation of the knob 477 in a second direction will cause the shaft 475 to retract inwardly toward the housing 476. In the extended position, the shaft 475 is configured to be received within one of a plurality of recesses 478a, 478b, and 478c formed in each of the connecting wings 442 and 444 of the weapon cradle 66.

Figure 35:
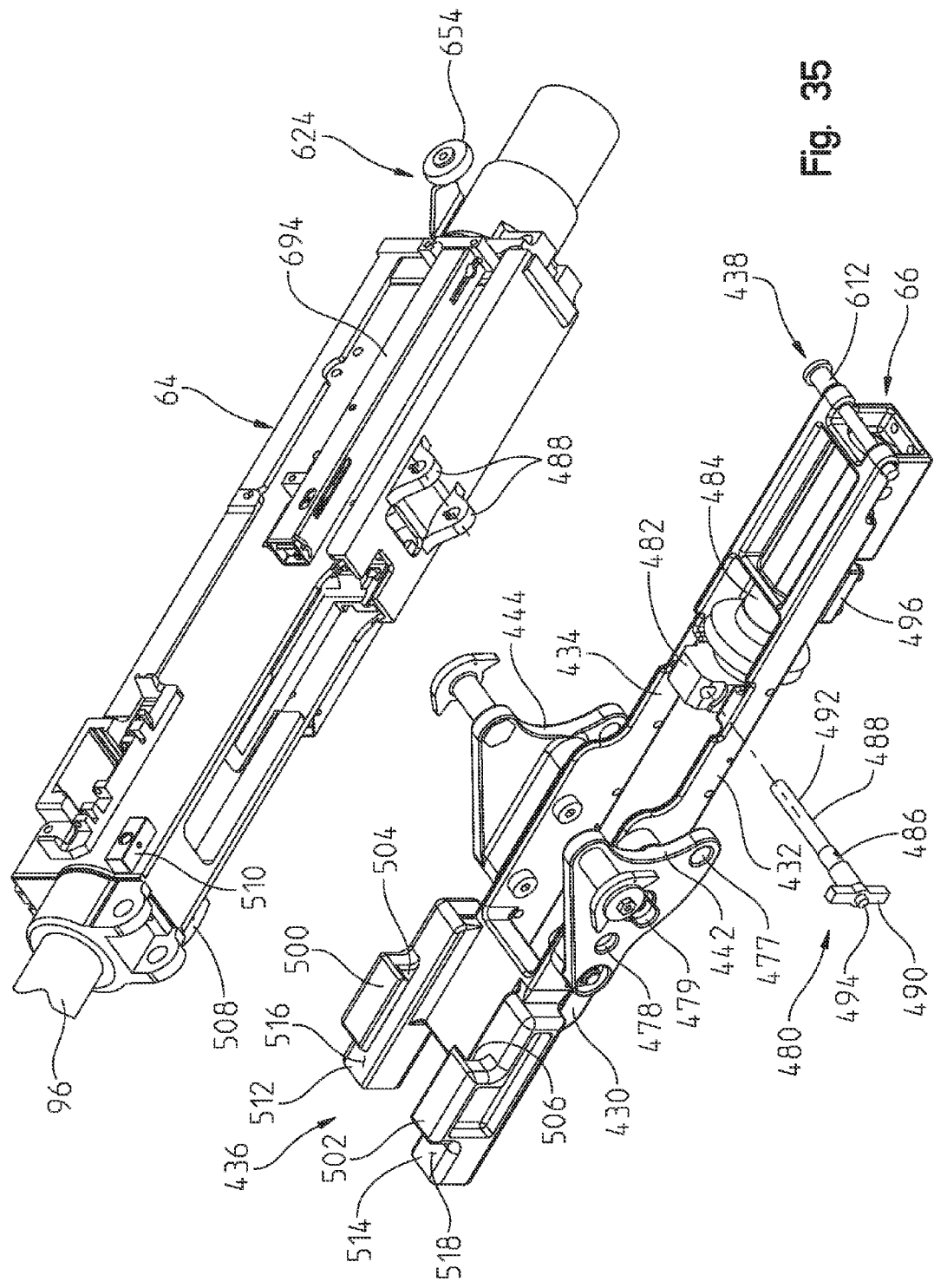
FIG. 35 is a perspective view showing the machine gun for mounting to the weapon cradle of FIG. 18.

With reference to FIGS. 21 and 35, a coupler 480 couples the machine gun 64 to weapon cradle 66 and includes a mounting block 482 coupled to a front end of a shock absorber 484. The mounting block 482 receives a pin 486 to couple a mounting tab 488 of the machine gun 64 thereto. The pin 486 illustratively includes a shaft 489 including a handle 490 at a first end and a ball detent 492 at the second end. A button 494 provided on the handle 490 retracts the ball detent 492.

A rear end of the shock absorber 484 is secured intermediate the rail members 432 and 434 at the rear end 438 of the body 430, illustratively by conventional fasteners, such as a pin or bolt. A bottom bracket 496 is secured intermediate the rail members 432 and 434 below the body 430 by bolts 498 and supports the shock absorber 484. The shock absorber 484 is configured to resist recoil of the machine gun 64 in the direction of the longitudinal axis 97.

Referring further to FIG. 35, first and second guide members 500 and 502 are positioned proximate the front end 436 of the body 430 and include tracks 504 and 506 configured to slidably receive shoes or blocks 508 and 510, respectively, supported on opposite sides of the machine gun 64. First and second support shelves 512 and 514 are supported forward of the guide members 500 and 502 at the front end of the body 430. The shelves 512 and 514 provide resting surfaces 516 and 518 for the shoes 508 and 510 to assist in installing the machine gun 64 on the weapon cradle 66.

Figure 22:
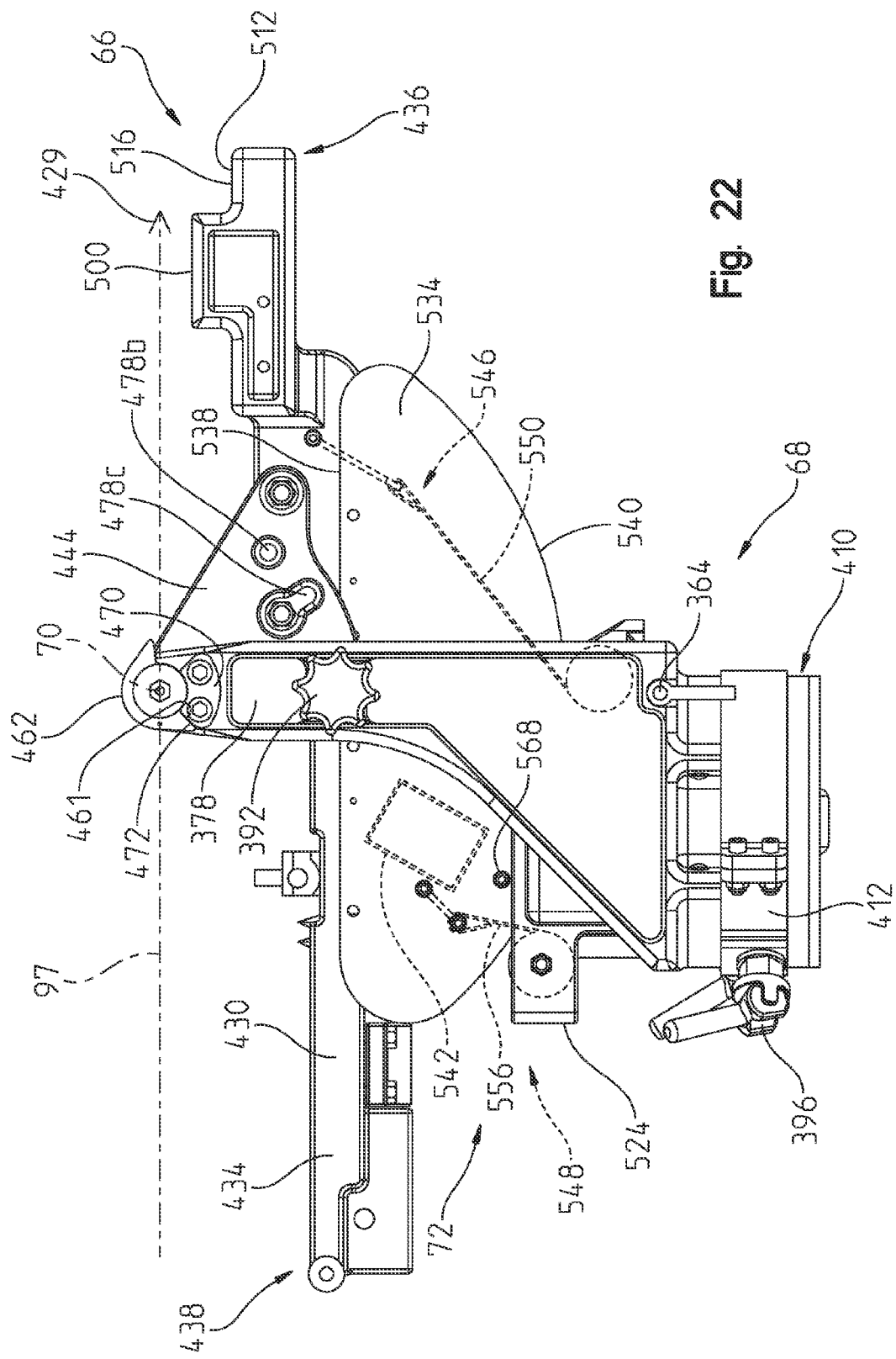
FIG. 22 is a side elevational view of the upper portion of the weapon mounting system of FIG. 17, showing the weapon cradle locked in a substantially horizontal orientation.
Figure 23:
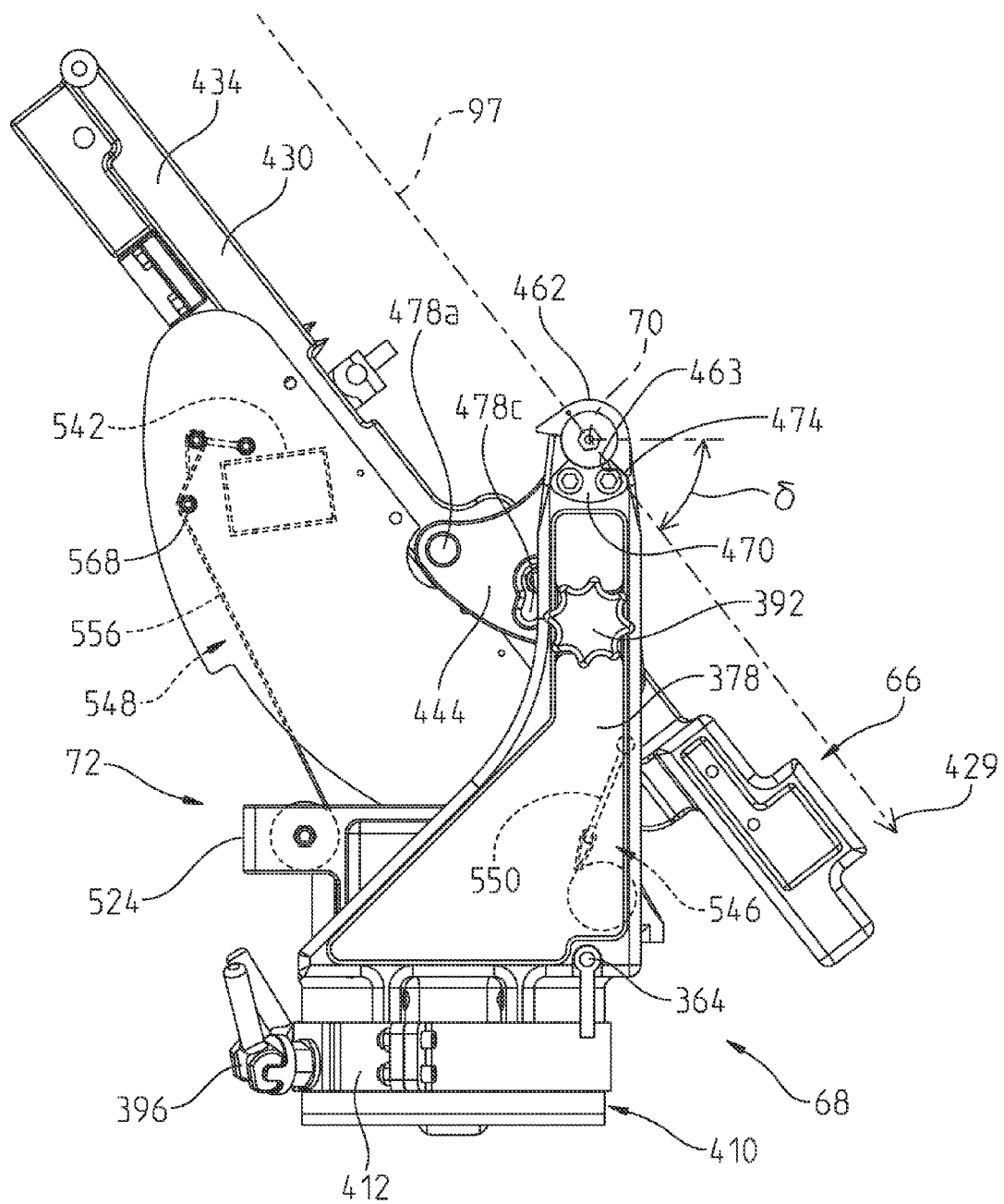
FIG. 23 is a side elevational view similar to FIG. 22, showing the weapon cradle pivoted downwardly at a locked depression position for use with the helicopter in the standard landing gear configuration of FIG. 1.
Figure 24:
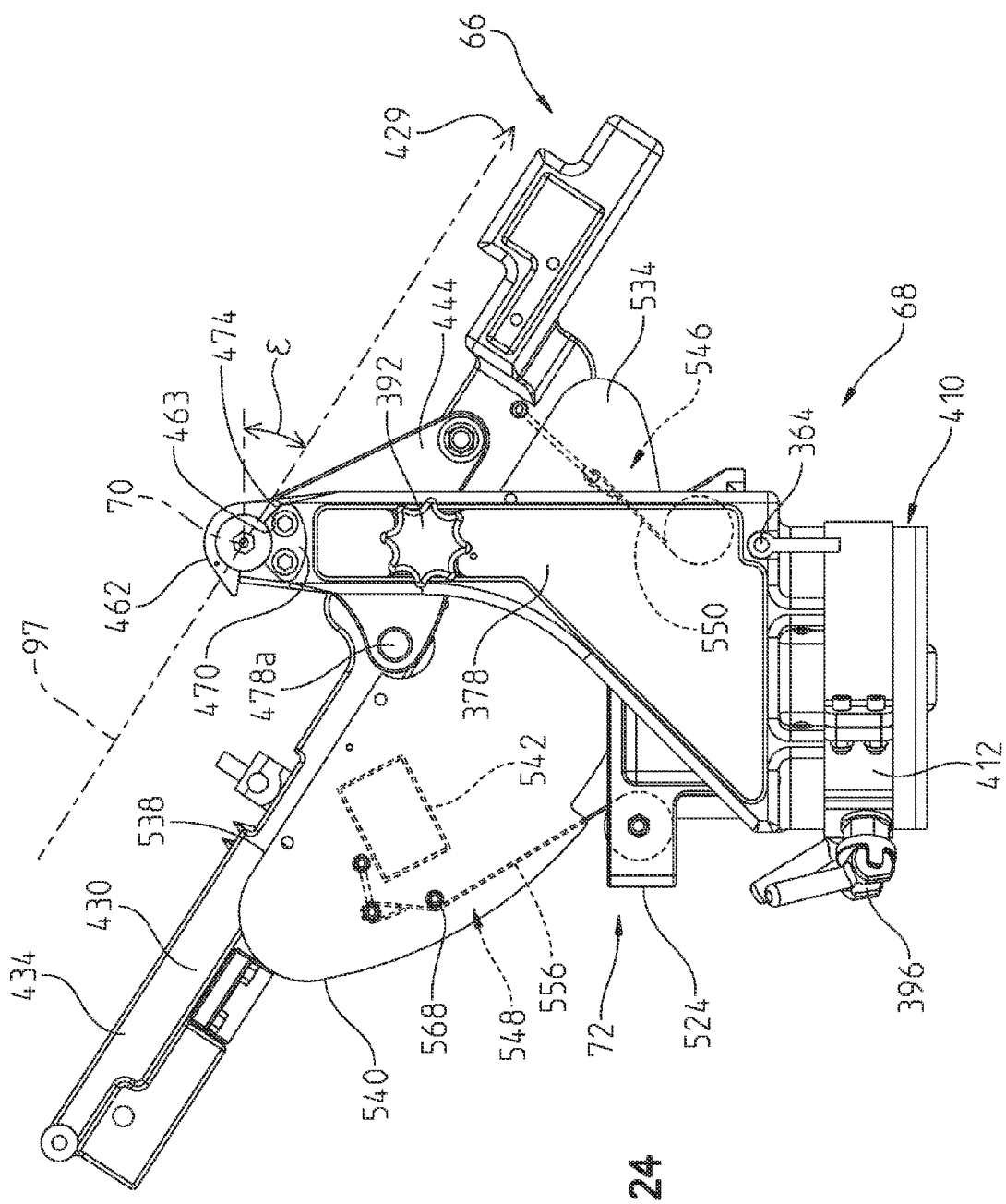
FIG. 24 is a side elevational view similar to FIG. 23, showing the weapon cradle pivoted downwardly at another locked depression position for use with the helicopter in the arctic landing gear configuration of FIG. 4.

FIGS. 22-24 illustrate different angular positions of the weapon cradle 66 about the elevational axis 70 relative to the carriage 68. FIG. 22 shows the weapon cradle 66 in a substantially horizontal position where the longitudinal axis 97 of the machine gun 64 is substantially parallel to the helicopter axis 20. In this position, each locking pin 390 and 392 is received within the respective first recesses 478a of connecting wings 442 and 444 of the weapon cradle 66. Engagement between engagement surface 461 of pivot plate 462 and stop surface 472 of stop member 470 limit travel significantly counterclockwise (i.e., elevated barrel 96 as represented by firing direction arrow 429) beyond the position of FIG. 22.

FIG. 23 shows the weapon cradle 66 pivoted downwardly from horizontal (clockwise from FIG. 22 to FIG. 23) by angle δ (illustratively, approximately 55 degrees). In this first depression position, each locking pin 390 and 392 is received within respective second recesses 478b of connecting wings 442 and 444 of the weapon cradle 66. Engagement between engagement surface 463 of pivot plate 462 and stop surface 474 limit travel significantly clockwise (i.e., depressed barrel 96 as represented by firing direction arrow 429) beyond the position of FIG. 23. The depression position of FIG. 23 is configured for use with the standard landing gear configuration of the helicopter 14 shown in FIG. 1.

FIG. 24 shows the weapon cradle 66 pivoted downwardly from horizontal (clockwise from FIG. 22 to FIG. 24) by angle ε (illustratively, approximately 35 degrees). In this second depression position, each locking pin 390 and 392 is received within respective third openings 478c of connecting wings 442 and 444 of the weapon cradle 66. The depression position of FIG. 24 is configured for use with the arctic landing gear configuration of the helicopter 14 shown in FIG. 4 in order to prevent potential interference with bullets 77 fired from the machine gun 64. Again, engagement between engagement surface 463 of pivot plate 462 and stop surface 474 limit travel significantly clockwise (i.e., depressed barrel 96 as represented by firing direction arrow 429) beyond the position of FIG. 24. As noted above, the stop member 470 may be replaced with other stop members to alter the first and second elevational limit stop positions of the weapon cradle 66.

Figure 25:
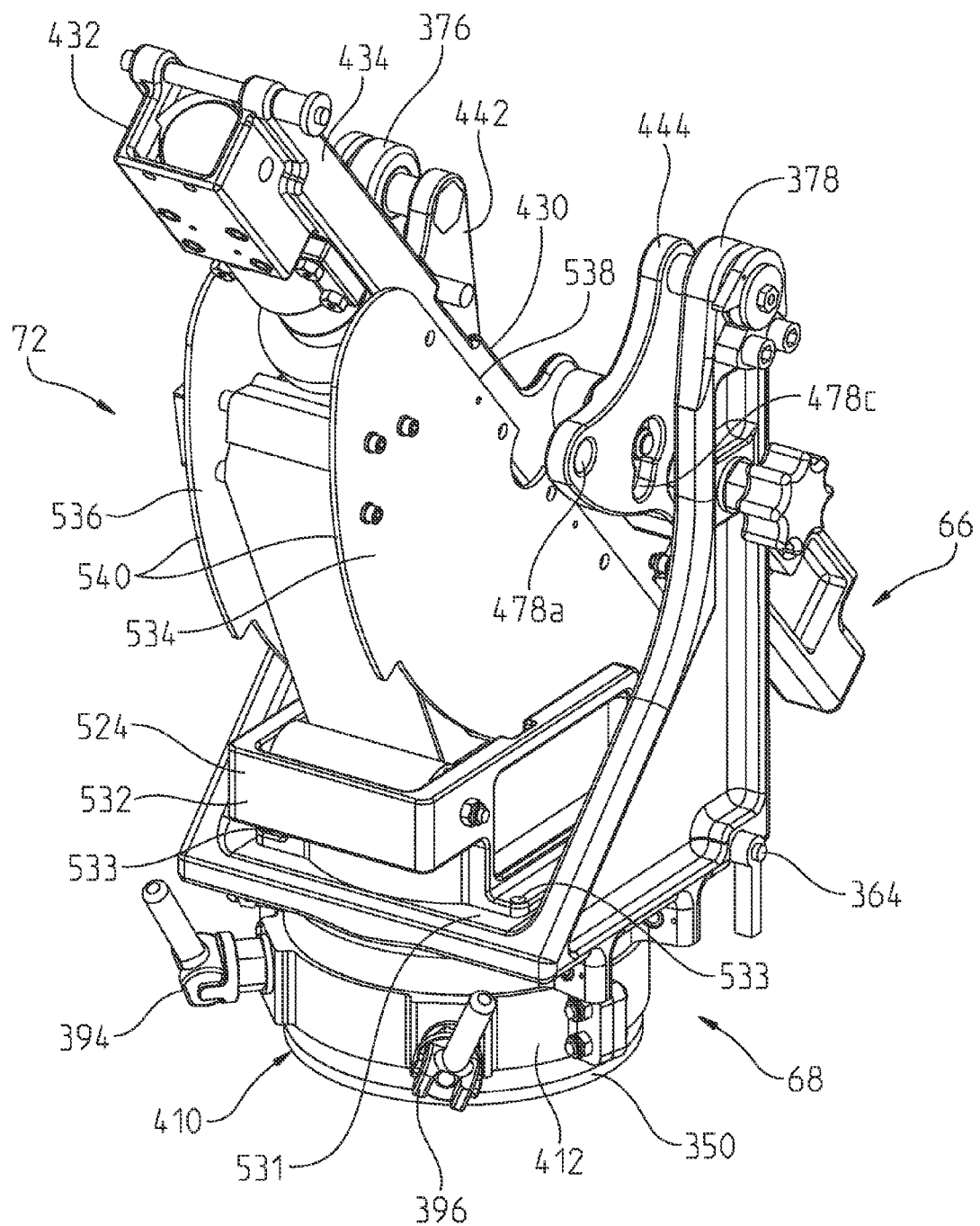
FIG. 25 is a perspective view of the weapon cradle in the position of FIG. 23.
Figure 26:
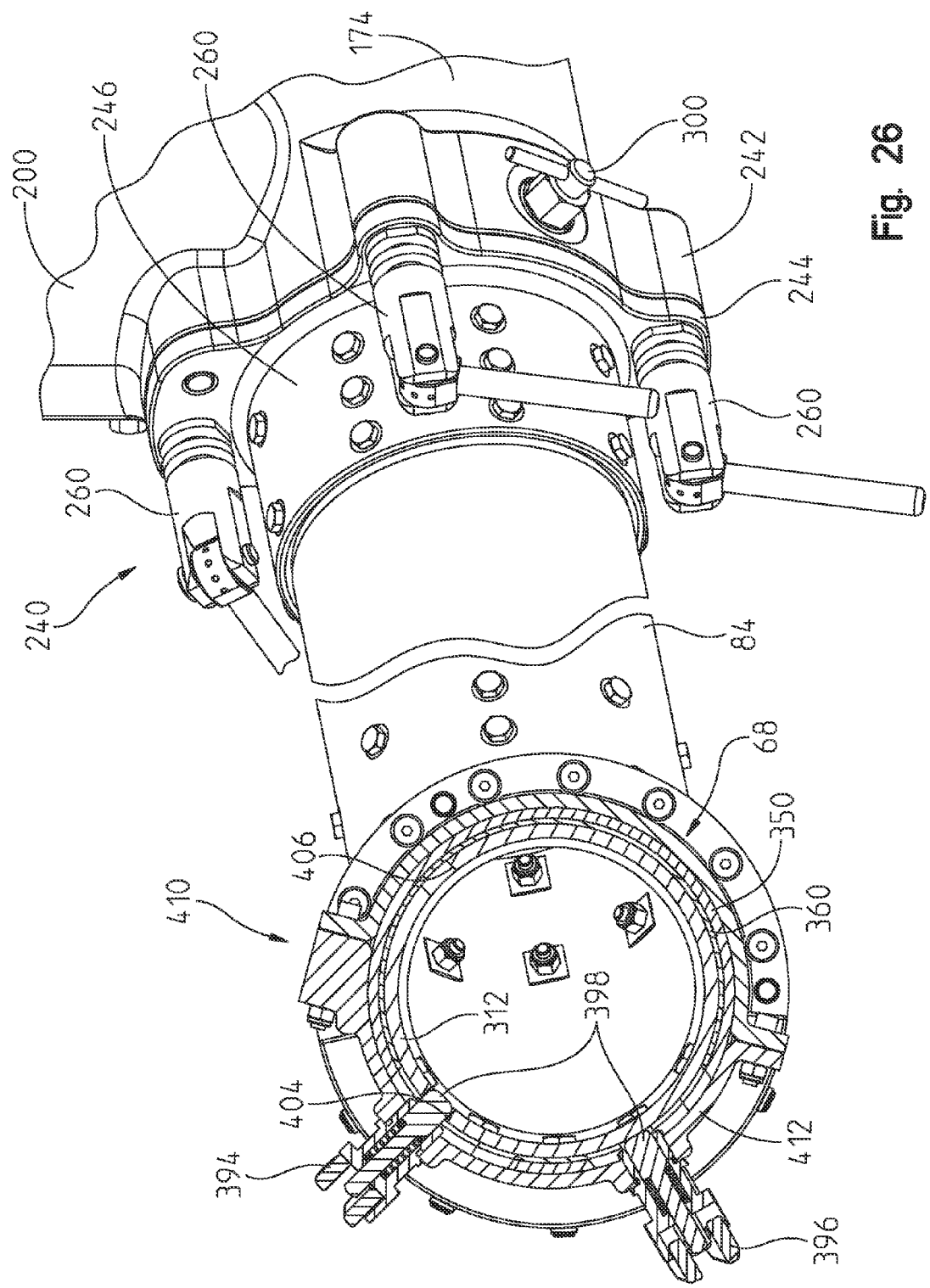
FIG. 26 is a perspective view in partial cross section, showing the carriage coupled to the pintle.

With reference to FIGS. 13, 21, and 25, the ejection collection device 72 is operably coupled to the weapon cradle 66 for receiving, collecting, and directing ejected shell casings 74 and links 75 from the machine gun 64 though a passageway 520 (including an opening 521 in carriage 68, passageway 316 of the pintle 80, and passageway 216 of the support post 84) to exit opening 178 in the base assembly 86 (FIG. 13). The ejection collection device 72 includes a hopper 524 configured to funnel the spent shell casings 74 and links 75 through opening 521 of carriage 68 to the passageway 316 of the pintle 80.

Figure 32:
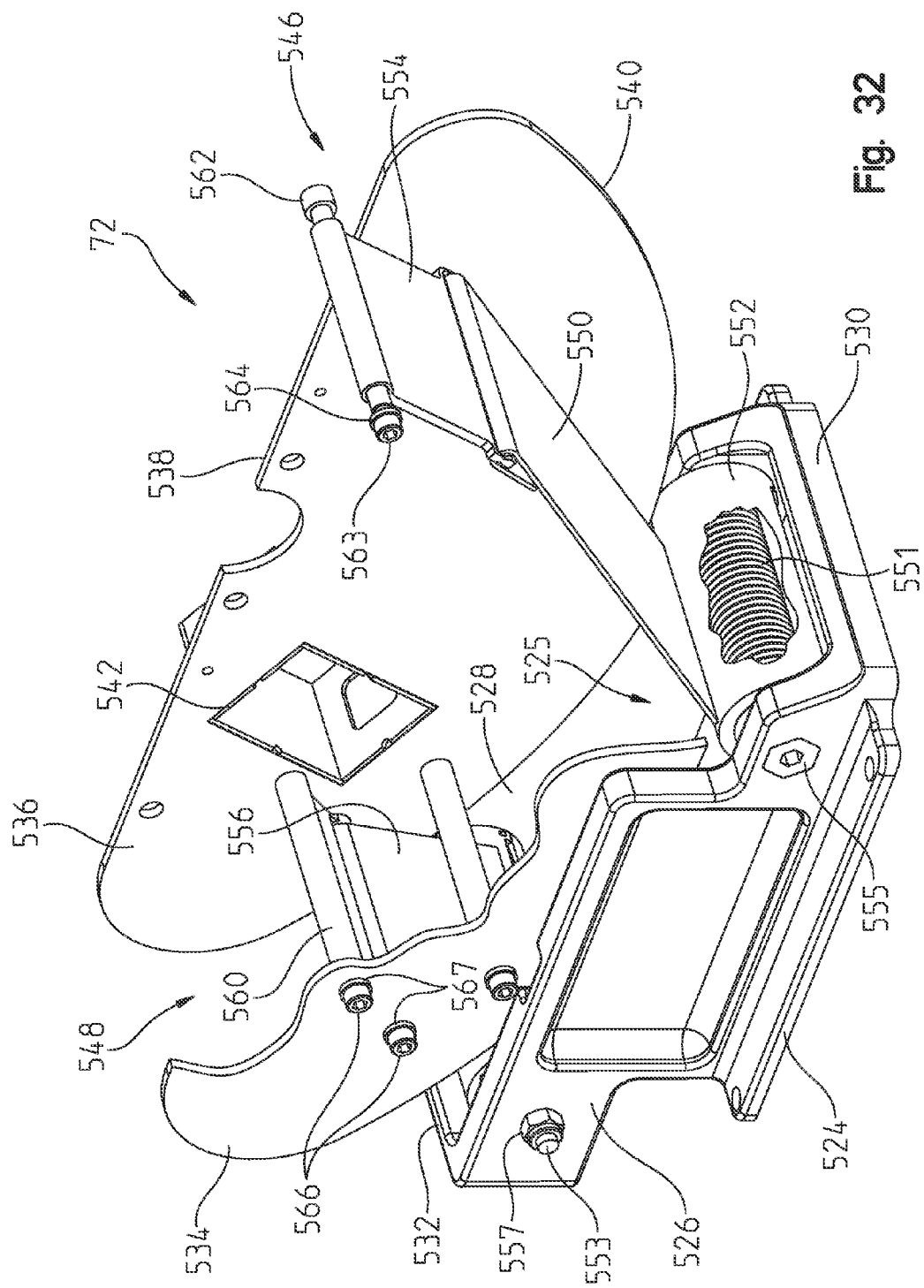
FIG. 32 is a perspective view, with partial cutaway, of the ejection collection device of FIG. 18.

With reference to FIGS. 21, 25, and 32, the hopper 524 illustratively includes a lower opening 525 aligned with opening 521 of the carriage 68 and defined by spaced apart side walls 526 and 528 coupled together by front and rear end walls 530 and 532. The hopper 524 is positioned between arms 376 and 378 of the carriage 68 and may be coupled to a platform 531 base 350 via conventional fasteners 533 (FIG. 25). First and second side deflectors, illustratively side plates 534 and 536, are coupled to the first and second side rail members 432 and 434 of the weapon cradle 66 and are configured to deflect the spent shell casings 74 and links 75 to the lower opening 525 of the hopper 524. The side plates 534 and 536 each include an upper edge 538 coupled to the body 430 of the weapon cradle 66, and an arcuate lower edge 540 received inwardly from the side walls 526 and 528 of the hopper 524. As such, the side plates 534 and 536 are free to move with weapon cradle 66. The second side plate 536 illustratively includes an opening 542 coupled to a link chute 544 coupled to the machine gun 64 (FIG. 18). The link chute 544 is illustratively formed of interconnected stainless steel segments to provide flexibility and may be manufactured by Standard Armament of Glendale, Calif.

Front and rear deflectors, illustratively adjustable front and rear end walls 546 and 548, extend between the hopper 524 and the weapon cradle 66. As with the side plates 534 and 536, the end walls 546 and 548 are configured to deflect spent shell casings 74 and links 75 to the opening 525 of the hopper 524. The adjustable front end wall 546 illustratively includes a flexible belt 550 including a first end supported by a roller 552 rotatably coupled to the hopper 524, and a second end supported by a bracket 554 coupled to side plates 534 and 536 of the weapon cradle 66 and configured to move therewith. Similarly, the adjustable rear end wall 548 includes a flexible belt 556 including a first end supported by a roller 558 rotatably coupled to the hopper 524, and a second end supported by a bracket 560 coupled to side plates 534 and 536 of the weapon cradle 66 and configured to move therewith. Flexible belts 550 and 556 may be formed of a fabric material, illustratively of nylon webbing.

With reference to FIGS. 21 and 32, the bracket 554 is pivotably supported between side plates 534 and 536 through an internally threaded pins 562 secured by external bolts 563 and washers 564. Similarly, bracket 560 is supported between side plates 534 and 536 through internally threaded pin 565 secured by an external bolt 566 and washer 567. Each roller 552 and 558 is rotatably supported between side plates 534 and 536 and is spring loaded (i.e., include internal torsion springs 551 shown in FIG. 32), such that the flexible belts 550 and 556 are maintained in tension and the first ends are configured to be wound on respective rollers 552 and 558. Each roller 552, 558 is rotatably supported on a threaded pin or shaft 553, 555 secured to the hopper 524 by nuts 557, 559. A guide 568 includes a pin 569 rotatably supporting a roller 570 and secured thereto by an external bolt 571 and a washer 572.

With further reference to FIGS. 13, and 22-25, the side plates 534, 536, and end walls 546, 548 adapt to pivoting movement of the weapon cradle 66. As noted above, when the weapon cradle 66 is moved from the horizontal position of FIG. 22 to the depression positions of FIGS. 23 and 24, the side plates 534, 536 rotate with the cradle 66, the belt 556 of the rear end wall 548 extends, and the belt 550 of the front end wall 546 retracts, thereby adapting to continue deflecting spent shell casings 74 and links 75 to the opening 525 of the hopper 524. As the rear belt 556 extends (as shown in FIGS. 23 and 24), the guide 568 maintains the belt 556 spaced from the link opening 542 to keep it clear for the passage of links 75 downwardly toward the opening 525 of the hopper 524.

The ejection collection device 72 further includes an ejection chute assembly 574 to facilitate ejection of spent shell casings 74 and links 75 associated with weapons operating at high rates of speed (for example, the GAU-21 machine gun 64). The hopper 524 directs the spent shell casings 74 and links 75 downwardly through the passageway 316 of the pintle 80, through the passageway 216 of the support post 84, and away from the helicopter 14 through the exit opening 178 positioned below the mounting plate 100 of the helicopter 14 (FIG. 1). By funneling the spent shell casings 74 and links 75 through the center of the pintle 80, the support post 84, and the base tube 174, there is no need for a separate ejection hose as used in prior art systems thereby providing a more compact system 10 and reducing aerodynamic drag on the helicopter 14.

Figure 4:
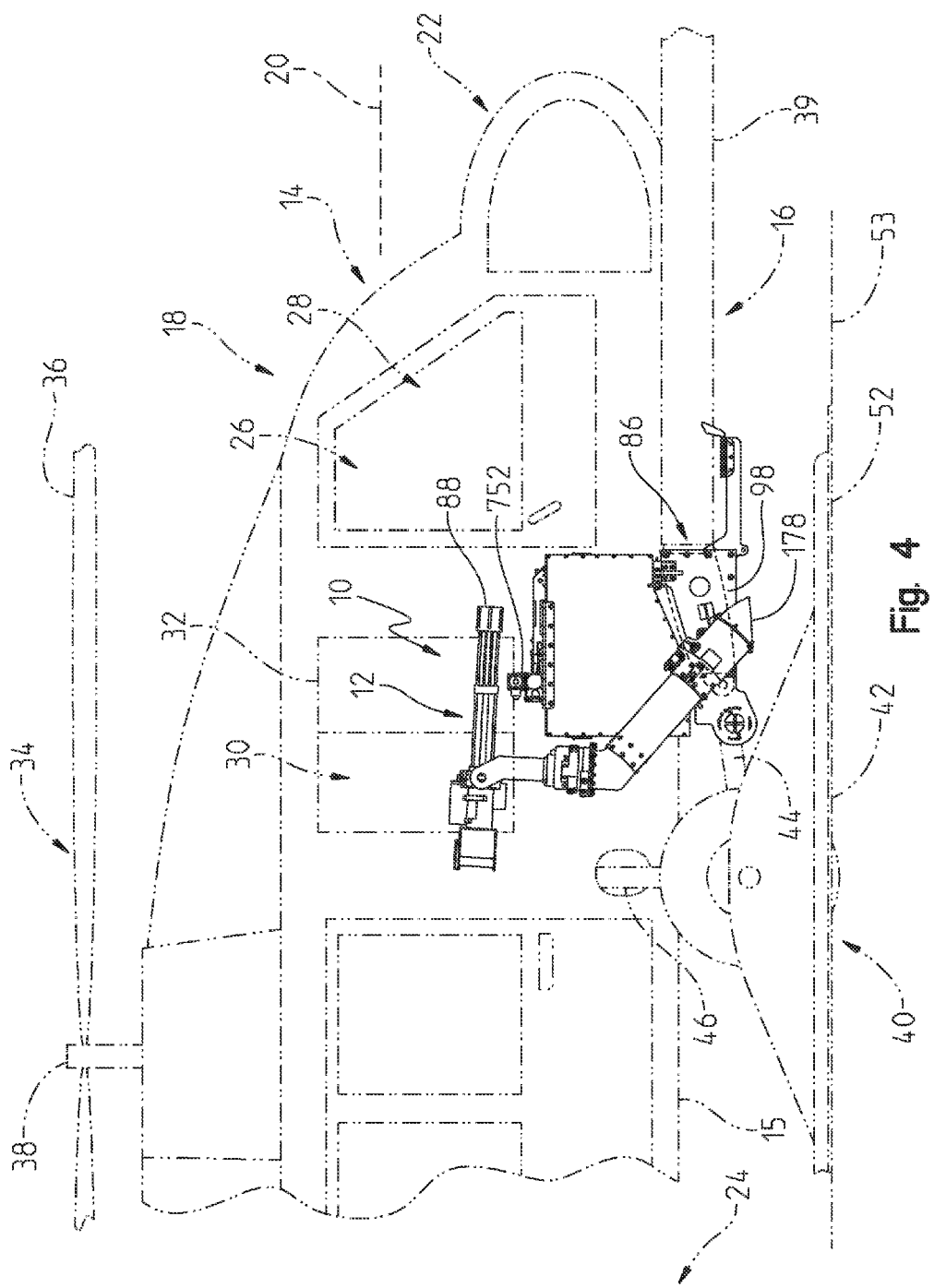
FIG. 4 is a right side elevational view similar to FIG. 1, showing a weapon mounting system coupled to a helicopter in an arctic landing gear configuration having landing skis.
Figure 33:
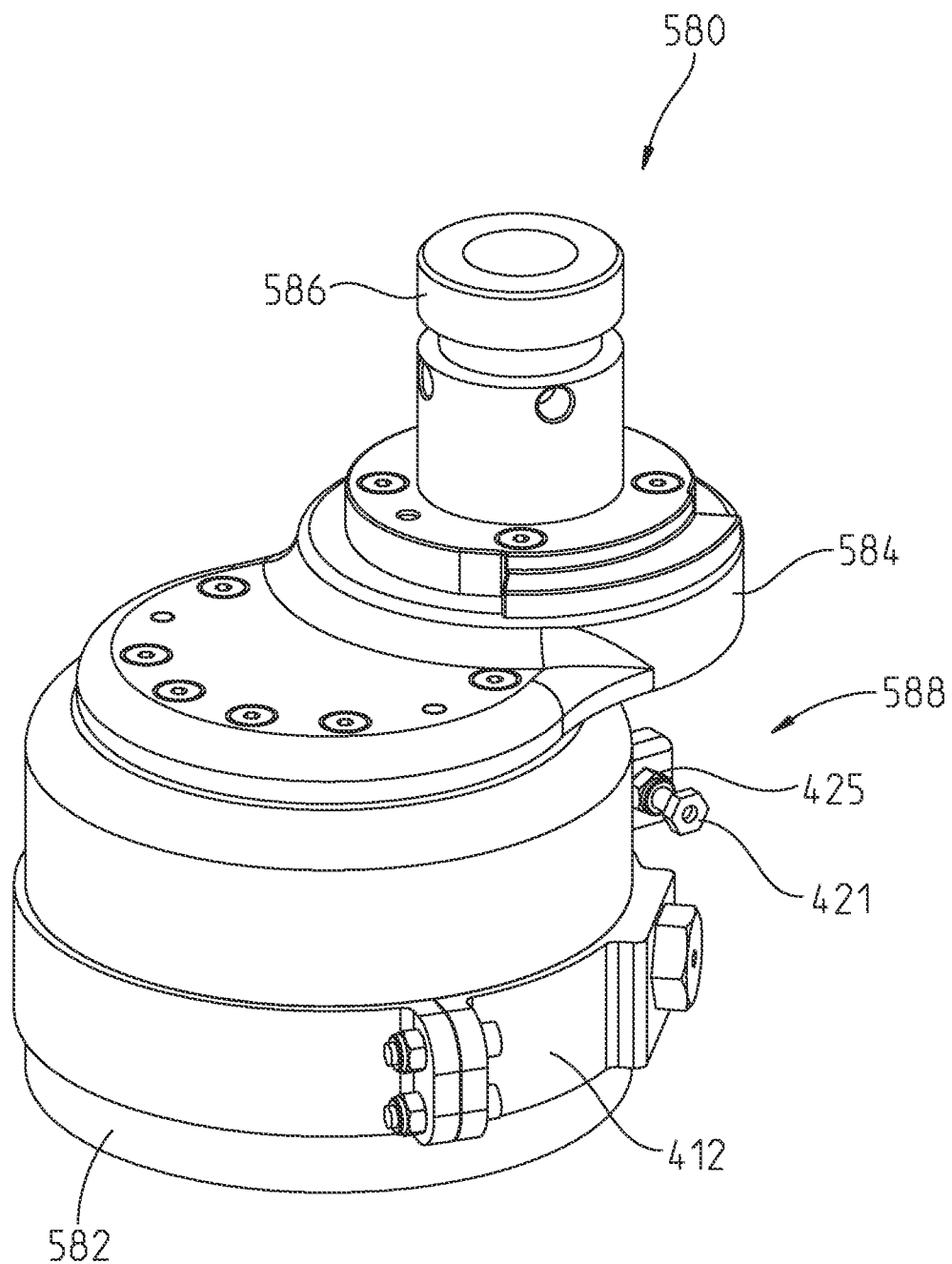
FIG. 33 is a top perspective view of an alternative pintle assembly of the weapon mounting system of FIG. 5.
Figure 34:
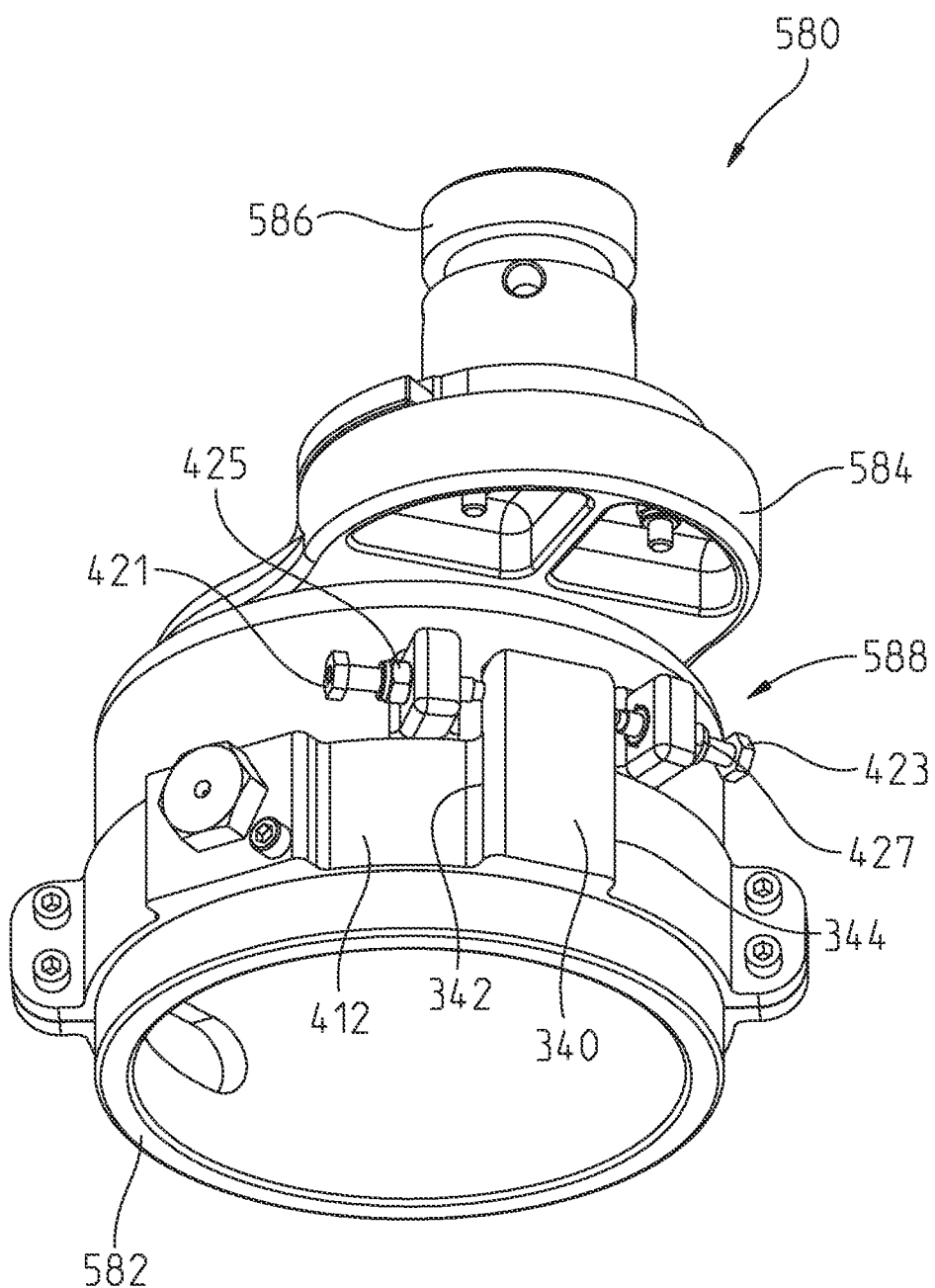
FIG. 34 is a bottom perspective view of the pintle assembly of FIG. 33.

As shown in FIGS. 33 and 34, an alternative carriage 580 is shown for supporting a conventional weapon cradle for an M240 machine gun (not shown) or a minigun 88 (FIG. 4). Such conventional cradle assemblies are available from Dillon Aero, Inc. of Scottsdale, Ariz. Illustratively, the carriage 580 includes a base 582 concentrically receiving the pintle 80 and an upper extension 584 supporting a post 586. A bore sight adjustment device 588 similar to bore sight adjustment device 410 may be supported by the base 582. As such, similar components of bore sight adjustment device 588 and bore sight adjustment device 410 are identified with like reference numbers. The post 586 illustratively supports for rotation the weapon cradle for the respective alternative weapon.

Figure 36:
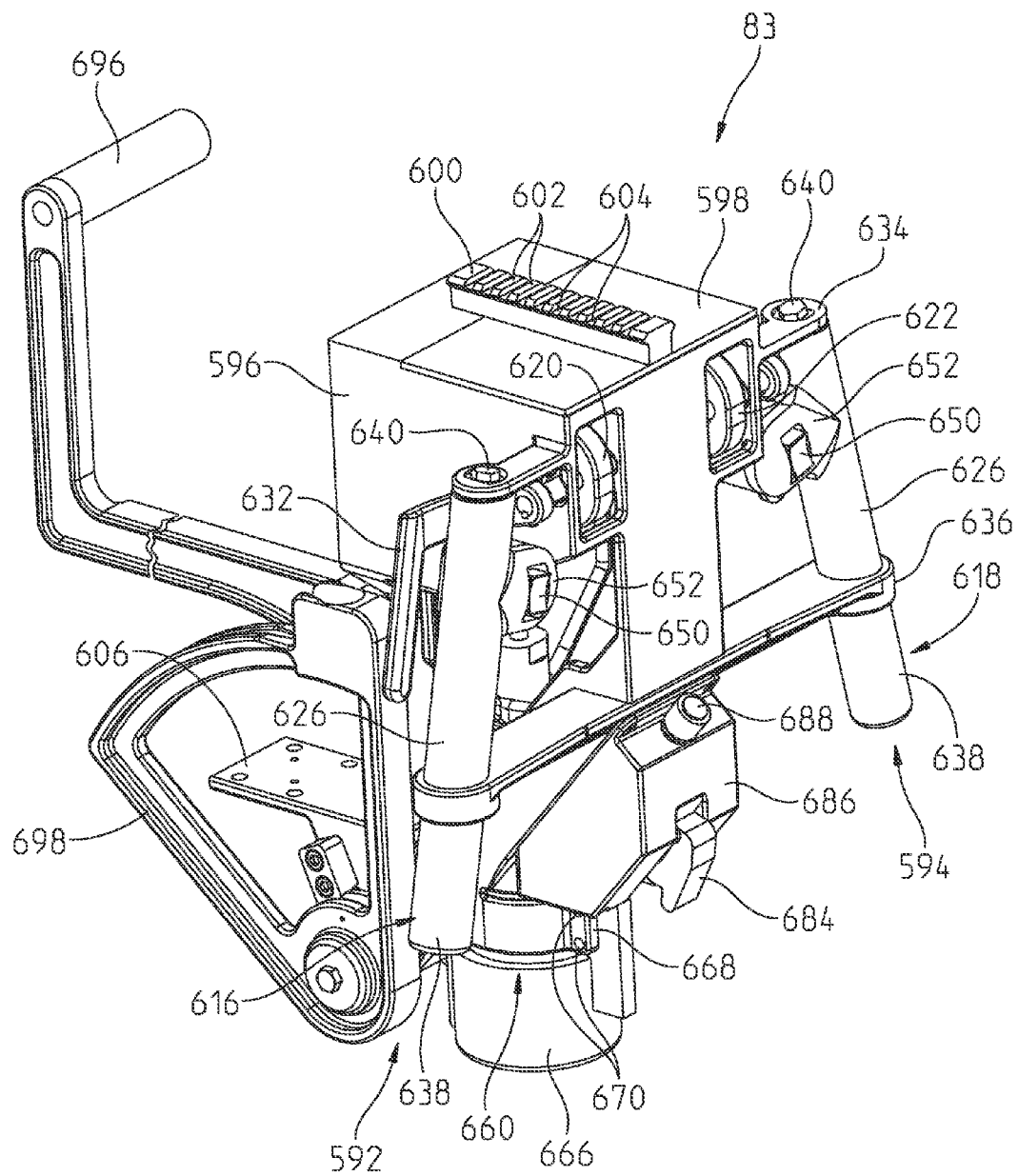
FIG. 36 is a rear perspective view of the trigger assembly of FIG. 18.
Figure 37:
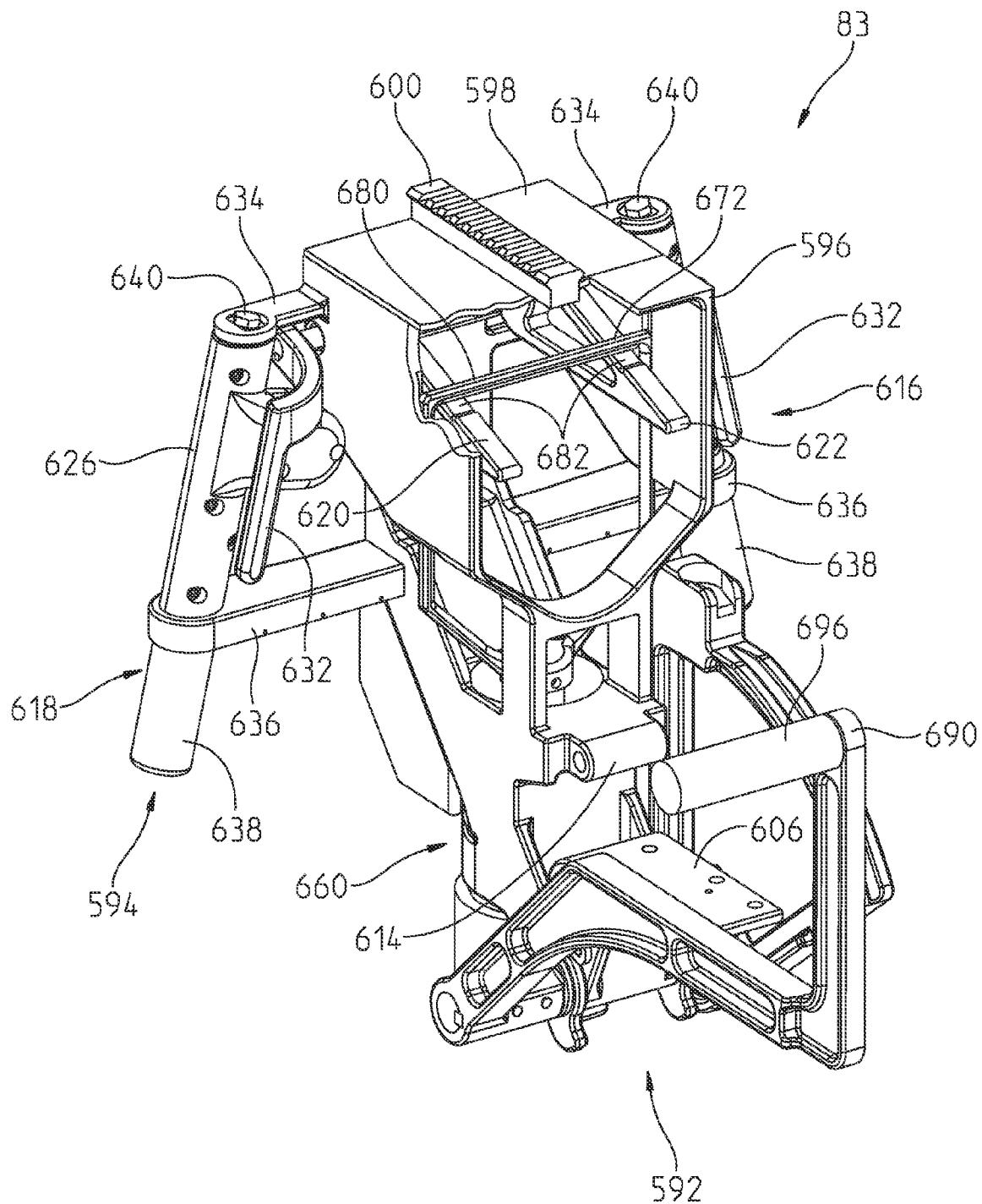
FIG. 37 is a front perspective view of the trigger assembly of FIG. 36, with a partial cutaway thereof.
Figure 38:
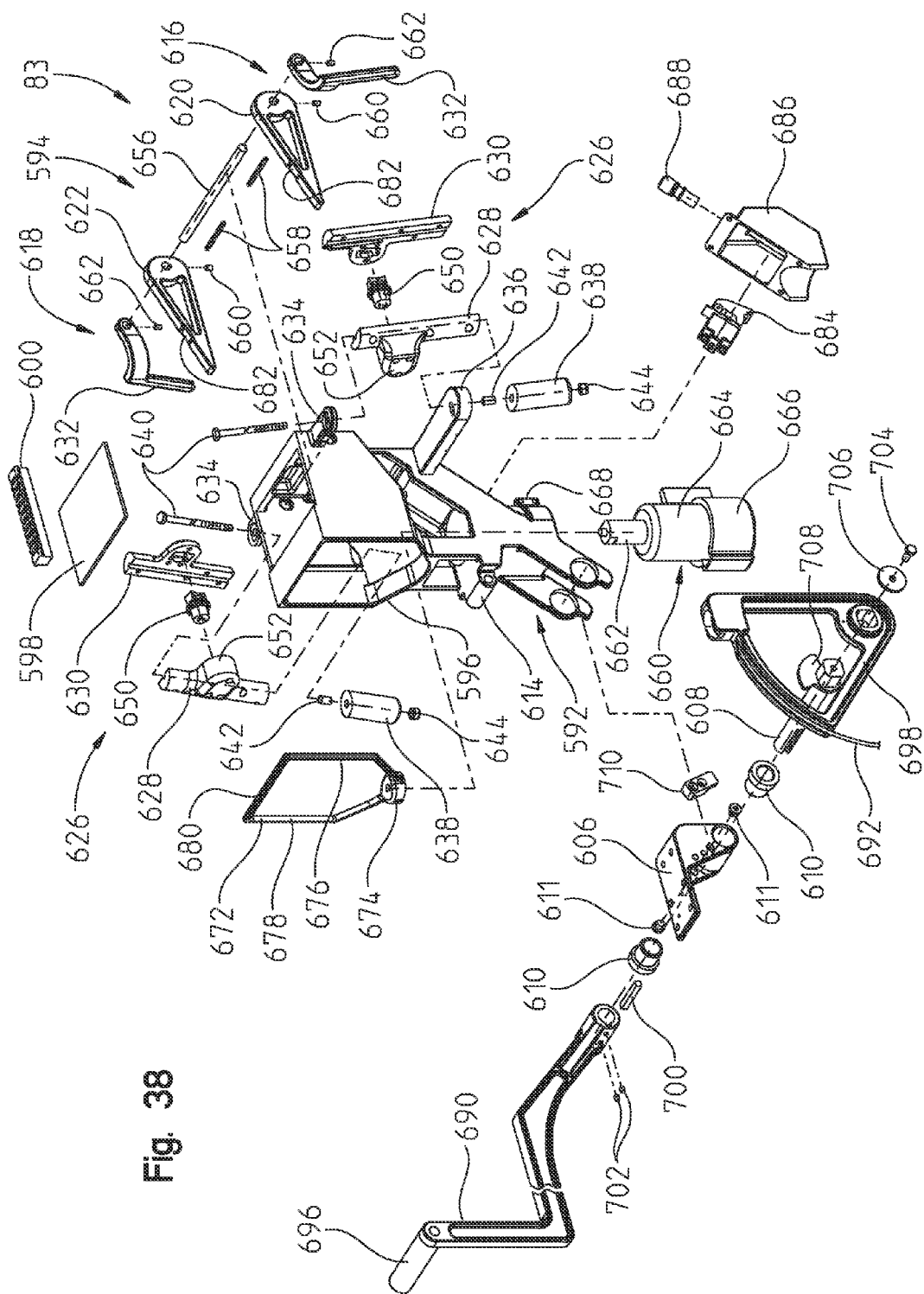
FIG. 38 is an exploded perspective view of the trigger assembly of FIG. 37.

Referring now to FIGS. 36-38, the trigger assembly 83 is shown as including a frame 592 supporting a spade grip assembly 594. The frame 592 supports an upper housing 596 including a removable cover 598. A mounting rail 600 is supported above the cover 598 and is configured to removably couple a variety of weapon supplemental devices and accessories, such as electronic devices, scopes, sights, lights, lasers, adapters, and any other desired gear. The rail 600 may be of any suitable shape and size, but illustratively is a Picatinny rail. More particularly, the rail 600 illustratively includes a plurality of longitudinally spaced-apart ribs 602 separated by transverse slots 604 (FIG. 36), such as the Picatinny rail specified in MIL-STD-1913.

Figure 39:
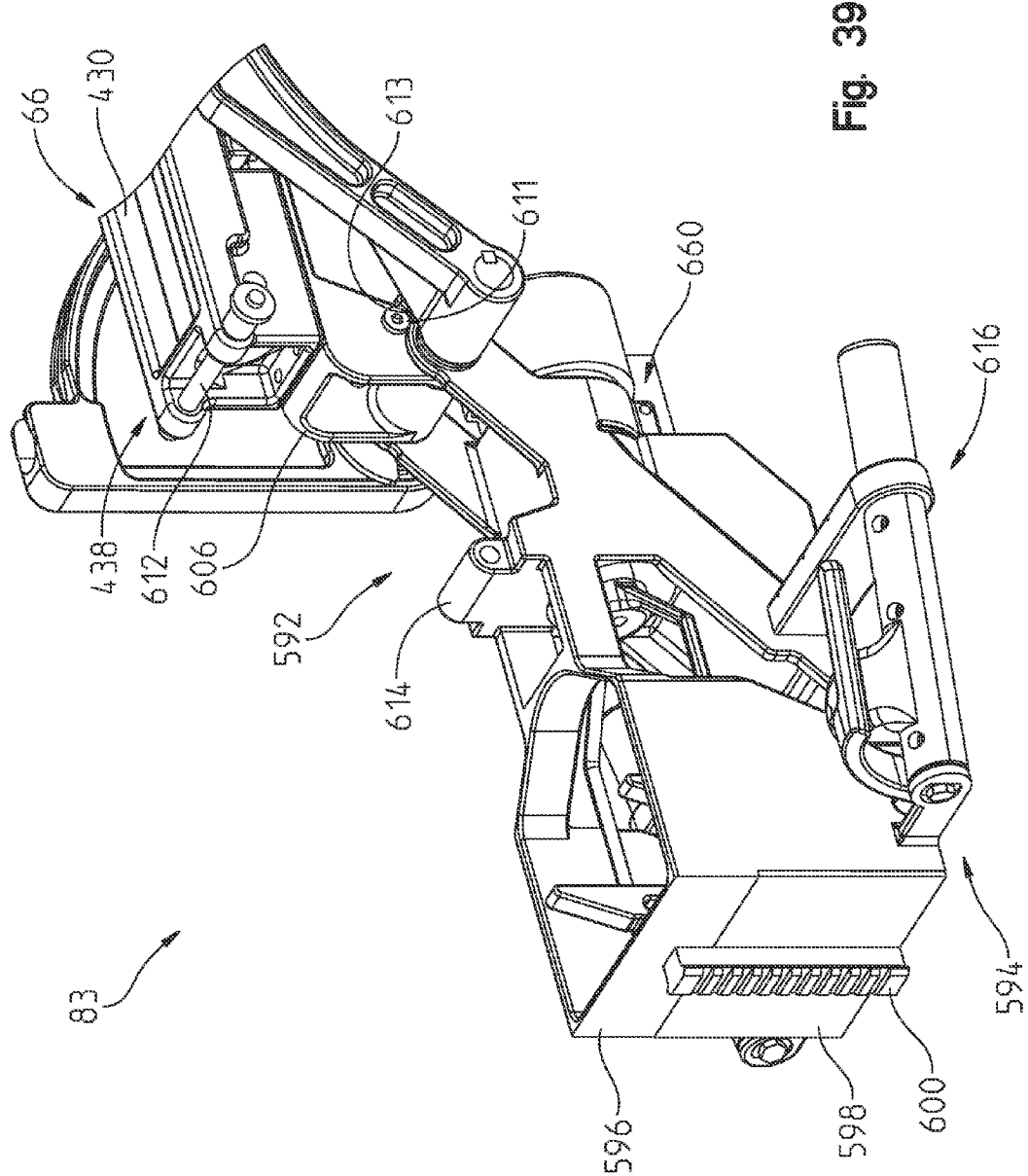
FIG. 39 is a perspective view of the trigger assembly of FIG. 37, showing the rear housing pivoted to a lowered position for access to the weapon cradle.

With reference to FIGS. 38 and 39, a bracket 606 pivotably couples the frame 592 to the body 430 of the weapon cradle 66. The bracket 606 is secured to the weapon cradle 66 via conventional fasteners proximate the rear end of the body 430. A pivot rod 608 extends within bushings 610 received within the bracket 606. As shown in FIG. 39, trigger frame 592 may rotate about bushings 610 from a raised position to a lowered position for providing access to weapon cradle 66 for installation and removal of the machine gun 64. More particularly, by lowering the upper housing 596 access is provided to the rear end 438 of the weapon cradle 66. A pin 612 is illustratively received within a boss 614 to secure the frame 592 in the raised position. Stops 611 are secured to the bracket 606 and engage with an edge 613 on the frame 592 to define the lowered position of the housing 596.

Illustratively, the spade grip assembly 594 includes spaced apart right and left trigger handles 616 and 618 operably coupled to right and left pivotable paddles or flippers 620 and 622 for activating a trigger mechanism 624 on the machine gun 64 (FIGS. 13 and 35). The handles 616 and 618 illustratively each includes a handle grip 626 having front and rear portions 628 and 630, respectively, configured to be engaged by the palms of a gunner, and a lever arm 632 pivotably coupled to the respective handle grip 626 and configured to be engaged by the fingers of the gunner to pivot the paddles 620 and 622. The front and rear portions 628 and 630 of each handle 616 and 618 are coupled together using conventional fasteners and extend between upper and lower arms 634 and 636 of the trigger frame 592. A lower extension 638 is secured below each lower arm 636. A bolt 640, sleeve 642 and nut 644 cooperate to secure the grip 626 and lower extension 638 of the handles 616 and 618 to the trigger frame 592.

A multiple position momentary switch 650 is supported within a housing 652 of each front portion 628 of handles 616 and 618. The switches 650 are positioned for easy activation by the thumbs of a gunner holding the grips 626 of handles 616 and 618. Each switch 650 has a neutral or off center position, an up position, and a down position. In the up position, a gunner's headset microphone (not shown) may be placed in communication with a transceiver (for example to the pilot or other crew members). In the down position, a laser target device (not shown) may be provided to assist in locating and/or tracking desired targets.

With reference to FIGS. 37 and 38, paddles 620 and 622 are configured to pivot downwardly to engage rollers 654 of the trigger mechanism 624 of the machine gun 64. More particularly, pulling lever arms 632 toward the grips 626 pivot the paddles 620 and 622 downwardly into engagement with the rollers 654 of the trigger mechanism 624. The rollers 654 may be spring biased upwardly to return the paddles 620 and 622, and in turn the lever arms 632, to a rest position. The lever arms 632 are coupled to the paddles 620 and 622 through a pivot rod 656. Keys 658 and cooperating set screws 661 and 662 prevent rotation of the rod 656 relative to the paddles 620, 622 and lever arms 632 (FIG. 38).

Referring now to FIGS. 37 and 38, an electrical actuator, such as a solenoid 660, is coupled to the frame 592 and is configured to be operated remotely, illustratively by the pilot of the helicopter 14. The solenoid 660 may be of conventional design as including a shaft 663 received for movement within an outer housing 664 in response to an electrical signal. A mounting cup 666 may receive the outer housing 664 of the solenoid 660 and be secured to a mounting tab 668 of the trigger frame 592 through conventional fasteners, such as bolts 670.

A linkage 672 illustratively couples the solenoid 660 to the paddles 620 and 622. The linkage 672 includes a coupler 674 operably coupled to the movable shaft 663 of the solenoid 660. The linkage 672 includes arms 676 and 678 extending upwardly from the coupler 674 and supporting a horizontal cross-member 680. The cross-member 680 is received within notches 682 formed in an upper surface of the paddles 620 and 622. During operation, the shaft 663 of the solenoid 660 pulls the linkage 672 downwardly such that the cross-member 680 pulls the paddles 620 and 622 downwardly into engagement with the trigger mechanism 624 of the machine gun 64 in the manner detailed above. As such, manual operation of the lever arms 632 by the gunner and electrical actuation of the solenoid 660 by the pilot causes similar operation of the machine gun 64, without requiring any special modification of the machine gun 64.

A switch 684 is supported within a housing 686 coupled to the frame 592. The switch 684 is configured to be manipulated by the gunner to selectively provide power to the solenoid 660 (i.e., place the machine gun 64 in remote electrical mode of operation). A visual indicator, illustratively a light emitting diode 688, is activated when the weapon mounting system 10 is in the remote electrical mode of operation for fixed forward fire by the pilot (i.e., the machine gun 64 is in the position shown in FIGS. 1 and 28). In certain illustrative embodiments, sensors (not shown) may provide an interlock to prevent remote electrical operation of the machine gun 64 when the machine gun 64 is not in the fixed forward fire position of FIG. 1.

Integration of the solenoid 660 within the trigger assembly 83 permits for firing of the machine gun 64 in both manual mode of operation (e.g., by the gunner from the gunner's window of the helicopter 14) and remote electrical mode of operation (e.g., by the pilot from the front end of the helicopter 14). Both of these modes of operation are accomplished without any modifications required of the machine gun 64 and, as such, reduces logistical or inventory concerns and expenses associated with the system 10.

A charge lever 690 is pivotably coupled to the trigger frame 592. A cable 692 couples the charge lever 690 to a conventional charging assembly 694 on the machine gun 64 (FIG. 18). The charge lever 690 includes a handle 696 and an arm 698 secured to the pivot rod 608. A key 700 and set screws 702 prevent relative rotation of the charge lever 690 and the pivot rod 608. A screw 704 and washer 706 secure the arm 698 to the pivot rod 608. A stop member 708 is secured to the pivot rod 608 and is configured to engage a limit member 710 secured to the bracket 606 to limit rotation of the charge lever 690. As the gunner pulls the handle 696 of the charge lever 690 rearwardly from a rest position to a charging position, the cable 692 pulls on the charging assembly 694, thereby charging the machine gun 64. The charging assembly 694 may be spring biased and thereby return the charge lever 690 to its rest position.

Figure 40:
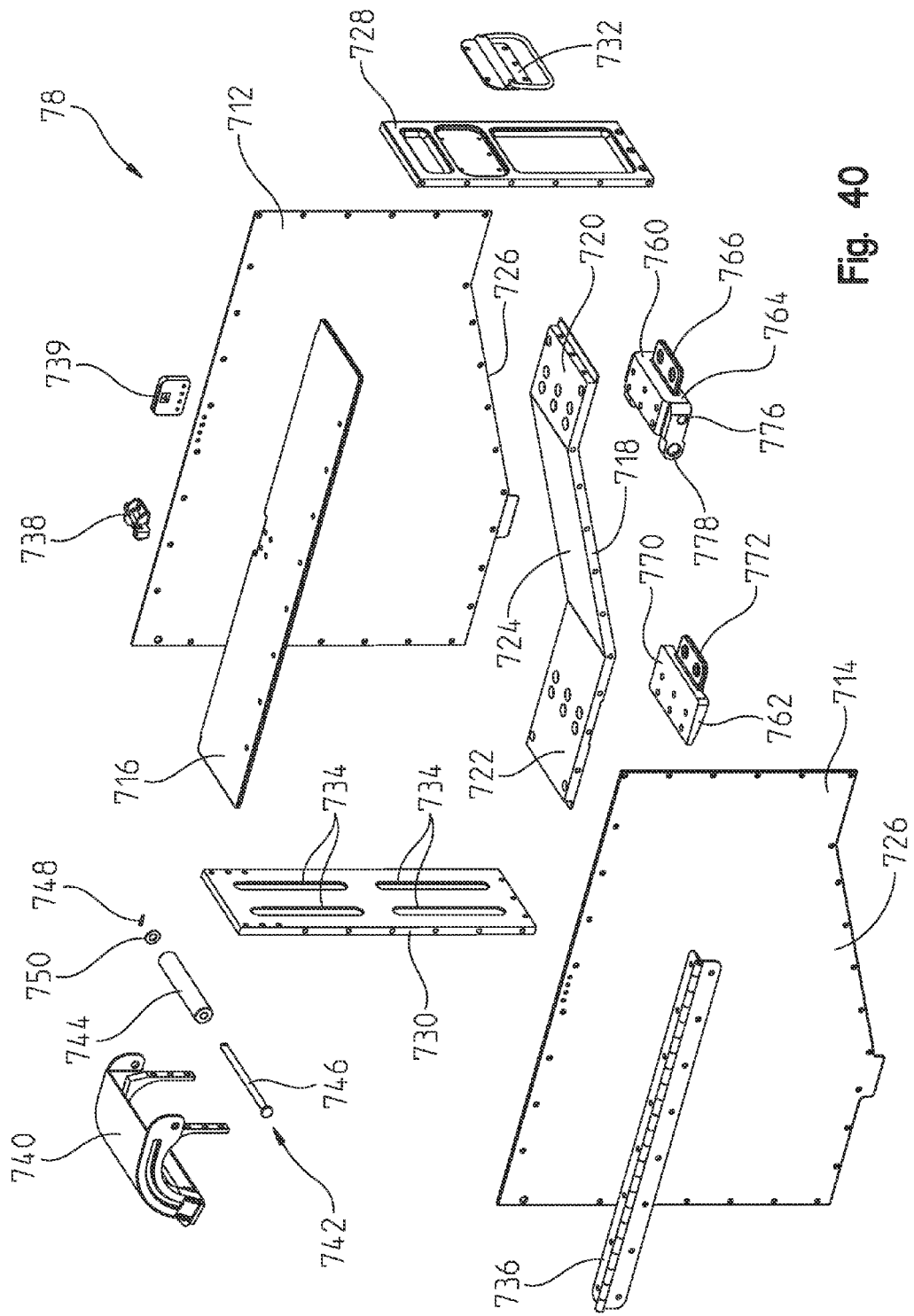
FIG. 40 is an exploded perspective view of the ammunition canister of the weapon mounting system of FIG. 5.
Figure 41:
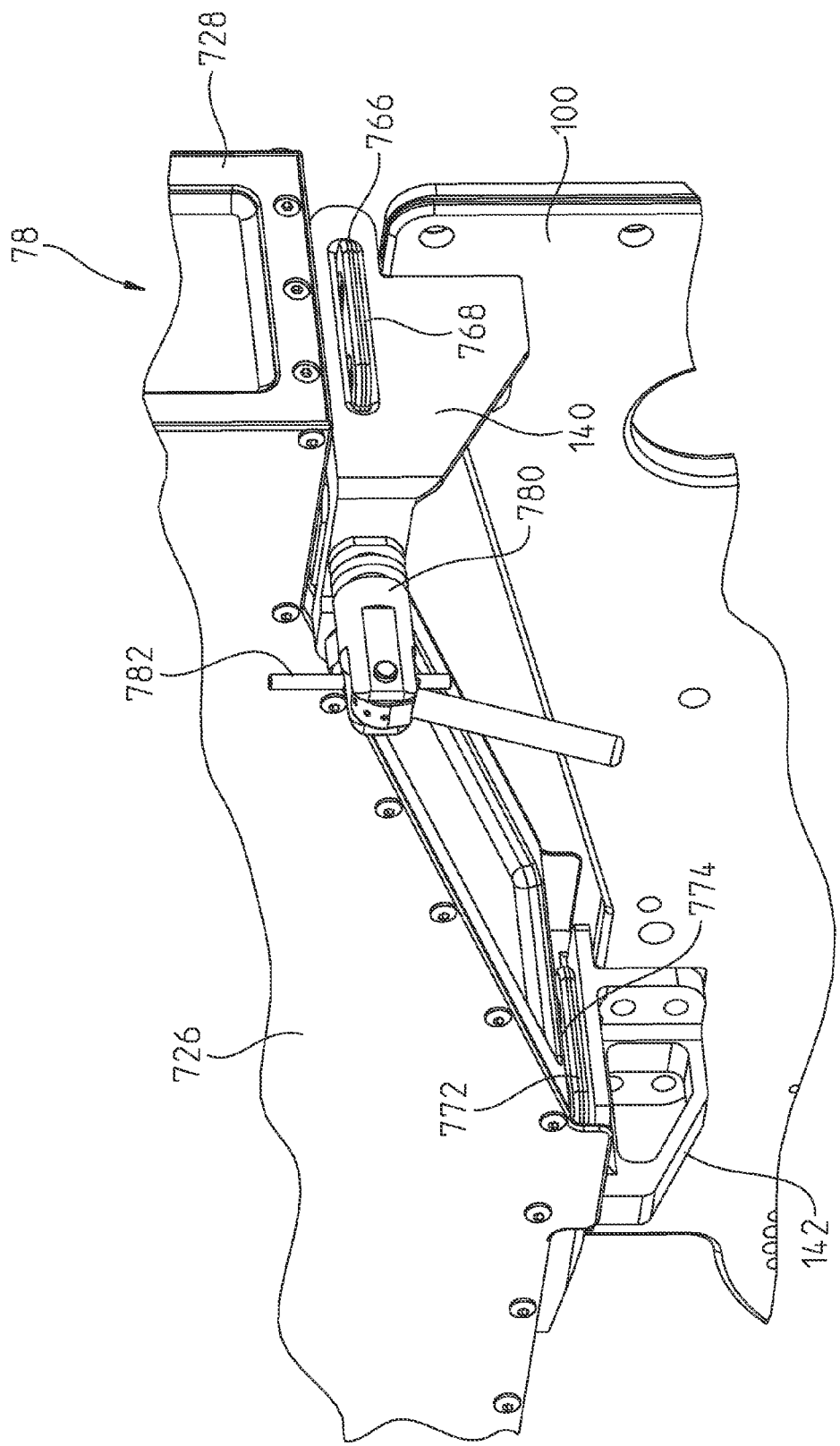
FIG. 41 is a detailed perspective view showing securing of the ammunition canister to the mounting plate of FIG. 6.

With reference now to FIGS. 40 and 41, the ammunition canister 78 illustratively includes first and second side walls 712 and 714, a top cover 716, and a base 718. The base 718 includes first and second end portions 720 and 722 secured together with an inclined intermediate portion 724. The bottom edge 726 of each side wall 712 and 714 conforms to the profile of the base 718. A front end wall 728 and a rear end wall 730 are coupled intermediate the side walls 712 and 714. The front end wall 728 includes a handle 732 to assist a user in moving the ammunition canister 78. The rear end wall 730 includes a plurality of elongated openings or sights 734 to view remaining ammunition stored in the canister 78. A hinge 736 couples top cover 716 to the first side wall 712, while a latch 738 cooperates with a latch plate 739 to secure the cover 716 to the second wall 714. The ammunition canister 78 may be used on either the right side 16 or left side 18 of the helicopter 14 by locating the hinge 736 on either the first side wall 712 or second side wall 714, respectively.

A guide chute 740 and a roller assembly 742 may facilitate transfer of the ammunition belt 76 from the canister 78 to the machine gun 64. The roller assembly 742 may include a roller 744 rotatably supported by a pin 746 secured to the guide chute 740 through a conventional fastener, such as a clip 748 and washer 750. As shown in the FIG. 4 mini-gun embodiment, a motorized feed device 752 may be coupled to the ammunition canister 78 to assist in feeding the ammunition belt to the gun.

With reference now to FIGS. 9, 40, and 41, the ammunition canister 78 is coupled to the mounting plate 100 through front and rear brackets 140 and 142. More particularly, front and rear mounting blocks 760 and 762 are coupled to the base 718 through conventional fasteners. Front mounting block 760 illustratively includes a body 764 supporting a tab 766 configured to be slidably received within a slot 768 of the front mounting bracket 140. Similarly, the rear mounting block 762 illustratively includes a body 770 supporting a tab 772 configured to be slidably received within a slot 774 of the rear mounting bracket 142. The body 764 of the front mounting block 760 illustratively includes outwardly facing first and second openings 776 and 778 to releasably receive couplers 780 and 782, respectively. More particularly, the first opening 776 illustratively receives primary lock or coupler 780 that may be the same as securing device 260 of the type detailed above. Similarly, the second opening 778 receives secondary lock or coupler 782 that may be the same as secondary lock 300 including a spring biased pin 302, of the type detailed above.

During installation, the ammunition canister 78 is positioned rearwardly of the mounting plate 100 and the tabs 766 and 772 are aligned with the slots 768 and 774 in the mounting brackets 140 and 142. The spring biased pin 302 of the coupler 782 is received within the second opening 778 of the front mounting block 760. The coupler 780 is then locked in place by rotating the handle 274 such that the securing rod 282 is threadably received within the first opening 776 of the front mounting block 760.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

The invention claimed is:

1. A weapon mounting system for a helicopter, the weapon mounting system comprising:
   a landing gear structure;
   an external mounting structure coupled to the landing gear structure;
   a tubular support post supported by the external mounting structure and defining a support post passageway;
   a tubular pintle supported by the support post and defining a pintle passageway;
   a machine gun operably coupled to the pintle; and
   an ejection collection device configured to direct spent shell casings and links from the machine gun through an ejection path, the ejection path including the pintle passageway and the support post passageway.

2. The weapon mounting system of claim 1, further comprising:
   a weapon cradle for releasably coupling to the machine gun; and
   a carriage operably coupled to the weapon cradle and defining an elevational axis, the cradle configured to pivot about the elevational axis;
   the tubular pintle operably coupled to the carriage and defining an azimuth axis extending perpendicular to the elevational axis, the carriage configured to rotate about the azimuth axis.

3. The weapon mounting system of claim 1, further comprising a base assembly including a base tube supporting a lower end of the support post and defining a base tube passageway and an exit opening, wherein the ejection path for the spent shell casings and links from the machine gun includes the base tube passageway from the support post passageway to the exit opening.

4. The weapon mounting system of claim 3, wherein the base assembly includes a mounting plate coupled to a helicopter, and the exiting opening is configured to discharge the spent shell casings and links from the machine gun below the mounting plate.

5. The weapon mounting system of claim 4, wherein the base assembly further includes a tiedown loop removably coupled to the mounting plate.

6. The weapon mounting system of claim 4, wherein the support post is inclined relative to the pintle, such that the lower exit opening is positioned forward of the pintle.

7. The weapon mounting system of claim 6, wherein the tubular support post is concentrically received within the base tube.

8. The weapon mounting system of claim 3, further comprising:
   a base coupler securing the support post to the base tube, the base coupler including a plurality of securing devices, each of the securing devices including:

an upper housing;

a handle pivotably supported by the upper housing;

a lower housing having a lower end threadably secured to one of the support post and the base tube;

a securing rod supported for axial and rotational movement within the inner housing and having a lower end threadably secured within the other of the base tube and the support post; and a detent mechanism operably coupled to the handle and configured to secure the handle in a desired angular position relative to the upper housing.

9. The weapon mounting system of claim 2, wherein the carriage includes a base including a cylindrical side wall, the pintle having a cylindrical side wall concentrically received within the cylindrical side wall of the cylindrical side wall of the carriage, spaced apart first and second arms supported by the base, first and second pivot pins support the weapon cradle intermediate the first and second arms, an elevational limit stop member supported by at least one of the first and second arms, and a pivot plate supported by at least one of the pivot pins and configured to rotate with the weapon cradle, engagement between the pivot plate and the elevational limit stop member defining first and second elevational limit positions of the weapon cradle to limit pivoting movement of the weapon cradle about the elevational axis.

10. The weapon mounting system of claim 9, further comprising first and second connecting wings connected to the weapon cradle and pivotably coupled to the first and second arms by the pivot pins, a locking pin supported by the carriage and configured to be received within a first recess of at least one of the connecting wings to secure the weapon cradle in a horizontal position about the elevational axis, and the locking pin configured to be received within a second recess of at least one of the connecting wings to secure the weapon cradle in a first depression position about the elevational axis.

11. The weapon mounting system of claim 10, wherein the locking pin is configured to be received within a third recess of at least one of the connecting wings to secure the weapon cradle in a second depression position about the elevational axis.

12. The weapon mounting system of claim 2, further comprising an arcuate azimuth stop member removably coupled to the pintle, and a projection supported for rotation with the carriage about the azimuth axis, engagement between the projection and the azimuth stop member defining first and second azimuth limit positions of the carriage to limit rotating movement about the azimuth axis.

13. The weapon mounting system of claim 12, further comprising first and second locking pins supported for rotation with the carriage, the pintle including first and second circumferentially spaced openings, the locking pins configured to be received within the openings of the pintle to secure the carriage in desired angular positions about the azimuth axis.

14. The weapon mounting system of claim 12, further comprising a bore sight adjustment device including an arcuate band supported by the carriage, and adjustment screws configured to adjust the angular position of the projection and the locking pins relative to the carriage.

15. The weapon mounting system of claim 2, wherein the weapon cradle includes a shock absorber to resist recoil of the machine gun.

16. The weapon mounting system of claim 3, further comprising an ammunition canister removably coupled to the base assembly, a securing device securing the ammunition canister to the mounting plate, including:

an upper housing;

a handle pivotably supported by the upper housing;

a lower housing having a lower end threadably secured to one of the ammunition canister and the mounting plate;

a securing rod supported for axial and rotational movement within the inner housing and having a lower end threadably secured within the other of the mounting plate and the ammunition canister; and a detent mechanism operably coupled to the handle and configured to secure the handle in a desired angular position relative to the upper housing.

17. The weapon mounting system of claim 1, wherein the machine gun is a .50 caliber machine gun.

18. The weapon mounting system of claim 1, further comprising a base assembly including a support post passage extending through said base assembly adapted to receive and support a lower end of the support post and defining a support post receiver passageway and an exit opening, wherein the ejection path for the spent shell casings and links from the machine gun includes the support post receiver passageway from the support post passageway to the exit opening;

a base coupler securing the support post in the support post passage, the base coupler including a plurality of securing devices, each of the securing devices including:

an upper housing;

a handle pivotably supported by the upper housing;

a lower housing having a lower end threadably secured to one of the support post and the base tube;

a securing rod supported for axial and rotational movement within the inner housing and having a lower end threadably secured within the other of the base tube and the support post; and a detent mechanism operably coupled to the handle and configured to secure the handle in a desired angular position relative to the upper housing.

* * * * *